US011903387B2

(12) United States Patent
Sakaguchi et al.

(10) Patent No.: US 11,903,387 B2
(45) Date of Patent: Feb. 20, 2024

(54) FUNGICIDAL COMPOSITION

(71) Applicant: GOWAN COMPANY, L.L.C., Yuma, AZ (US)

(72) Inventors: Takatoshi Sakaguchi, Ibaraki (JP); Naoki Okada, Ibaraki (JP)

(73) Assignee: Gowan Company, L.L.C., Yuma, AZ (US)

( * ) Notice: Subject to any disclaimer, the term of this patent is extended or adjusted under 35 U.S.C. 154(b) by 976 days.

(21) Appl. No.: 16/074,138

(22) PCT Filed: Feb. 8, 2016

(86) PCT No.: PCT/JP2016/053654
§ 371 (c)(1),
(2) Date: Jul. 31, 2018

(87) PCT Pub. No.: WO2017/138069
PCT Pub. Date: Aug. 17, 2017

(65) Prior Publication Data
US 2021/0045386 A1 Feb. 18, 2021

(51) Int. Cl.
A01N 43/56 (2006.01)
A01N 25/04 (2006.01)
A01N 25/08 (2006.01)
A01N 43/78 (2006.01)

(52) U.S. Cl.
CPC ............ A01N 43/56 (2013.01); A01N 25/04 (2013.01); A01N 25/08 (2013.01); A01N 43/78 (2013.01)

(58) Field of Classification Search
CPC ........ A01N 43/56; A01N 43/78; A01N 37/20; A01N 37/34; A01N 37/36; A01N 37/38; A01N 37/46; A01N 37/50; A01N 43/36; A01N 43/40; A01N 43/42; A01N 43/50; A01N 43/54; A01N 43/653; A01N 43/76; A01N 43/90; A01N 47/04; A01N 47/12; A01N 47/14; A01N 47/34; A01N 47/38; A01N 47/44; A01N 57/12; A01N 59/20; A01N 25/04; A01N 25/08
USPC ....................................................... 504/269
See application file for complete search history.

(56) References Cited

U.S. PATENT DOCUMENTS

| 4,218,464 | A | 8/1980 | Bondinell et al. |
| 9,980,487 | B2 | 5/2018 | Wada et al. |
| 10,104,891 | B2 | 10/2018 | Wada et al. |
| 2001/0051620 | A1 | 12/2001 | Berger et al. |
| 2002/0019531 | A1 | 2/2002 | Kitazawa et al. |
| 2003/0039838 | A1 | 2/2003 | Chen et al. |
| 2009/0298894 | A1 | 12/2009 | Ohmori et al. |
| 2010/0137245 | A1 | 6/2010 | Cristau et al. |
| 2010/0190828 | A1 | 7/2010 | Cristau et al. |
| 2011/0046178 | A1 | 2/2011 | Cristau et al. |
| 2011/0105429 | A1 | 5/2011 | Cristau et al. |
| 2011/0224257 | A1 | 9/2011 | Cristau et al. |
| 2011/0301197 | A1 | 12/2011 | Cristau et al. |
| 2011/0306620 | A1 | 12/2011 | Cristau et al. |
| 2011/0312999 | A1 | 12/2011 | Cristau et al. |
| 2012/0065197 | A1 | 3/2012 | Cristau et al. |
| 2012/0122928 | A1 | 5/2012 | Tsuchiya et al. |
| 2012/0245204 | A1 | 9/2012 | Hoffmann et al. |
| 2013/0261154 | A1 | 10/2013 | Hanagan et al. |
| 2014/0005224 | A1 | 1/2014 | Hillebrand et al. |
| 2014/0228404 | A1 | 8/2014 | Hillebrand et al. |
| 2015/0024935 | A1 | 1/2015 | Tsuchiya et al. |
| 2016/0251344 | A1 | 9/2016 | Olenik et al. |
| 2017/0231226 | A1 | 8/2017 | Wada et al. |

FOREIGN PATENT DOCUMENTS

| CN | 103384470 A | 11/2013 |
| CN | 103827112 A | 5/2014 |
| CN | 106687459 A | 5/2017 |
| EP | 2423210 A1 | 2/2012 |
| EP | 3181563 A1 | 6/2017 |
| JP | 2001-302658 A | 10/2001 |
| JP | 2004-137255 A | 5/2004 |
| JP | 2008-529982 A | 8/2008 |
| JP | 2009-502948 A | 1/2009 |
| JP | 2010-516765 A | 5/2010 |
| JP | 2010-533716 A | 10/2010 |
| JP | 2011-021013 A | 2/2011 |
| JP | 2011-510925 A | 4/2011 |
| JP | 2012-512248 A | 5/2012 |
| JP | 2013-544761 A | 12/2013 |
| JP | 2014-501246 A | 1/2014 |
| WO | 1993/09113 A1 | 5/1993 |
| WO | 2006/082001 A1 | 8/2006 |
| WO | 2007/014290 A2 | 2/2007 |
| WO | 2008/013622 A2 | 1/2008 |
| WO | 2008/013925 A2 | 1/2008 |
| WO | 2008/091580 A2 | 7/2008 |
| WO | 2008/091594 A2 | 7/2008 |
| WO | 2009/014637 A2 | 1/2009 |
| WO | 2009/055514 A2 | 4/2009 |

(Continued)

OTHER PUBLICATIONS

U.S. Appl. No. 15/503,069, filed Feb. 10, 2017, U.S. Pat. No. 9,980,487, Issued.
U.S. Appl. No. 15/957,502, filed Apr. 19, 2018, U.S. Pat. No. 10,104,891, Issued.
U.S. Appl. No. 16/076,153, filed Aug. 7, 2018, Pending.
Ahad et al., The Chemistry of Fungi. Part 77. The Synthesis of Benzophenones from Phthalides: X-Ray Crystallographic Definition of a Novel Isobenzofuran System. Organic and Bio-organic Chemistry. 1980;11:2445-2449.
Anthony et al., Synthesis, optical, thermal, and redox properties of 2,3,9,10-tetrasubstituted-6,13-dialkynylpentacenes. Proc of SPIE. 2005;5940:594002-1-594002-12.

(Continued)

Primary Examiner — Carlos A Azpuru
(74) Attorney, Agent, or Firm — ArentFox Schiff LLP

(57) ABSTRACT

The present invention relates to a method of controlling plant diseases caused by phytopathogenic microorganisms, comprising a step of applying a fungicidal composition comprising a compound of formula [1] or a salt thereof.

3 Claims, No Drawings

(56) References Cited

FOREIGN PATENT DOCUMENTS

| | | |
|---|---|---|
| WO | 2009/094407 A2 | 7/2009 |
| WO | 2009/094445 A2 | 7/2009 |
| WO | 2009/131090 A1 | 10/2009 |
| WO | 2009/132785 A1 | 11/2009 |
| WO | 2010/037479 A1 | 4/2010 |
| WO | 2010/065579 A2 | 6/2010 |
| WO | 2010/066353 A1 | 6/2010 |
| WO | 2010/077752 A1 | 7/2010 |
| WO | 2010/149275 A1 | 12/2010 |
| WO | 2011/018401 A1 | 2/2011 |
| WO | 2011/018415 A2 | 2/2011 |
| WO | 2011/051243 A1 | 5/2011 |
| WO | 2011/051244 A1 | 5/2011 |
| WO | 2011/076510 A1 | 6/2011 |
| WO | 2011/076699 A1 | 6/2011 |
| WO | 2011/085170 A1 | 7/2011 |
| WO | 2011/134969 A1 | 11/2011 |
| WO | 2011/144586 A1 | 11/2011 |
| WO | 2011/146182 A1 | 11/2011 |
| WO | 2011/147765 A1 | 12/2011 |
| WO | 2012/020060 A1 | 2/2012 |
| WO | 2012/025557 A1 | 3/2012 |
| WO | 2012/037411 A2 | 3/2012 |
| WO | 2012/045798 A1 | 4/2012 |
| WO | 2012/055837 A1 | 5/2012 |
| WO | 2012/069633 A1 | 5/2012 |
| WO | 2012/082580 A2 | 6/2012 |
| WO | 2012082580 A2 | 6/2012 |
| WO | 2012/104273 A1 | 8/2012 |
| WO | 2012/107475 A1 | 8/2012 |
| WO | 2012/107477 A1 | 8/2012 |
| WO | 2012/168188 A1 | 12/2012 |
| WO | 2013/000941 A1 | 1/2013 |
| WO | 2013/000943 A1 | 1/2013 |
| WO | 2013/037768 A1 | 3/2013 |
| WO | 2013/056911 A1 | 4/2013 |
| WO | 2013/056915 A1 | 4/2013 |
| WO | 2013/098229 A2 | 7/2013 |
| WO | 2013/116251 A2 | 8/2013 |
| WO | 2013/127704 A1 | 9/2013 |
| WO | 2013/127784 A1 | 9/2013 |
| WO | 2013/127789 A1 | 9/2013 |
| WO | 2013/127808 A1 | 9/2013 |
| WO | 2013/191866 A1 | 12/2013 |
| WO | 2014/060176 A1 | 4/2014 |
| WO | 2014/075873 A1 | 5/2014 |
| WO | 2014/075874 A1 | 5/2014 |
| WO | 2014/118142 A1 | 8/2014 |
| WO | 2014/118143 A1 | 8/2014 |
| WO | 2014/154530 A1 | 10/2014 |
| WO | 2014/179144 A1 | 11/2014 |
| WO | 2014/206896 A1 | 12/2014 |
| WO | 2015/036379 A1 | 3/2015 |
| WO | 2015/055574 A1 | 4/2015 |
| WO | 2015/067802 A1 | 5/2015 |
| WO | 2016/024350 A1 | 2/2016 |
| WO | 2016/024434 A1 | 2/2016 |
| WO | 2017/138068 A1 | 8/2017 |
| WO | 2017/138069 A1 | 8/2017 |

OTHER PUBLICATIONS

Bhattacharjee et al., The Oxidation of a Series of Phthalyl Alcohols. J Heterocyclic Chem. 1980;17(2):315-320.

Chaikin et al., Reduction of Aldehydes, Ketones and Acid Chlorides by Sodium Borohydride. J Am Chem Soc. 1949;71(1):122-125.

Chen et al., Chemoselective reduction and self-immolation based FRET probes for detecting hydrogen sulfide insolution and in cells. Org Biomol Chem. 2014;12:5629-5633. Includes Supporting Information.

Greene et al., Protection for the Hydroxyl Group, Including 1,2- and 1,3-Diols. Protective Groups in Organic Synthesis, Third Edition. John Wiley & Sons, Inc., pp. 17-21, 198 (1999).

Jansen et al., Molecular clips based on propanediurea: exceptionally high binding affinities for resorcinol guests. J Org Chem. Apr. 20, 2001;66(8):2643-53.

Kirmse et al., Crbenes and the O—H Bond: Hydroxyalkyl-Substituted Arylcarbenes. J Org Chem. 1990;55:2325-2332.

Kisin-Finfer et al., New repertoire of 'donor-two-acceptor' NIR fluorogenic dyes. Bioorganic & Medicinal Chemistry. Bioorganic & Medicinal Chemistry. 2013;21:3605-3608. Includes Supporting Information.

Meisenheimer et al., Proluciferin acetals as bioluminogenic substrates for cytochrome P450 activity and probes for CYP3A inhibition. Drug Metab Dispos. Dec. 2011;39(12):2403-10.

Nystrom et al., Reduction of Organic Compounds by Lithium Aluminum Hydride. I. Aldehydes, Ketones, Esters, Acid Chlorides and Acid Anhydrides. J Am Chem Soc. 1947;69(5):1197-1199.

Santoso et al., Exploring O-stannyl ketyl and acyl radical cyclizations for the synthesis of ?-lactone-fused benzopyrans and benzofurans. Org Biomol Chem. Jan. 7, 2014;12(1):171-6.

Suzuki et al., Synthesis and Absolute Configuration kof Pyriculol. Agri Biol Chem. 1987;51(4):1121-1127.

Singh et al., Oxidative dearomatization and unusual intramolecular Diels-Alder reaction of cyclohexa-2,4-dienone: synthesis and photoreaction of oxa-tricyclo[5.2.2.01,5]undec-10-ene-8-ones. Tetrahedron Letters. Apr. 2015;56(15):1982-1985.

Supplementary European Search Report for Application No. 15832228.9, dated Jan. 8, 2018. 5 pages.

International Search Report for Application No. PCT/JP2015/066841, dated Sep. 15, 2015. 6 pages.

International Search Report for Application No. PCT/JP2016/053650, dated Mar. 15, 2016. 2 pages.

International Search Report for Application No. PCT/JP2016/053654, dated Apr. 19, 2016. 3 pages.

Supplementary European Search Report for Application No. 16889770.0, dated Jul. 9, 2019, 12 pages.

U.S. Appl. No. 15/957,502, filed Apr. 19, 2018, Allowed.

Supplementary European Search Report for Application No. 16889771.8, dated Aug. 12, 2019, 7 pages.

FUNGICIDAL COMPOSITION

CROSS-REFERENCE TO RELATED APPLICATIONS

This application is a U.S. national stage filing under 35 U.S.C. § 371 (c), of International Application No. PCT/JP2016/053654, filed on Feb. 8, 2016. The entire contents of the aforementioned application are incorporated herein by reference.

TECHNICAL FIELD

The present invention relates to a fungicidal composition comprising: at least one of a fused 11-membered compound, an enantiomer thereof, or a mixture of the foregoing, or an agriculturally or horticulturally acceptable salt of said compound; and at least one of other agricultural or horticultural fungicide or a salt thereof.

BACKGROUND ART

There have hitherto been found out many agricultural or horticultural fungicides, but novel fungicides with higher efficacy and safety are still needed from the viewpoints of the problem of decreased drug sensitivity, the problem with maintenance of efficacy, safety during use (e.g., safety for users), and safety in environmental impact. Also needed are pathogen control methods for preventing phytopathogenic fungi from acquiring drug resistance or low drug sensitivity.

CITATION LIST

Patent Literatures

Patent Literature 1: International Patent Publication No. WO 1993/09113
Patent Literature 2: Japanese Patent Application Publication No. JP 2004-137255
Patent Literature 3: International Patent Publication No. WO 2012/037411
Patent Literature 4: International Patent Publication No. WO 2010/077752
Patent Literature 5: U.S. Pat. No. 4,218,464
Patent Literature 6: International Patent Publication No. WO 2009/014637
Patent Literature 7: International Patent Publication No. WO 2006/082001
Patent Literature 8: International Patent Publication No. WO 2003/008475
Patent Literature 9: International Patent Publication No. WO 2012/082580
Patent Literature 10: International Patent Publication No. WO 2007/014290
Patent Literature 11: International Patent Publication No. WO 2008/091580
Patent Literature 12: International Patent Publication No. WO 2009/094407

NON-PATENT LITERATURES

Non-Patent Literature 1: JANSEN, R. J. et al., *Journal of Organic Chemistry*, 2001, Vol. 66, No. 8, pp. 2643-2653
Non-Patent Literature 2: AHAD, J. et al., *Journal of the Chemical Society, Perkin Transactions* 1: Organic and Bio-organic Chemistry, 1980, No. 11, pp. 2445-2449
Non-Patent Literature 3: SANTOSO, H. et al., *Organic & Biomolecular Chemistry*, 2014, Vol. 12, No. 1, pp. 171-176
Non-Patent Literature 4: BHATTACHARJEE, D. et al., *Journal of Heterocyclic Chemistry*, 1980, Vol. 17, No. 2, pp. 315-320
Non-Patent Literature 5: MEISENHEIMER, P. L. et al., *DRUG METABOLISM AND DISPOSITION*, 2011, Vol. 39, No. 12, pp. 2403-2410
Non-Patent Literature 6: FRAC Code List (2015), FRAC (Fungicide Resistance Action Committee)
Non-Patent Literature 7: *The Pesticide Manual* (2013), British Crop Protection Council
Non-Patent Literature 8: *Kumiai Nouyaku Souran* (2014), National Federation of Agricultural Cooperative Associations
Non-Patent Literature 9: *SHIBUYA INDEX* (17th Edition), Zenkoku Noson Kyoiku Kyokai Co., Ltd.

SUMMARY OF INVENTION

Technical Problem

Many agricultural or horticultural fungicidal compounds are used for controlling diseases of beneficial crops, and various attempts have been made to develop agrochemical preparations by combining agricultural or horticultural fungicidal compounds with a view to improving fungicidal activity, but such agrochemical preparations do not have sufficient pathogen controlling effect. An object of the present invention is to provide a novel fungicidal composition having superior fungicidal activity, which can solve the aforementioned problem.

Solution to Problem

The present inventors have made intensive studies to achieve the aforementioned object, and as a result found that plant diseases can be effectively controlled by using a certain type of fused 11-membered compound represented by formula [1] as shown below in combination with other agricultural or horticultural fungicidal compound. The present invention is based on this finding.

(1) A fungicidal composition comprising:
(a) at least one of a compound of formula [1]

[Chem. 1]

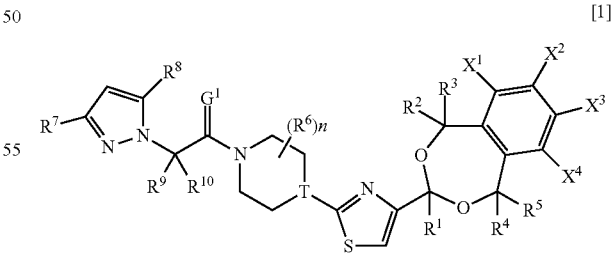

[1]

{wherein T is either CH or a nitrogen atom;
$R^1$ is a hydrogen atom, $C_1$-$C_6$ alkyl, $C_2$-$C_6$ alkenyl, $C_1$-$C_6$ haloalkyl, $C_1$-$C_6$ alkoxy, a halogen atom, cyano or hydroxy; each of $R^2$, $R^3$, $R^4$ and $R^5$ is independently a hydrogen atom, $C_1$-$C_6$ alkyl, $C_3$-$C_6$ cycloalkyl, $C_1$-$C_6$ haloalkyl, $C_1$-$C_6$ alkoxy, $C_1$-$C_6$ haloalkoxy, a halogen atom, cyano or hydroxyl, or $R^2$ together with $R^3$, and $R^4$ together with $R^5$, are independently taken together with a carbon atom to which they are attached to form a carbonyl group (C=O); each occurrence of $R^6$ is independently oxo, $C_1$-$C_6$ alkyl, $C_2$-$C_6$ alkenyl, $C_1$-$C_6$ haloalkyl, $C_1$-$C_6$ alkoxy, a halogen atom, cyano or hydroxy;

n is 0-2;

each of $X^1$, $X^2$, $X^3$ and $X^4$ is independently a hydrogen atom, a halogen atom, cyano, hydroxy, nitro, formyl, mercapto, $C_1$-$C_6$ alkyl, $C_2$-$C_6$ alkenyl, $C_2$-$C_6$ alkynyl, $C_1$-$C_6$ haloalkyl, $C_2$-$C_6$ haloalkenyl, $C_2$-$C_6$ haloalkynyl, $C_1$-$C_6$ alkoxy, $C_2$-$C_6$ alkenyloxy, $C_2$-$C_6$ alkynyloxy, $C_1$-$C_6$ haloalkoxy, $C_2$-$C_6$ haloalkenyloxy, $C_2$-$C_6$ haloalkynyloxy, carboxy, carbamoyl, $C_3$-$C_6$ cycloalkyl, $C_3$-$C_8$ halocycloalkyl, $C_3$-$C_6$ cycloalkoxy, $C_3$-$C_8$ halocycloalkoxy, $C_2$-$C_6$ alkoxyalkyl, $C_4$-$C_{10}$ cycloalkoxyalkyl, $C_2$-$C_6$ haloalkoxyalkyl, $C_4$-$C_{10}$ halocycloalkoxyalkyl, $C_3$-$C_8$ alkoxyalkoxyalkyl, $C_2$-$C_6$ alkoxyalkoxy, $C_4$-$C_{10}$ cycloalkylalkoxy, $C_1$-$C_6$ hydroxyalkyl, $C_4$-$C_{10}$ cycloalkylalkyl, $C_4$-$C_{10}$ alkylcycloalkyl, $C_6$-$C_{14}$ cycloalkylcycloalkyl, $C_4$-$C_{10}$ halocycloalkylalkyl, $C_6$-$C_{14}$ halocycloalkylcycloalkyl, $C_4$-$C_{10}$ haloalkylcycloalkyl, $C_5$-$C_{10}$ alkylcycloalkylalkyl, $C_3$-$C_8$ cycloalkenyl, $C_3$-$C_8$ halocycloalkenyl, —$SR^{25}$, —$S(O)R^{25}$, —$S(O)_2R^{25}$, —$OS(O)_2R^{25}$, —($C_1$-$C_6$ alkyl)$S(O)_2R^{25}$, $C_2$-$C_6$ alkylthioalkyl, $C_2$-$C_6$ alkylsulfinylalkyl, $C_2$-$C_6$ alkylsulfonylalkyl, $C_2$-$C_6$ alkylcarbonyl, $C_2$-$C_6$ haloalkylcarbonyl, $C_4$-$C_8$ cycloalkylcarbonyl, $C_2$-$C_6$ alkoxycarbonyl, $C_2$-$C_6$ haloalkoxycarbonyl, $C_4$-$C_8$ cycloalkoxycarbonyl, $C_5$-$C_{10}$ cycloalkylalkoxycarbonyl, $C_2$-$C_6$ alkylcarbonyloxy, $C_2$-$C_6$ haloalkylcarbonyloxy, $C_4$-$C_8$ cycloalkylcarbonyloxy, $C_2$-$C_6$ alkoxycarbonyloxy, $C_2$-$C_6$ haloalkoxycarbonyloxy, $C_4$-$C_8$ cycloalkoxycarbonyloxy, $C_3$-$C_6$ alkylcarbonylalkoxy, —$NR^{26}R^{27}$, $C_2$-$C_6$ alkylaminoalkyl, $C_3$-$C_8$ (dialkylamino)alkyl, $C_2$-$C_6$ haloalkylaminoalkyl, $C_4$-$C_{10}$ cycloalkylaminoalkyl, $C_1$-$C_6$ alkylsulfonylamino, $C_1$-$C_6$ haloalkylsulfonylamino, $C_2$-$C_6$ alkylaminocarbonyl, $C_3$-$C_{10}$ (dialkylamino)carbonyl, $C_4$-$C_8$ cycloalkylaminocarbonyl, $C_2$-$C_8$ (N-alkoxy-N-alkyl)amino, $C_2$-$C_8$ (dialkylamino)oxy, $C_3$-$C_{10}$ trialkylhydrazinyl, $C_3$-$C_{10}$ trialkylsilyl, $C_4$-$C_{10}$ trialkylsilylalkyl, $C_5$-$C_{10}$ trialkylsilylalkynyl, $C_3$-$C_{10}$ trialkylsilyloxy, $C_4$-$C_{12}$ trialkylsilylalkoxy, $C_5$-$C_{12}$ trialkylsilylalkoxyalkyl, $C_5$-$C_{12}$ trialkylsilylalkynyloxy, $C_2$-$C_6$ alkylsulfonyloxyalkyl, $C_2$-$C_6$ haloalkylsulfonyloxyalkyl, —$C(=NOR^{28})R^{29}$, —$C(=NR^{30})R^{29}$, $C_2$-$C_6$ cyanoalkyl, phenyl, phenoxy or benzyl, or $X^1$ together with $X^2$, $X^2$ together with $X^3$, and $X^3$ together with $X^4$ form a $C_2$-$C_6$ alkylene chain that may contain an oxygen atom, a sulfur atom or —$NR^{31}$—, or they are taken together with a carbon atom to which they are attached to form a thiophene ring, a pyridine ring, a pyrrole ring, an imidazole ring, a benzene ring, a naphthalene ring, a pyrimidine ring, a furan ring, a pyrazine ring, a pyrazole ring or an oxazole ring;

$R^{25}$ is $C_1$-$C_8$ alkyl, $C_3$-$C_8$ cycloalkyl, $C_1$-$C_6$ haloalkyl, $C_3$-$C_8$ halocycloalkyl, $C_1$-$C_6$ alkylamino, phenyl or benzyl, and phenyl or benzyl may be substituted with at least one $R^3$;

each occurrence of $R^{32}$ is independently $C_1$-$C_6$ alkyl, $C_3$-$C_8$ cycloalkyl, $C_1$-$C_6$ haloalkyl, $C_1$-$C_6$ alkoxy, $C_1$-$C_6$ haloalkoxy, $C_3$-$C_8$ cycloalkoxy, $C_3$-$C_8$ halocycloalkyl, $C_1$-$C_6$ alkylthio, $C_1$-$C_6$ alkylsulfinyl, $C_1$-$C_6$ alkylsulfonyl, $C_1$-$C_6$ haloalkylthio, $C_1$-$C_6$ haloalkylsulfinyl, $C_1$-$C_6$ haloalkylsulfonyl, a halogen atom, cyano or hydroxy;

each of $R^{26}$ and $R^{27}$ is independently a hydrogen atom, $C_1$-$C_6$ alkyl, $C_3$-$C_8$ cycloalkyl, $C_1$-$C_6$ haloalkyl, $C_3$-$C_8$ halocycloalkyl, $C_1$-$C_6$ alkoxy, $C_2$-$C_8$ dialkylamino, $C_2$-$C_6$ alkylcarbonyl, $C_2$-$C_6$ haloalkylcarbonyl, $C_4$-$C_8$ cycloalkylcarbonyl, $C_2$-$C_6$ alkoxycarbonyl, $C_2$-$C_6$ haloalkoxycarbonyl or $C_3$-$C_{10}$ (dialkylamino)carbonyl;

$R^{28}$ is a hydrogen atom, $C_1$-$C_6$ alkyl, $C_1$-$C_6$ haloalkyl or benzyl;

$R^{29}$ is a hydrogen atom, $C_1$-$C_6$ alkyl, $C_3$-$C_8$ cycloalkyl, $C_1$-$C_6$ haloalkyl, $C_3$-$C_8$ halocycloalkyl, $C_4$-$C_{10}$ cycloalkylalkyl, phenyl or benzyl;

$R^{30}$ is $C_1$-$C_6$ alkyl, $C_3$-$C_8$ cycloalkyl, $C_1$-$C_6$ haloalkyl, $C_3$-$C_8$ halocycloalkyl, phenyl or benzyl;

$R^3$ is a hydrogen atom, $C_1$-$C_6$ alkyl, $C_2$-$C_6$ alkenyl, $C_2$-$C_6$ alkynyl, $C_1$-$C_6$ haloalkyl, $C_2$-$C_6$ haloalkenyl, $C_2$-$C_6$ haloalkynyl, $C_2$-$C_6$ alkoxyalkyl, $C_3$-$C_6$ cycloalkyl, $C_3$-$C_6$ halocycloalkyl, $C_2$-$C_6$ alkylthioalkyl, $C_2$-$C_6$ alkylsulfinylalkyl, $C_2$-$C_6$ alkylsulfonylalkyl, $C_2$-$C_6$ alkylcarbonyl, $C_2$-$C_6$ haloalkylcarbonyl, $C_2$-$C_6$ alkoxycarbonyl, $C_3$-$C_6$ alkoxycarbonylalkyl, $C_2$-$C_6$ alkylaminocarbonyl, $C_3$-$C_6$ (dialkylamino)carbonyl, $C_1$-$C_6$ alkylsulfonyl or $C_1$-$C_6$ haloalkylsulfonyl;

each of $R^7$ and $R^8$ is independently $C_1$-$C_4$ alkyl, a halogen atom, $C_3$-$C_6$ cycloalkyl or $C_1$-$C_4$ haloalkyl;

each of $R^9$ and $R^{10}$ is independently a hydrogen atom, a halogen atom, cyano, hydroxy, $C_1$-$C_6$ alkyl, $C_2$-$C_6$ alkenyl, $C_2$-$C_6$ alkynyl, $C_1$-$C_6$ haloalkyl, $C_2$-$C_6$ haloalkenyl, $C_2$-$C_6$ haloalkynyl, $C_1$-$C_6$ alkoxy, $C_1$-$C_6$ haloalkoxy, $C_3$-$C_6$ cycloalkyl, $C_1$-$C_6$ alkylthio, $C_1$-$C_6$ alkylsulfinyl, $C_1$-$C_6$ alkylsulfonyl, $C_1$-$C_6$ haloalkylthio, $C_1$-$C_6$ haloalkylsulfinyl or $C_1$-$C_6$ haloalkylsulfonyl; and $G^1$ is an oxygen atom or a sulfur atom}, an enantiomer thereof, or a mixture thereof, or an agriculturally or horticulturally acceptable salt of said compound; and (b) at least one of an agricultural or horticultural fungicide or a salt thereof.

(2) The fungicidal composition according to (1), wherein in the compound of formula [1], $R^1$, $R^2$, $R^3$, $R^4$ and $R^5$ are hydrogen atoms;

n is 0;

each of $X^1$, $X^2$, $X^3$ and $X^4$ is independently a hydrogen atom, a halogen atom, cyano, hydroxy, nitro, formyl, $C_1$-$C_4$ alkyl, $C_1$-$C_4$ haloalkyl, $C_1$-$C_4$ hydroxyalkyl, $C_1$-$C_4$ alkoxy, $C_1$-$C_4$ haloalkoxy, —$SR^{25}$, —$S(O)_2R^{25}$, —$OS(O)_2R^{25}$, $C_2$-$C_4$ alkylcarbonyloxy, $C_2$-$C_4$ alkoxycarbonyloxy, or —$C(=NOR^{28})R^{29}$.

$R^{25}$ is $C_1$-$C_4$ alkyl, cyclopropyl or $C_1$-$C_4$ haloalkyl;

each of $R^{28}$ and $R^{29}$ is independently a hydrogen atom or methyl;

each of $R^7$ and $R^8$ is independently $C_1$-$C_4$ alkyl, a halogen atom, or $C_1$-$C_4$ haloalkyl;

$R^9$ and $R^{10}$ are hydrogen atoms; and $G^1$ is an oxygen atom.

(3) The fungicidal composition according to (1) or (2), wherein in the compound of formula [1], $X^1$ is —$OS(O)_2R^{25}$.

$X^2$ and $X^3$ are hydrogen atoms;

$X^4$ is a hydrogen atom, nitro, a fluorine atom, a chlorine atom, a bromine atom, methyl, methoxy, difluoromethoxy, trifluoromethoxy or —$OS(O)_2R^{25}$;

$R^{25}$ is methyl;

$R^7$ is trifluoromethyl, difluoromethyl, or a chlorine atom;

each occurrence of $R^8$ is independently methyl, trifluoromethyl, difluoromethyl, or a chlorine atom.

(4) The fungicidal composition according to any one of (1) to (3), wherein the compound of formula [1] is selected from:

4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine, 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine,
4-[4-(6-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine, and
4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine, or mixtures thereof.

(5) The fungicidal composition according to any one of (1) to (4), wherein component (b) comprises at least one compound selected from benthiavalicarb, valifenalate, zoxamide, famoxadone, iprovalicarb, fenamidone, fluopicolide, ametoctradin, cyazofamid, mandipropamid, metalaxyl-M, ethaboxam, dimethomorph, cymoxanil, basic copper sulfate, chlorothalonil, mancozeb, propineb, captan, kresoxim-methyl, azoxystrobin, trifloxystrobin, fluazinam, pyribencarb, penthiopyrad, quinoxyfen, pyriofenone, propamocarb, fosetyl-aluminum, iminoctadine, fludioxonil, thiophanate-methyl, iprodione, tebuconazole, cyprodinil, amisulbrom, tricyclazole, polyoxin, tebufloquin, propiconazole, oxathiapiprolin, or salts thereof.

(6) The fungicidal composition according to any one of (1) to (5), wherein the fungicidal composition is used as an agricultural or horticultural fungicide.

(7) A method of controlling a plant pest, comprising a step of treating a plant or a vicinity thereof with (a) the compound of formula [1] according to (1) and (b) an agricultural or horticultural fungicide or a salt thereof, wherein compounds (a) and (b) are applied for treatment simultaneously, sequentially or separately.

(8) The method according to (7), wherein the treatment is conducted by at least one selected from the group consisting of misting, spreading, dusting, spraying, dispersing, immersing, lavaging, inserting, sprinkling (exposing to water), bubbling, depositing, dressing, coating, blowing, fumigating, smoking, hazing and painting.

(9) The method according to (7) or (8), wherein the vicinity of the plant is at least one selected from the group consisting of soil, rice paddy, water for hydroponic cultivation, and cultivation materials.

(10) The method according to any one of (7) to (9), wherein the compound of formula [1] is selected from:
4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine,
4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine,
4-[4-(6-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine, and
4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine, or
mixtures thereof.

(11) The method according to any one of (7) to (10), wherein component (b) comprises at least one compound selected from benthiavalicarb, valifenalate, zoxamide, famoxadone, iprovalicarb, fenamidone, fluopicolide, ametoctradin, cyazofamid, mandipropamid, metalaxyl-M, ethaboxam, dimethomorph, cymoxanil, basic copper sulfate, chlorothalonil, mancozeb, propineb, captan, kresoxim-methyl, azoxystrobin, trifloxystrobin, fluazinam, pyribencarb, penthiopyrad, quinoxyfen, pyriofenone, propamocarb, fosetyl-aluminum, iminoctadine, fludioxonil, thiophanate-methyl, iprodione, tebuconazole, cyprodinil, amisulbrom, tricyclazole, polyoxin, tebufloquin, propiconazole, oxathiapiprolin, or salts thereof.

Advantageous Effects of Invention

The fused 11-membered compounds as represented by formula [1], per se, exhibit outstanding control effects against pests, namely, pathogenic fungi that attack agricultural and horticultural plants, but those compounds, when used in the form of fungicidal composition according to the present invention, exhibit outstanding synergism.

DESCRIPTION OF EMBODIMENTS

Hereunder, the present invention will be described in detail.

In the present invention, the aforementioned fused 11-membered compound encompasses not only fused 11-membered compounds as represented by formula [1], but also salts of said compounds, as well as N-oxides of the fused 11-membered compounds as represented by formula [1]. As referred to above, the salts are not particularly limited, and examples of the salts include salts that are acceptable in agricultural chemical production, and specifically include, but are not limited to, sodium salt, potassium salt, magnesium salt, calcium salt, and aluminum salt. In addition, all possible stereoisomers or enantiomers that exist for the compounds of the present invention are included in the scope of the fused 11-membered compound of formula [1].

The fused 11-membered compound of the present invention can be used in an amorphous or crystalline form or in the form of a solid, solution or suspension in which a hydrate or solvate is formed. Also, the fused 11-membered compound of the present invention may be used as a mixture with other component, or may be used as a mixture of compounds of formula [1], in particular, as a mixture of enantiomers (e.g., racemates) thereof or as a mixture of diastereomers thereof.

Formula [1] provides a general definition of the fused 11-membered compound that can be used in the present invention. Preferred definitions of the groups relating to the formula shown hereabove and hereunder are provided below. These definitions are applied to not only the final product as represented by formula [1] but also to all intermediates thereof.

The following describes preferred modes of the compound of formula [1].

T is preferably CH.

$R^1$ is preferably a hydrogen atom.

$R^2$, $R^3$, $R^4$ and $R^5$ are each preferably a hydrogen atom or methyl, more preferably a hydrogen atom.

The number n is preferably 0 (that is, $R^6$ is preferably absent).

Each of $X^1$, $X^2$, $X^3$ and $X^4$ is independently preferably a hydrogen atom, a halogen atom, cyano, hydroxy, nitro, formyl, $C_1$-$C_4$ alkyl, $C_1$-$C_4$ haloalkyl, $C_1$-$C_4$ hydroxyalkyl, $C_1$-$C_4$ alkoxy, $C_1$-$C_4$ haloalkoxy, —$SR^{25}$, —$S(O)_2R^{21}$, —$OS(O)_2R^{21}$, $C_2$-$C_4$ alkylcarbonyloxy, $C_2$-$C_4$ alkoxycarbonyloxy, or —$C(=NOR^{28})R^{29}$; more preferably, at least one of $X^1$, $X^2$, $X^3$ and $X^4$ is —$OS(=O)_2R^{25}$; particularly preferably $X^1$ is —$OS(=O)_2R^{25}$, particularly preferably $X^2$ and $X^3$ are hydrogen atoms, particularly preferably $X^4$ is a hydrogen atom, nitro, a fluorine atom, a bromine atom, methyl, methoxy, difluoromethoxy, trifluoromethoxy or —OS(O)$_2$R$^{25}$, and most preferably X$^4$ is a hydrogen atom, nitro, methyl, a fluorine atom or methoxy.

R$^{25}$ is preferably C$_1$-C$_4$ alkyl, cyclopropyl or C$_1$-C$_4$ haloalkyl, more preferably methyl.

R$^{28}$ is preferably a hydrogen atom or C$_1$-C$_4$ alkyl, more preferably a hydrogen atom or methyl.

R$^{29}$ is preferably a hydrogen atom or C$_1$-C$_4$ alkyl, more preferably a hydrogen atom or methyl.

Each of R$^7$ and R$^8$ is independently preferably C$_1$-C$_4$ alkyl, a halogen atom, or C$_1$-C$_4$ haloalkyl, more preferably methyl, difluoromethyl, trifluoromethyl, or a chlorine atom.

R$^9$ and R$^{10}$ are preferably hydrogen atoms.

G$^1$ is preferably an oxygen atom.

The above-given definitions and explanations of general or preferred scopes of groups may be combined as necessary. In other words, each scope may be combined with a preferred scope. Those scopes are applied to both the final product and its corresponding precursors and intermediates.

A preferred mode of the compound is a compound represented by formula [1] {wherein R$^7$ is trifluoromethyl, and R$^8$ represents methyl}.

Further, another preferred mode of the compound is a compound represented by formula [1] {wherein R$^7$ and R$^8$ each represent trifluoromethyl}.

Further, another preferred mode of the compound is a compound represented by formula [11] {wherein R$^7$ and R$^8$ each represent difluoromethyl}.

Further, another preferred mode of the compound is a compound represented by formula [1] {wherein R$^7$ and R$^8$ each represent methyl}.

Further, another preferred mode of the compound is a compound represented by formula [1] {wherein R$^7$ and R$^8$ each represent a chlorine atom}.

Further, another preferred mode of the compound is a compound represented by formula [1] {wherein at least one of X$^1$, X$^2$, X$^3$ and X$^4$ represents methylsulfonyloxy}.

Further, another preferred mode of the compound is a compound represented by formula [1] {wherein X$^1$ is methylsulfonyloxy, and X$^2$, X$^3$ and X$^4$ each represent a hydrogen atom}.

Further, another preferred mode of the compound is a compound represented by formula [1] {wherein X$^1$ is methylsulfonyloxy, X$^2$ and X$^3$ are each a hydrogen atom, and X$^4$ represents a fluorine atom}.

Further, another preferred mode of the compound is a compound represented by formula [1] {wherein X$^1$ is methylsulfonyloxy, X$^2$ and X$^3$ are each a hydrogen atom, and X$^4$ represents a chlorine atom}.

Further, another preferred mode of the compound is a compound represented by formula [1] {wherein X$^1$ is methylsulfonyloxy, X$^2$ and X$^3$ are each a hydrogen atom, and X$^4$ represents a bromine atom}.

Further, another preferred mode of the compound is a compound represented by formula [1] {wherein X$^1$ is methylsulfonyloxy, X$^2$ and X$^3$ are each a hydrogen atom, and X$^4$ represents methoxy}.

Further, another preferred mode of the compound is a compound represented by formula [1] {wherein X$^1$ is methylsulfonyloxy, X$^2$ and X$^3$ are each a hydrogen atom, and X$^4$ represents cyano}.

Further, another preferred mode of the compound is a compound represented by formula [1] {wherein X$^1$ is methylsulfonyloxy, X$^2$ and X$^3$ are each a hydrogen atom, and X$^4$ represents nitro}.

Further, another preferred mode of the compound is a compound represented by formula [1] {wherein X$^1$ is methylsulfonyloxy, X$^2$ and X$^3$ are each a hydrogen atom, and X$^4$ represents trifluoromethoxy}.

Further, another preferred mode of the compound is a compound represented by formula [1] {wherein X$^1$ and X$^4$ are each methylsulfonyloxy, and X$^2$ and X$^3$ each represent a hydrogen atom}.

The terms used in the present specification are described below.

"Halogen atom" encompasses a fluorine atom, a chlorine atom, a bromine atom, or an iodine atom.

The notation of a symbol of element combined with a numerical subscript, like "C$_1$-C$_6$", indicates that the number of elements in the group that follows the notation is within a range defined by the numerical subscripts. For example, the above-given notation shows that the number of carbon atoms is in the range of 1 to 6, and the notation of "C$_2$-C$_6$" shows that the number of carbon atoms is in the range of 2 to 6.

The notation of a composite substituent following the notation of a symbol of element combined with a numerical subscript, like "C$_1$-C$_6$", indicates that the number of elements in the whole of the composite substituent is within a range defined by the numerical subscripts. For example, "C$_4$-C$_8$ cycloalkylcarbonyloxy" shows that the number of carbon atoms in the whole of cycloalkylcarbonyloxy is in the range of 4 to 8, and encompasses a cyclopropylcarbonyl group, for example. Further, "C$_2$-C$_8$ cyanoalkyl" shows that the number of carbon atoms in the whole of cyanoalkyl is in the range of 2 to 8. "C$_2$-C$_8$ cyanoalkyl" may contain one or more cyano groups, and encompasses a cyanomethyl group, for example.

"Alkyl" means, for example, a straight-chain or branched-chain alkyl with 1-8 carbon atoms, preferably 1-6 carbon atoms. Examples include, but are not limited to, methyl, ethyl, n-propyl, isobutyl, n-butyl, sec-butyl, isobutyl, tert-butyl, n-pentyl, 1-methylbutyl, 2-methylbutyl, 3-methylbutyl, 1-ethylpropyl, 1,1-dimethylpropyl, 1,2-dimethylpropyl, neopentyl, n-hexyl, 1-methylpentyl, 2-methylpentyl, 3-methylpentyl, 4-methylpentyl, 1-ethylbutyl, 2-ethylbutyl, 1,1-dimethylbutyl, 1,2-dimethylbutyl, 1,3-dimethylbutyl, 2,2-dimethylbutyl, 2,3-dimethylbutyl, 3,3-dimethylbutyl, 1,1,2-trimethylpropyl, 1,2,2-trimethylpropyl, 1-ethyl-1-methylpropyl, and 1-ethyl-2-methylpropyl. This definition is also applied to alkyls that constitute a part of a composite substituent such as haloalkyl, alkylthio, alkylcarbonyl, or alkylsulfonyloxy, unless otherwise defined. For example, in a composite substituent that contains alkyl at its terminal, as exemplified by alkylcycloalkyl, the cycloalkyl moiety may be independently mono-substituted or poly-substituted by the same or a different alkyl. The same is true of other composite substituents containing other group, such as alkenyl, alkoxy, hydroxy, or a halogen atom, at its terminal.

"Cycloalkyl" means, for example, a cycloalkyl having a branched chain with 3-8 carbon atoms, preferably 3-6 carbon atoms. Examples include, but are not limited to, cyclopropyl, 1-methylcyclopropyl, 2-methylcyclopropyl, cyclobutyl, cyclopentyl, cyclohexyl, and 4,4-dimethylcyclohexyl. This definition is also applied to cycloalkyls that constitute a part of a composite substituent such as halocycloalkyl, unless otherwise defined.

"Cycloalkenyl" means, for example, a cycloalkenyl having a branched chain with 3-8 carbon atoms, preferably 3-6 carbon atoms. Examples include, but are not limited to, cyclopropenyl, 1-methylcyclopropenyl, cyclobutenyl, cyclopentenyl, and cyclohexenyl. This definition is also applied to cycloalkenyls that constitute a part of a composite substituent such as halocycloalkenyl, unless otherwise defined.

"Cycloalkoxy" means, for example, a cycloalkoxy having a branched chain with 3-8 carbon atoms, preferably 3-6 carbon atoms. Examples include, but are not limited to, cyclopropyloxy, 1-methylcyclopropyloxy, cyclobutyloxy, cyclopentyloxy, and cyclohexyloxy. This definition is also applied to cycloalkoxys that constitute a part of a composite substituent such as halocycloalkoxy, unless otherwise defined.

The term "halo" as used in groups named "halo . . . " (e.g., "haloalkyl") encompasses fluorine, chlorine, bromine and iodine. The halo-substitution expressed by the prefix "halo" encompasses mono-substitution or poly-substitution, preferably mono-substitution, di-substitution and tri-substitution.

"Haloalkyl" means, for example, a straight-chain or branched-chain alkyl with 1-6 carbon atoms, wherein hydrogen atoms in the group are partially or wholly substituted with a halogen atom. Examples include, but are not limited to, fluoromethyl, chloromethyl, bromomethyl, iodomethyl, difluoromethyl, dichloromethyl, dibromomethyl, diiodomethyl, trifluoromethyl, trichloromethyl, tribromomethyl, triiodomethyl, 1-chloroethyl, 1-bromoethyl, 2-trifluoroethyl, 3-chloropropyl, 3-bromopropyl, 4-chlorobutyl, 4-bromobutyl, 4-trifluorobutyl, 5-chloropentyl, and 6-chlorohexyl. This definition is also applied to haloalkyls that constitute a part of a composite substituent such as haloalkylcarbonyl, unless otherwise defined.

"Alkenyl" means, for example, a straight-chain or branched-chain alkenyl with 2-6 carbon atoms. Examples include, but are not limited to, vinyl, 1-propenyl, 2-propenyl, isopropenyl, 3-butenyl, 1,3-butadienyl, 4-pentenyl, and 5-hexenyl. This definition is also applied to alkenyls that constitute a part of a composite substituent such as haloalkenyl, unless otherwise defined.

"Alkynyl" means, for example, a straight-chain or branched-chain alkynyl with 2-6 carbon atoms. Examples include, but are not limited to, ethynyl, 1-propynyl, 2-propynyl, 3-butynyl, 1-methyl-3-propynyl, 4-pentynyl, and 5-hexynyl. This definition is also applied to alkynyls that constitute a part of a composite substituent such as haloalkynyl, unless otherwise defined.

"Alkoxy" means, for example, a straight-chain or branched-chain alkoxy with 1-6 carbon atoms. Examples include, but are not limited to, methoxy, ethoxy, propoxy, isopropoxy, butoxy, isobutoxy, sec-butoxy, tert-butoxy, pentyloxy, and hexyloxy. This definition is also applied to alkoxys that constitute a part of a composite substituent such as haloalkoxy or alkoxycarbonyl, unless otherwise defined.

"Haloalkoxy" means, for example, a straight-chain or branched-chain alkoxy with 1-6 carbon atoms, which is substituted with 1 or more, preferably 1-10 halogen atoms. Examples include, but are not limited to, fluoromethoxy, chloromethoxy, bromomethoxy, iodomethoxy, difluoromethoxy, dichloromethoxy, dibromomethoxy, diiodomethoxy, trifluoromethoxy, trichloromethoxy, tribromomethoxy, triiodomethoxy, 1-chloroethoxy, 1-bromoethoxy, 2-trifluoroethoxy, 3-chloropropoxy, 3-bromopropoxy, 4-chlorobutoxy, 4-bromobutoxy, 4-trifluorobutoxy, 5-chloropentoxy, and 6-chlorohexyloxy. This definition is also applied to haloalkoxys that constitute a part of a composite substituent such as haloalkoxycarbonyl, unless otherwise defined.

"Alkylthio" means, for example, an (alkyl)-S— group with 1-6 carbon atoms, in which the alkyl moiety is as defined above. Examples include, but are not limited to, methylthio, ethylthio, n-propylthio, and isopropylthio. This definition is also applied to alkylthios that constitute a part of a composite substituent such as haloalkylthio, unless otherwise defined.

"Alkylsulfinyl" means, for example, an (alkyl)-SO— group with 1-6 carbon atoms, in which the alkyl moiety is as defined above. Examples include, but are not limited to, methylsulfinyl, ethylsulfinyl, n-propylsulfinyl, and isopropylsulfinyl. This definition is also applied to alkylsulfinyls that constitute a part of a composite substituent such as haloalkylsulfinyl, unless otherwise defined.

"Alkylsulfonyl" means, for example, an (alkyl)-$SO_2$— group with 1-6 carbon atoms, in which the alkyl moiety is as defined above. Examples include, but are not limited to, methylsulfonyl, ethylsulfonyl, n-propylsulfonyl, and isopropylsulfonyl. This definition is also applied to alkylsulfonyls that constitute a part of a composite substituent such as haloalkylsulfonyl, unless otherwise defined.

"Hydroxyalkyl" means a straight-chain or branched-chain alkyl group with 1-6 carbon atoms, which is substituted with 1-5 hydroxy groups. Examples include, but are not limited to, hydroxymethyl, hydroxyethyl, hydroxypropyl, or hydroxyisopropyl.

"Alkylsulfonyloxy" means, for example, an (alkyl)-$S(O)_2$O— group with 1-6 carbon atoms, in which the alkyl moiety is as defined above. Examples include, but are not limited to, methylsulfonyloxy, ethylsulfonyloxy, n-propylsulfonyloxy, and isopropylsulfonyloxy. This definition is also applied to alkylsulfonyloxys that constitute a part of a composite substituent such as haloalkylsulfonyloxy, unless otherwise defined.

"Alkylcarbonyl" means, for example, an (alkyl)-C(=O)— group, in which the alkyl moiety is as defined above. Examples include, but are not limited to, formyl, acetyl, propionyl, butyryl, and pivaloyl. This definition is also applied to alkylcarbonyls that constitute a part of a composite substituent such as haloalkylcarbonyl, unless otherwise defined.

"Alkylcarbonyloxy" means, for example, an (alkyl)-C(=O)O— group, in which the alkyl moiety is as defined above. Examples include, but are not limited to, methylcarbonyloxy, ethylcarbonyloxy, and propylcarbonyloxy. This definition is also applied to alkylcarbonyloxys that constitute a part of a composite substituent such as haloalkylcarbonyloxy, unless otherwise defined.

The acid used in the reactions according to the present invention refers to, unless otherwise mentioned, a Bronsted acid that releases protons in the reaction system. Examples include inorganic acids such as hydrochloric acid, hydrobromic acid, and sulfuric acid, and organic acids such as acetic acid, trifluoroacetic acid, para-toluenesulfonic acid, and trifluoromethanesulfonic acid. The Lewis acid used in the reactions according to this invention refers to a compound functioning as an electron pair receptor in the reaction system other than a hydrogen ion, and examples include, but are not limited to, zinc chloride, aluminum chloride, tin chloride, boron trichloride, boron trifluoride, and trimethylsilyl trifluoromethanesulfonate.

The base used in the reactions according to the present invention refers to, unless otherwise mentioned, a compound that receives protons in the reaction system, or a compound functioning as an electron pair donor in the reaction system. Example include: organic amines such as triethylamine, pyridine, 4-dimethylaminopyridine, N,N-dimethylaniline, and 1,8-diazabicyclo[5,4,0]-7-undecene; metal carbonates such as sodium carbonate, potassium carbonate, magnesium carbonate, and calcium carbonate; metal hydrogen carbonates such as sodium hydrogen carbonate, and potassium hydrogen carbonate; metal carboxylates, typified by metal acetates such as sodium acetate, potassium acetate, calcium acetate, and magnesium acetate; metal alkoxides such as sodium methoxide, sodium ethoxide, sodium tert-butoxide, potassium methoxide, and potassium tert-butoxide; metal hydroxides such as sodium hydroxide, potassium hydroxide, calcium hydroxide, and magnesium hydroxide; and metal hydrides such as lithium hydride, sodium hydride, and calcium hydride.

The following notations used in the tables in the present specification indicate the groups defined below:
E.g.,
Me: Methyl group,
Et: Ethyl group,
n-Pr: n-Propyl group,
i-Pr: Isopropyl group,
c-Pr: Cyclopropyl group,
n-Bu: n-Butyl group,
i-Bu: Isobutyl group,
t-Bu: tert-Butyl group,
n-Hex: n-Hexyl group,
Ph: Phenyl group,
Bn: Benzyl group.

Exemplary production methods for the compound of formula [1] of the present invention are given below, but these methods are not the sole examples.

<Production Method 1>

The compound of formula [1] of the present invention can be produced by a method based on the reaction scheme mentioned below.

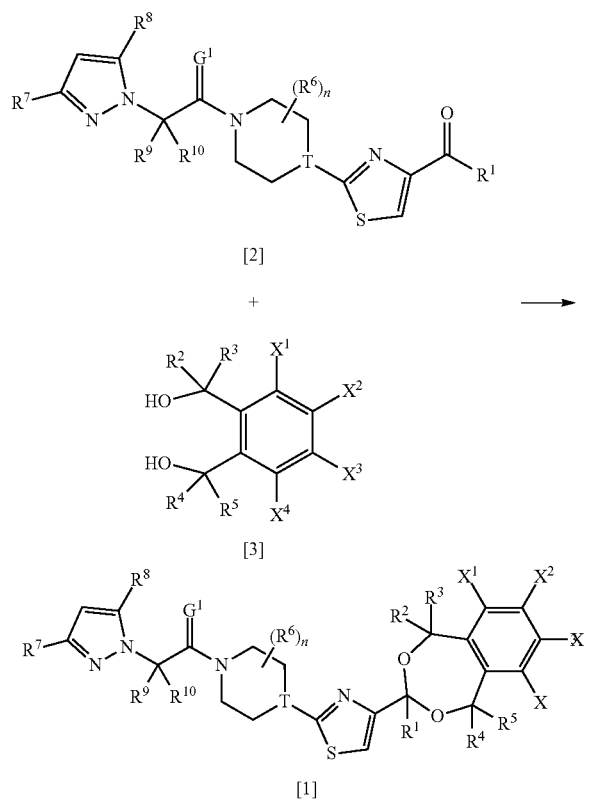

(wherein each of $R^1$, $R^2$, $R^3$, $R^4$, $R^5$, $R^6$, $R^7$, $R^8$, $R^9$, $R^1$, $G^1$, $X^1$, $X^2$, $X^3$, $X^4$, T and n is as defined in [1]).

The compound of formula [1] of the €present invention can be produced by reacting the compound of formula [2] and the compound of formula [3] in a solvent in the presence of an acid or Lewis acid, preferably in the presence of an acid.

The amount of the compound of formula [3] used in this reaction can be selected as appropriate from the range of 1.0 to 10 mol relative to 1 mol of the compound of formula [2], with said amount being preferably in the range of 1.0 to 3.0 mol.

Examples of the acid that can be used in this step include, but are not limited to: inorganic acids such as hydrochloric acid, hydrobromic acid, and sulfuric acid; and organic acids such as acetic acid, trifluoroacetic acid, p-toluenesulfonic acid, and trifluoromethanesulfonic acid.

Examples of the Lewis acid that can be used in this step include, but are not limited to, zinc chloride, aluminum chloride, tin chloride, boron trichloride, boron trifluoride, and trimethylsilyl trifluoromethanesulfonate.

The amount of the acid or Lewis acid used can be selected as appropriate from the range of 0.01 to 5 mol relative to 1 mol of the compound of formula [2], with said amount being preferably in the range of 0.1 to 1.0 mol.

The solvent that can be used in this step can be of any type, as long as it does not inhibit the progress of this reaction. Examples include, but are not limited to: nitriles such as acetonitrile; ethers such as diethyl ether, diisopropyl ether, tetrahydrofuran, dioxane, monoglyme, and diglyme; halogenated hydrocarbons such as dichloromethane, dichloroethane, chloroform, carbon tetrachloride, and tetrachloroethane; aromatic hydrocarbons such as benzene, chlorobenzene, nitrobenzene, and toluene; amides such as N,N-dimethylformamide, and N,N-dimethylacetamide; imidazolinone such as 1,3-dimethyl-2-imidazolinone; and sulfur compounds such as dimethyl sulfoxide; as well as mixed solvents of the foregoing.

The amount of the solvent used can be selected as appropriate from the range of 0.01 to 100 L relative to 1 mol of the compound of formula [2], with said amount being preferably in the range of 0.1 to 10 L.

The reaction temperature can be selected from −20° C. to the boiling point range of the inactive solvent used, with said temperature being preferably in the range of 0° C. to 150° C.

The reaction time varies with the reaction temperature, reaction substrate, reaction amount, etc., but is generally in the range of 10 min. to 48 h.

After completion of the reaction, the compound of formula [1], which is a reaction product of interest, is collected from the reaction system according to a conventional method and may be, as necessary, purified by a procedure such as column chromatography or recrystallization.

<Production Method 2>

The compound of formula [1] of the present invention can also be produced by a method based on the reaction scheme mentioned below.

[Chem. 3]

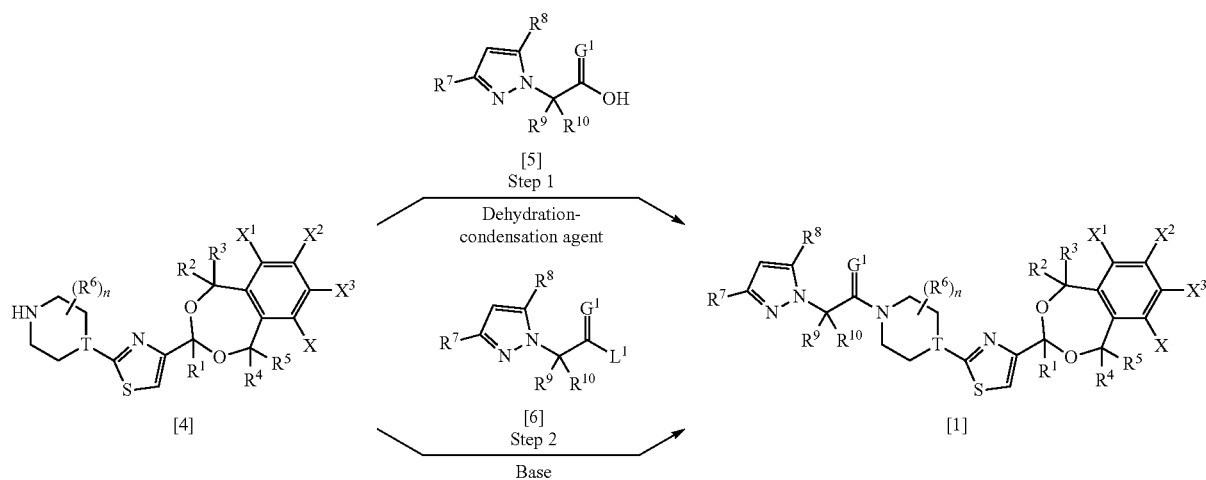

(wherein each of $R^1$, $R^2$, $R^3$, $R^4$, $R^5$, $R^6$, $R^7$, $R^8$, $R^9$, R, G, X, $X^2$, $X^3$, $X^4$, T and n is as defined in (1), and $L^1$ represents a halogen atom such as a chlorine atom or a bromine atom.)

(Step 1)

The compound of formula [1] can also be produced by reacting the compound of formula [4] and the compound of formula [5] in a solvent in the presence/absence of a base, and in the presence of a dehydration-condensation agent.

The amount of the compound of formula [5] used in this step can be selected as appropriate from the range of 0.50 to 10 mol relative to 1 mol of the compound of formula [4], with said amount being preferably in the range of 1.0 to 1.2 mol.

Examples of the dehydration-condensation agent that can be used in this step include, but are not limited to, dicyclohexylcarbodiimide (DCC), N-(3-dimethylaminopropyl)-N'-ethylcarbodiimide (EDC or WSC), N,N-carbonyldiimidazole, 2-chloro-1,3-dimethylimidazolium chloride, and 2-chloro-1-pyridinium iodide.

The amount of the dehydration-condensation agent used in this reaction can be selected as appropriate from the range of 1.0 to 10 mol relative to 1 mol of the compound of formula [4], with said amount being preferably in the range of 1.0 to 3.0 mol.

Examples of the base that can be used in this step include, but are not limited to: organic amines such as triethylamine, pyridine, 4-dimethylaminopyridine, N,N-dimethylaniline, and 1,8-diazabicyclo[5,4,0]-7-undecene; metal carbonates such as sodium carbonate, potassium carbonate, magnesium carbonate, and calcium carbonate; metal hydrogen carbonates such as sodium hydrogen carbonate, and potassium hydrogen carbonate; metal carboxylates, typified by metal acetates such as sodium acetate, potassium acetate, calcium acetate, and magnesium acetate; metal alkoxides such as sodium methoxide, sodium ethoxide, sodium tert-butoxide, potassium methoxide, and potassium tert-butoxide; metal hydroxides such as sodium hydroxide, potassium hydroxide, calcium hydroxide, and magnesium hydroxide; and metal hydrides such as lithium hydride, sodium hydride, and calcium hydride.

The amount of the base used in this reaction can be selected as appropriate from the range of 0 to 100 mol relative to 1 mol of the compound of formula [4], with said amount being preferably in the range of 0 to 10 mol.

Examples of the solvent that can be used in this step include those described in Production Method 1.

The amount of the solvent used can be selected as appropriate from the range of 0.01 to 100 L relative to 1 mol of the compound of formula [4], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

(Step 2)

The compound of formula [1] can also be produced by reacting the compound of formula [4] and the compound of formula [6] in a solvent in the presence of a base.

The amount of the compound of formula [6] used in this step can be selected as appropriate from the range of 0.50 to 10 mol relative to 1 mol of the compound of formula [4], with said amount being preferably in the range of 1.0 to 1.2 mol.

Examples of the base that can be used in this step include those described in Step 1.

The amount of the base used in this reaction can be selected as appropriate from the range of 0 to 100 mol relative to 1 mol of the compound of formula [4], with said amount being preferably in the range of 0 to 10 mol.

Examples of the solvent that can be used in this step include those described in Production Method 1.

The amount of the solvent used can be selected as appropriate from the range of 0.01 to 100 L relative to 1 mol of the compound of formula [4], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

After completion of the reaction, the compound of formula [1], which is a reaction product of interest, is collected from the reaction system according to a conventional method and may be, as necessary, purified by a procedure such as column chromatography or recrystallization.

<Intermediate Production Method 1>

[Chem. 4]

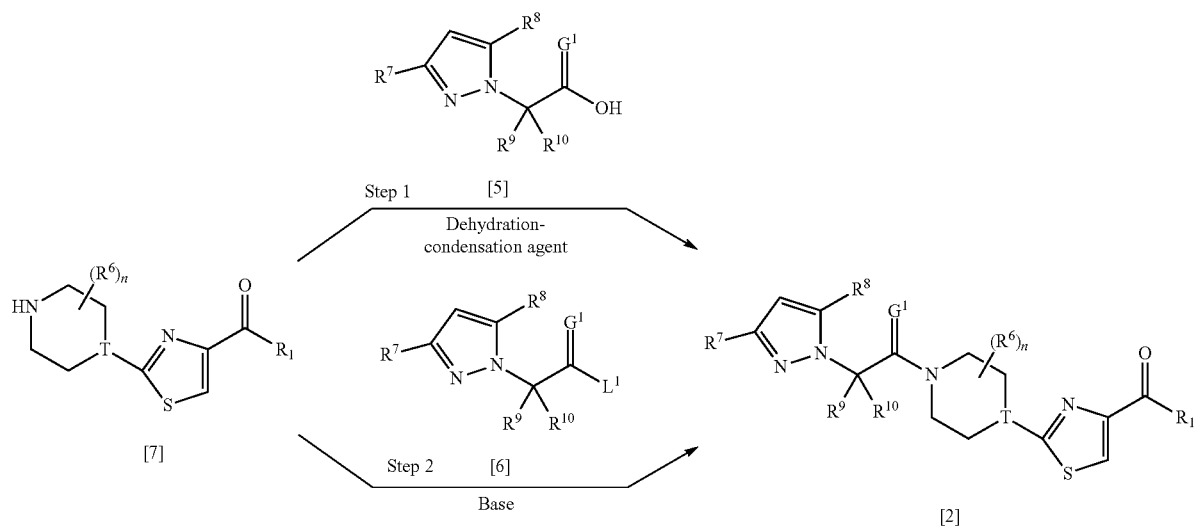

(wherein each of $R^1$, $R^6$, $R^7$, $R^8$, $R^9$, $R^{10}$, $G^1$, T and n is as defined in (1), and $L^1$ is a halogen atom such as a chlorine atom or a bromine atom).

(Step 1)

The compound of formula [2] can be produced by reacting the compound of formula [7] (which can be produced as typically described in WO 2008/013622) and the compound of formula [5] in a solvent in the presence/absence of a base and in the presence of a dehydration-condensation agent.

The amount of the compound of formula [5] used in this step can be selected as appropriate from the range of 0.5 to 10 mol relative to 1 mol of the compound of formula [7], with said amount being preferably in the range of 1.0 to 1.2 mol.

Examples of the dehydration-condensation agent and base that can be used in this step include those described in Step 1 of Production Method 2.

The amount of the dehydration-condensation agent used in this reaction can be selected as appropriate from the range of 1.0 to 10 mol relative to 1 mol of the compound of formula [7], with said amount being preferably in the range of 1.0 to 3.0 mol.

The amount of the base used in this reaction can be selected as appropriate from the range of 0 to 100 mol relative to 1 mol of the compound of formula [7], with said amount being preferably in the range of 0 to 10 mol.

Examples of the solvent that can be used in this step include those described in Production Method 1.

The amount of the solvent used in this reaction can be selected as appropriate from the range of 0.01 to 100 L relative to 1 mol of the compound of formula [7], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

(Step 2)

The compound of formula [2] can also be produced by reacting the compound of formula [7] and the compound of formula [6] in a solvent in the presence of a base.

The amount of the compound of formula [6] used in this step can be selected as appropriate from the range of 0.5 to 10 mol relative to 1 mol of the compound of formula [7], with said amount being preferably in the range of 1.0 to 1.2 mol.

Examples of the base that can be used in this step include those described in Step 1 of Production Method 2.

The amount of the base used in this reaction can be selected as appropriate from the range of 0 to 100 mol relative to 1 mol of the compound of formula [7], with said amount being preferably in the range of 0 to 10 mol.

Examples of the solvent that can be used in this step include those described in Production Method 1.

The amount of the solvent used in this step can be selected as appropriate from the range of 0.01 to 100 L relative to 1 mol of the compound of formula [7], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

After completion of the reaction, the compound of formula [2], which is a reaction product of interest, is collected from the reaction system according to a conventional method and may be, as necessary, purified by a procedure such as column chromatography or recrystallization.

<Intermediate Production Method 2>

[Chem. 5]

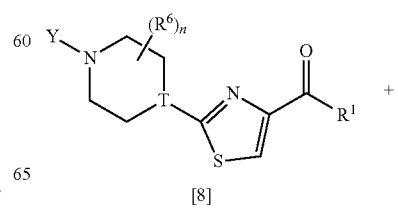

+

17

-continued

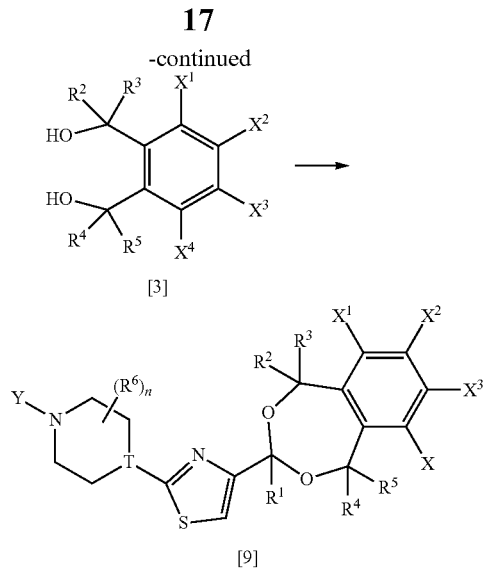

[3]

[9]

(wherein each of $R^1$, $R^2$, $R^3$, $R^4$, $R^5$, $R^6$, $X^1$, $X^2$, $X^3$, $X^4$, T and n is as defined in (1), and Y represents an amine protective group such as 1,1-dimethylethyloxycarbonyl or benzyl).

The compound of formula [4] can be prepared by deprotecting the compound of formula [9] using an appropriate method (as for a method of obtaining an amine protective group, refer to, for example, T. W. Greene and P. G. Wuts, Protective Groups in Organic Synthesis, ed. 4, Wiley, New York, 2007). There are a wide variety of protective groups suitable as amine protective groups, and appropriate options for protective groups would be obvious to those skilled in the field of chemical synthesis. After deprotection, the amine of formula [4] can be isolated as an acid salt or a free amine by a basic method well known in the conventional art.

The compound of the present invention of formula [9] can be produced by reacting the compound of formula [8] and the compound of formula [3] in a solvent in the presence of an acid or Lewis acid.

The amount of the compound of formula [3] used in this method can be selected as appropriate from the range of 1.0 to 10 mol relative to 1 mol of the compound of formula [8], with said amount being preferably in the range of 1.0 to 3.0 mol.

Examples of the acid or Lewis acid and solvent that can be used in this method include those described in Production Method 1.

The amount of the acid or Lewis acid used can be selected as appropriate from the range of 0.01 to 5 mol relative to 1 mol of the compound of formula [8], with said amount being preferably in the range of 0.1 to 1.0 mol.

The amount of the solvent used in this reaction can be selected as appropriate from the range of 0.01 to 100 L relative to 1 mol of the compound of formula [8], with said amount being preferably in the range of 0.1 to 10 L.

The reaction temperature can be selected from −20° C. to the boiling point range of the inactive solvent used, with said temperature being preferably in the range of 0° C. to 150° C.

The reaction time varies with the reaction temperature, reaction substrate, reaction amount, etc., but is generally in the range of 10 min. to 48 h.

After completion of the reaction, the compound of formula [9], which is a reaction product of interest, is collected from the reaction system according to a conventional method and may be, as necessary, purified by a procedure such as column chromatography or recrystallization.

<Intermediate Production Method 3>

[Chem. 6]

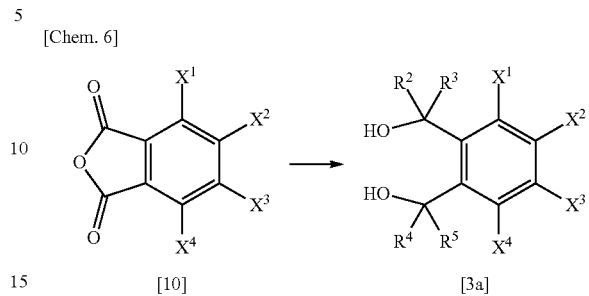

[10]                [3a]

(wherein each of $X^1$, $X^2$, $X^3$, and $X^4$ is as defined in (1)).

The compound of formula [3a] can be produced by reducing the compound of formula [10] in a solvent using a reducing agent.

Examples of the reducing agent that can be used in this step include, but are not limited to, lithium aluminum hydride, di-isobutyl aluminum hydride, and borane.

The amount of the reducing agent used can be selected as appropriate from the range of 1.0 to 10 mol relative to 1 mol of the compound of formula [10], with said amount being preferably in the range of 2.0 to 5.0 mol. Examples of the solvent that can be used in this step include those described in Production Method 1.

The amount of the solvent used can be selected as appropriate from the range of 0.01 to 100 L relative to 1 mol of the compound of formula [10], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

After completion of the reaction, the compound of formula [3a], which is a reaction product of interest, is collected from the reaction system according to a conventional method and may be, as necessary, purified by a procedure such as column chromatography or recrystallization.

<Intermediate Production Method 4>

[Chem. 7]

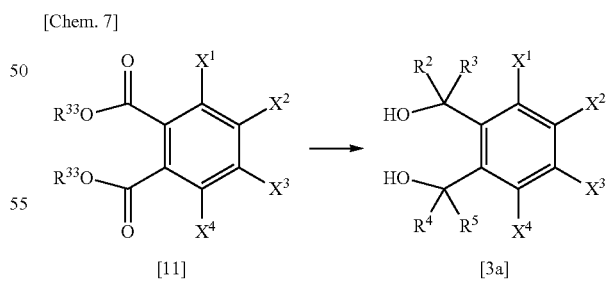

[11]                [3a]

(wherein each of $X^1$, $X^2$, $X^3$, and $X^4$ is as defined in (1), and $R^{33}$ represents a hydrogen atom or $C_1$-$C_4$ alkyl).

The compound of formula [3a] can also be produced by reducing the compound of formula [11] in a solvent using a reducing agent.

Examples of the reducing agent that can be used in this step include those described in Intermediate Production Method 3.

The amount of the reducing agent used can be selected as appropriate from the range of 1.0 to 10 mol relative to 1 mol of the compound of formula [11], with said amount being preferably in the range of 2.0 to 5.0 mol. Examples of the solvent that can be used in this step include those described in Production Method 1.

The amount of the solvent used can be selected as appropriate from the range of 0.01 to 100 L relative to 1 mol of the compound of formula [11], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

After completion of the reaction, the compound of formula [3a], which is a reaction product of interest, is collected from the reaction system according to a conventional method and may be, as necessary, purified by a procedure such as column chromatography or recrystallization.

<Intermediate Production Method 5>

[Chem. 8]

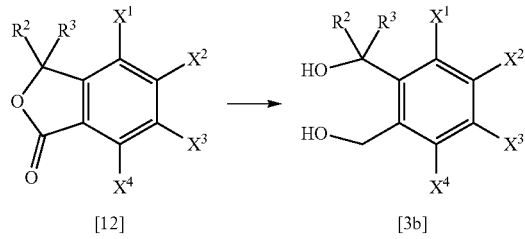

(wherein each of $R^2$, $R^3$, $X^1$, $X^2$, $X^3$, and $X^4$ is as defined in (1)).

The compound of formula [3b] can also be produced by reducing the compound of formula [12] in a solvent using a reducing agent.

Examples of the reducing agent that can be used in this step include those described in Intermediate Production Method 3.

The amount of the reducing agent used can be selected as appropriate from the range of 1.0 to 10 mol relative to 1 mol of the compound of formula [12], with said amount being preferably in the range of 1.0 to 3.0 mol. Examples of the solvent that can be used in this step include those described in Production Method 1.

The amount of the solvent used can be selected as appropriate from the range of 0.01 to 100 L relative to 1 mol of the compound of formula [12], with said amount being preferably in the range of 0.1 to 10 L.

The reaction temperature can be selected from −20° C. to the boiling point range of the inactive solvent used, with said temperature being preferably in the range of 0° C. to 100° C.

The reaction time varies with the reaction temperature, reaction substrate, reaction amount, etc., but is generally in the range of 10 min. to 48 h.

After completion of the reaction, the compound of formula [3b], which is a reaction product of interest, is collected from the reaction system according to a conventional method and may be, as necessary, purified by a procedure such as column chromatography or recrystallization.

It is presumed that some of the aforementioned reagents and reaction conditions for preparing the compound of formula [1] may not be compatible with the particular functional groups in the intermediate. In such cases, the desired product can be obtained by adopting a protection/deprotection technique or interconversion of functional groups in the process of synthesis. The usage of and options for protective groups would be obvious to those skilled in the field of chemical synthesis (refer to, for example, T. W. Greene and P. G. Wuts, *Protective Groups in Organic Synthesis*, ed. 4, Wiley, New York, 2007). Those skilled in the art would recognize that after a particular reagent is introduced as described in the individual schemes, any additional synthesis steps according to conventional methods, which are not described herein, are, in some cases, required to be conducted for achieving the synthesis of the compound of formula [1]. Those skilled in the art would also recognize that, in order to prepare the compound of formula [1], a combination of steps as mentioned in the schemes shown above may be required to be conducted in a different order than the particular proposed orders.

The compounds of formulas [1a] to [1j] having $X^1$ to $X^4$, as shown below in Tables 1 to 4, can each be prepared by using the methods described herein in combination with well-known methods in the conventional art.

[Chem. 9]

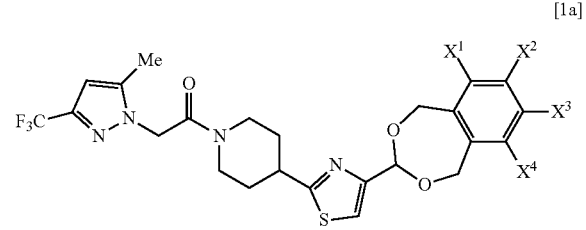

[1a]

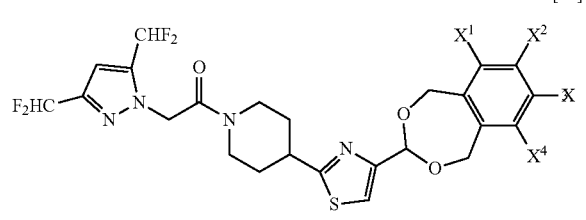

[1b]

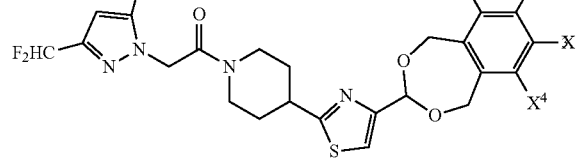

[1c]

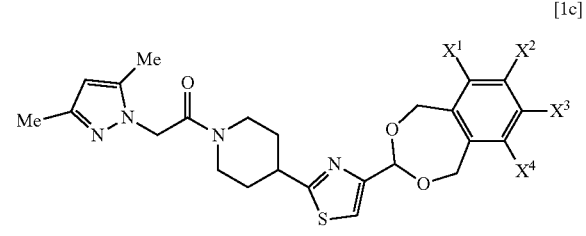

[1d]

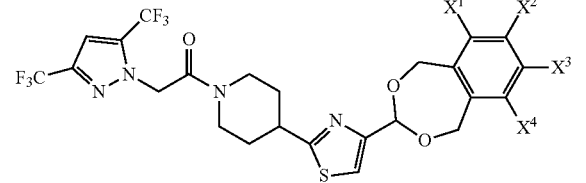

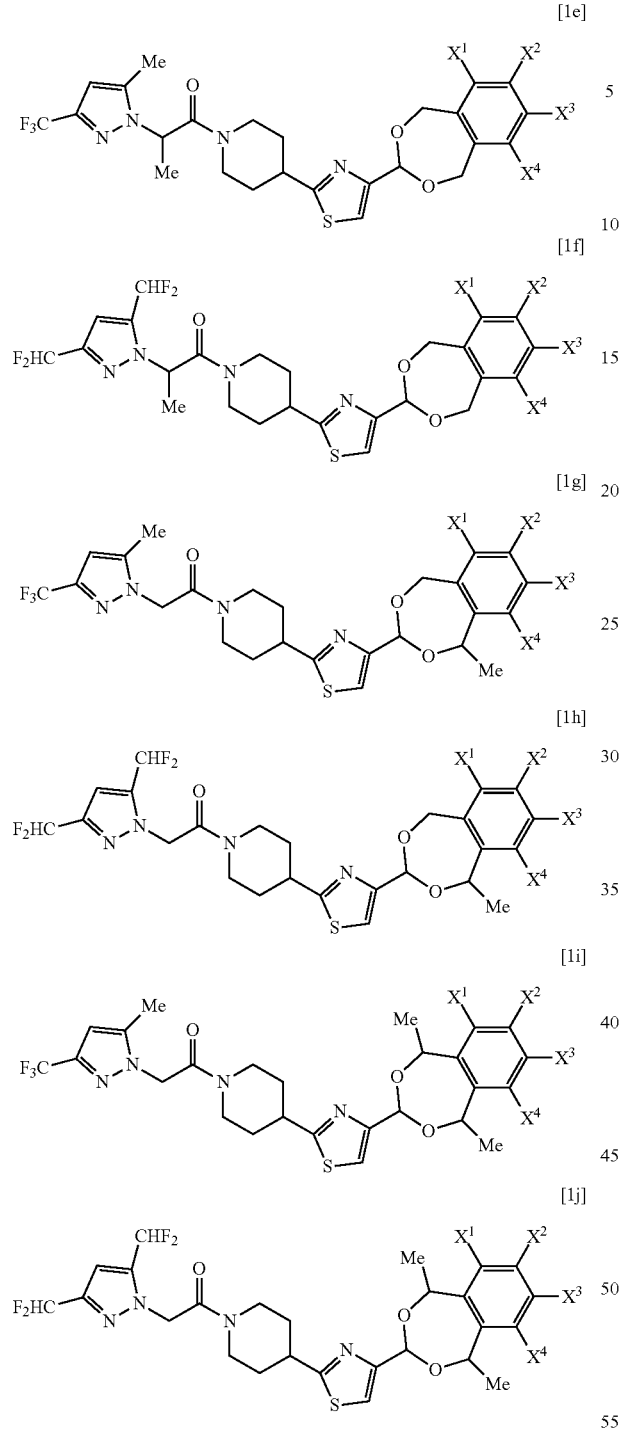

TABLE 1-continued

| X¹ | X² | X³ | X⁴ |
|---|---|---|---|
| n-Pr | H | H | H |
| i-Pr | H | H | H |
| n-Bu | H | H | H |
| i-Bu | H | H | H |
| t-Bu | H | H | H |
| $CF_3$ | H | H | H |
| $C_2F_5$ | H | H | H |
| OMe | H | H | H |
| OEt | H | H | H |
| $OCH_2C{\equiv}CH$ | H | H | H |
| $OCF_3$ | H | H | H |
| CN | H | H | H |
| $NO_2$ | H | H | H |
| OH | H | H | H |
| C(=NOMe)H | H | H | H |
| C(=NOMe)Me | H | H | H |
| $CO_2H$ | H | H | H |
| $CO_2Me$ | H | H | H |
| OCOMe | H | H | H |
| $OCO_2Me$ | H | H | H |
| $OCONMe_2$ | H | H | H |
| CHO | H | H | H |
| $NH_2$ | H | H | H |
| NHMe | H | H | H |
| $NMe_2$ | H | H | H |
| NHCOMe | H | H | H |
| $NHCO_2Me$ | H | H | H |
| c-Pr | H | H | H |
| SH | H | H | H |
| SMe | H | H | H |
| SOMe | H | H | H |
| $SO_2Me$ | H | H | H |
| $SO_2CF_3$ | H | H | H |
| $CH_2OMe$ | H | H | H |
| $CH_2SMe$ | H | H | H |
| $CH_2NMe_2$ | H | H | H |
| $SiMe_3$ | H | H | H |
| $OSiMe_3$ | H | H | H |
| $OSiMe_2t$-Bu | H | H | H |
| $CH_2CN$ | H | H | H |
| Ph | H | H | H |
| Bn | H | H | H |
| OPh | H | H | H |
| $CH{=}CH_2$ | H | H | H |
| $C{\equiv}CH$ | H | H | H |
| $NHSO_2Me$ | H | H | H |
| F | H | H | F |
| F | H | H | Cl |
| F | H | H | Br |
| F | H | H | I |
| F | H | H | Me |
| F | H | H | Et |
| F | H | H | n-Pr |
| F | H | H | i-Pr |
| F | H | H | n-Bu |
| F | H | H | i-Bu |
| F | H | H | t-Bu |
| F | H | H | $CF_3$ |
| F | H | H | $C_2F_5$ |
| F | H | H | OMe |
| F | H | H | OEt |
| F | H | H | $OCH_2C{\equiv}CH$ |
| F | H | H | $OCF_3$ |
| F | H | H | CN |
| F | H | H | $NO_2$ |
| F | H | H | OH |
| F | H | H | C(=NOMe)H |
| F | H | H | C(=NOMe)Me |
| F | H | H | $CO_2H$ |
| F | H | H | $CO_2Me$ |
| F | H | H | OCOMe |
| F | H | H | $OCO_2Me$ |
| F | H | H | $OCONMe_2$ |
| F | H | H | CHO |
| F | H | H | $NH_2$ |
| F | H | H | NHMe |

TABLE 1

| X¹ | X² | X³ | X⁴ |
|---|---|---|---|
| H | H | H | H |
| F | H | H | H |
| Cl | H | H | H |
| Br | H | H | H |
| I | H | H | H |
| Me | H | H | H |
| Et | H | H | H |

TABLE 1-continued

| $X^1$ | $X^2$ | $X^3$ | $X^4$ |
|---|---|---|---|
| F | H | H | NMe$_2$ |
| F | H | H | NHCOMe |
| F | H | H | NHCO$_2$Me |

TABLE 2

| $X^1$ | $X^2$ | $X^3$ | $X^4$ |
|---|---|---|---|
| F | H | H | cPr |
| F | H | H | SH |
| F | H | H | SMe |
| F | H | H | SOMe |
| F | H | H | SO$_2$Me |
| F | H | H | SO$_2$CF$_3$ |
| F | H | H | CH$_2$OMe |
| F | H | H | CH$_2$SMe |
| F | H | H | CH$_2$NMe$_2$ |
| F | H | H | SiMe$_3$ |
| F | H | H | OSiMe$_3$ |
| F | H | H | OSiMe$_2$t-Bu |
| F | H | H | CH$_2$CN |
| F | H | H | Ph |
| F | H | H | Bn |
| F | H | H | OPh |
| F | H | H | CH=CH$_2$ |
| F | H | H | C≡CH |
| F | H | H | NHSO$_2$Me |
| H | F | H | H |
| F | F | H | H |
| F | H | F | H |
| F | F | F | H |
| F | F | F | F |
| H | F | F | H |
| Cl | H | H | Cl |
| Cl | Cl | H | H |
| Cl | H | Cl | H |
| Cl | Cl | Cl | H |
| Cl | Cl | Cl | Cl |
| Br | H | H | Br |
| Me | H | H | Me |
| OMe | H | H | OMe |
| CF$_3$ | H | H | CF$_3$ |
| OCF$_3$ | H | H | OCF$_3$ |
| CN | H | H | CN |
| SO$_2$Me | H | H | SO$_2$Me |
| H | Br | H | H |
| H | I | H | H |
| H | Me | H | H |
| H | OMe | H | H |
| H | CF$_3$ | H | H |
| H | OCF$_3$ | H | H |
| H | CN | H | H |
| H | NO$_2$ | H | H |
| H | OH | H | H |
| H | SO$_2$Me | H | H |
| H | C(=NOMe)H | H | H |
| H | C(=NOMe)Me | H | H |
| F | Cl | H | H |
| F | Br | H | H |
| F | I | H | H |
| F | Me | H | H |
| F | OMe | H | H |
| F | CF$_3$ | H | H |
| F | OCF$_3$ | H | H |
| F | CN | H | H |
| F | NO$_2$ | H | H |
| F | OH | H | H |
| F | SO$_2$Me | H | H |
| F | Cl | H | F |
| F | Br | H | F |
| F | I | H | F |
| F | Me | H | F |
| F | OMe | H | F |
| F | CF$_3$ | H | F |
| F | OCF$_3$ | H | F |

TABLE 2-continued

| $X^1$ | $X^2$ | $X^3$ | $X^4$ |
|---|---|---|---|
| F | CN | H | F |
| F | NO$_2$ | H | F |
| F | OH | H | F |
| F | SO$_2$Me | H | F |
| F | C(=NOMe)H | H | H |
| F | C(=NOMe)Me | H | H |
| F | H | Cl | H |
| F | H | Br | H |
| F | H | I | H |
| F | H | Me | H |
| F | H | OMe | H |
| F | H | CF$_3$ | H |
| F | H | OCF$_3$ | H |
| F | H | CN | H |
| F | H | NO$_2$ | H |
| F | H | OH | H |
| F | H | SO$_2$Me | H |
| F | H | C(=NOMe)H | H |
| F | H | C(=NOMe)Me | H |

TABLE 3

| $X^1$ | $X^2$ | $X^3$ | $X^4$ |
|---|---|---|---|
| H | Cl | Cl | H |
| H | Br | Br | H |
| H | I | I | H |
| OSO$_2$Me | H | H | H |
| OSO$_2$Et | H | H | H |
| OSO$_2$n-Pr | H | H | H |
| OSO$_2$i-Pr | H | H | H |
| OSO$_2$n-Bu | H | H | H |
| OSO$_2$Ph | H | H | H |
| OSO$_2$Bn | H | H | H |
| OSO$_2$Me | H | H | F |
| OSO$_2$Me | H | H | Cl |
| OSO$_2$Me | H | H | Br |
| OSO$_2$Me | H | H | I |
| OSO$_2$Me | H | H | Me |
| OSO$_2$Me | H | H | Et |
| OSO$_2$Me | H | H | n-Pr |
| OSO$_2$Me | H | H | i-Pr |
| OSO$_2$Me | H | H | n-Bu |
| OSO$_2$Me | H | H | i-Bu |
| OSO$_2$Me | H | H | t-Bu |
| OSO$_2$Me | H | H | CF$_3$ |
| OSO$_2$Me | H | H | C$_2$F$_5$ |
| OSO$_2$Me | H | H | OMe |
| OSO$_2$Me | H | H | OEt |
| OSO$_2$Me | H | H | OCH$_2$C≡CH |
| OSO$_2$Me | H | H | OCF$_3$ |
| OSO$_2$Me | H | H | CN |
| OSO$_2$Me | H | H | NO$_2$ |
| OSO$_2$Me | H | H | OH |
| OSO$_2$Me | H | H | C(=NOMe)H |
| OSO$_2$Me | H | H | C(=NOMe)Me |
| OSO$_2$Me | H | H | CO$_2$H |
| OSO$_2$Me | H | H | CO$_2$Me |
| OSO$_2$Me | H | H | OCOMe |
| OSO$_2$Me | H | H | OCO$_2$Me |
| OSO$_2$Me | H | H | OCONMe$_2$ |
| OSO$_2$Me | H | H | CHO |
| OSO$_2$Me | H | H | NH$_2$ |
| OSO$_2$Me | H | H | NHMe |
| OSO$_2$Me | H | H | NMe$_2$ |
| OSO$_2$Me | H | H | NHCOMe |
| OSO$_2$Me | H | H | NHCO$_2$Me |
| OSO$_2$Me | H | H | c-Pr |
| OSO$_2$Me | H | H | SH |
| OSO$_2$Me | H | H | SMe |
| OSO$_2$Me | H | H | SOMe |
| OSO$_2$Me | H | H | SO$_2$Me |
| OSO$_2$Me | H | H | SO$_2$CF$_3$ |
| OSO$_2$Me | H | H | CH$_2$OMe |
| OSO$_2$Me | H | H | CH$_2$SMe |

TABLE 3-continued

| X¹ | X² | X³ | X⁴ |
|---|---|---|---|
| OSO₂Me | H | H | CH₂NMe₂ |
| OSO₂Me | H | H | SiMe₃ |
| OSO₂Me | H | H | OSiMe₃ |
| OSO₂Me | H | H | OSiMe₂t-Bu |
| OSO₂Me | H | H | CH₂CN |
| OSO₂Me | H | H | Ph |
| OSO₂Me | H | H | Bn |
| OSO₂Me | H | H | OPh |
| OSO₂Me | H | H | CH=CH₂ |
| OSO₂Me | H | H | C≡CH |
| OSO₂Me | H | H | NHSO₂Me |
| OSO₂Me | H | H | OSO₂Me |
| H | OSO₂Me | H | H |
| H | OSO₂Et | H | H |
| H | OSO₂n-Pr | H | H |
| H | OSO₂i-Pr | H | H |
| H | OSO₂n-Bu | H | H |
| H | OSO₂Ph | H | H |
| H | OSO₂Bn | H | H |
| OSO₂Me | H | H | OSO₂Et |
| OSO₂Me | H | H | OSO₂n-Pr |
| OSO₂Me | H | H | OSO₂i-Pr |
| OSO₂Me | H | H | OSO₂n-Bu |
| OSO₂Me | H | H | OSO₂Ph |
| OSO₂Me | H | H | OSO₂Bn |
| OSO₂Me | OSO₂Me | H | H |
| OSO₂Me | OSO₂Et | H | H |
| OSO₂Me | OSO₂n-Pr | H | H |
| OSO₂Me | OSO₂i-Pr | H | H |
| OSO₂Me | OSO₂n-Bu | H | H |
| OSO₂Me | OSO₂Ph | H | H |
| OSO₂Me | OSO₂Bn | H | H |
| OSO₂Me | H | OSO₂Me | H |
| OSO₂Me | H | OSO₂Et | H |
| OSO₂Me | H | OSO₂n-Pr | H |

TABLE 4

| X¹ | X² | X³ | X⁴ |
|---|---|---|---|
| OSO₂Me | H | OSO₂i-Pr | H |
| OSO₂Me | H | OSO₂n-Bu | H |
| OSO₂Me | H | OSO₂Ph | H |
| OSO₂Me | H | OSO₂Bn | H |
| OSO₂Me | OSO₂Me | H | OSO₂Me |
| OSO₂Me | OSO₂Me | OSO₂Me | H |
| OSO₂Me | OSO₂Me | OSO₂Me | OSO₂Me |
| OSO₂Me | F | H | H |
| OSO₂Me | Cl | H | H |
| OSO₂Me | Br | H | H |
| OSO₂Me | I | H | H |
| OSO₂Me | Me | H | H |
| OSO₂Me | OMe | H | H |
| OSO₂Me | CF₃ | H | H |
| OSO₂Me | OCF₃ | H | H |
| OSO₂Me | CN | H | H |
| OSO₂Me | NO₂ | H | H |
| OSO₂Me | OH | H | H |
| OSO₂Me | SO₂Me | H | H |
| OSO₂Me | H | F | H |
| OSO₂Me | H | Cl | H |
| OSO₂Me | H | Br | H |
| OSO₂Me | H | I | H |
| OSO₂Me | H | Me | H |
| OSO₂Me | H | OMe | H |
| OSO₂Me | H | CF₃ | H |
| OSO₂Me | H | OCF₃ | H |
| OSO₂Me | H | CN | H |
| OSO₂Me | H | NO₂ | H |
| OSO₂Me | H | OH | H |
| OSO₂Me | H | SO₂Me | H |
| OSO₂Me | F | H | F |
| OSO₂Me | H | F | F |
| OSO₂Me | F | F | F |
| OSO₂Me | F | F | OSO₂Me |

TABLE 4-continued

| X¹ | X² | X³ | X⁴ |
|---|---|---|---|
| OSO₂Me | —CH₂CH₂CH₂— | | H |
| OSO₂Me | —CH₂CH₂CH₂CH₂— | | H |
| OSO₂Me | —CH=CH—CH=CH— | | H |
| OSO₂Me | —N=CH—CH=CH— | | H |
| OSO₂Me | —CH=N—CH=CH— | | H |
| OSO₂Me | —N=CH—N=CH— | | H |
| OSO₂Me | —NH—CH=CH— | | H |
| OSO₂Me | —O—CH=CH— | | H |
| OSO₂Me | —S—CH=CH— | | H |
| OSO₂Me | —O—CH=N— | | H |
| OSO₂Me | —CH₂CH₂CH₂— | | OSO₂Me |
| OSO₂Me | —CH₂CH₂CH₂CH₂— | | OSO₂Me |
| OSO₂Me | —CH=CH—CH=CH— | | OSO₂Me |
| OSO₂Me | —N=CH—CH=CH— | | OSO₂Me |
| OSO₂Me | —CH=N—CH=CH— | | OSO₂Me |
| OSO₂Me | —N=CH—N=CH— | | OSO₂Me |
| OSO₂Me | —NH—CH=CH— | | OSO₂Me |
| OSO₂Me | —O—CH=CH— | | OSO₂Me |
| OSO₂Me | —S—CH=CH— | | OSO₂Me |
| OSO₂Me | —O—CH=N— | | OSO₂Me |
| OSO₂Me | —CH₂CH₂CH₂— | | F |
| OSO₂Me | —CH₂CH₂CH₂CH₂— | | F |
| OSO₂Me | —CH=CH—CH=CH— | | F |
| OSO₂Me | —N=CH—CH=CH— | | F |
| OSO₂Me | —CH=N—CH=CH— | | F |
| OSO₂Me | —N=CH—N=CH— | | F |
| OSO₂Me | —NH—CH=CH— | | F |
| OSO₂Me | —O—CH=CH— | | F |
| OSO₂Me | —S—CH=CH— | | F |
| OSO₂Me | —O—CH=N— | | F |
| H | OSO₂Me | OSO₂Me | H |
| F | H | OSO₂Me | H |
| F | OSO₂Me | H | F |
| H | Me | Me | H |
| H | OMe | OMe | H |
| H | CF₃ | CF₃ | H |
| H | OCF₃ | OCF₃ | H |
| H | CN | CN | H |
| H | NO₂ | NO₂ | H |
| H | OH | OH | H |
| H | SO₂Me | SO₂Me | H |
| H | —CH₂CH₂CH₂— | | H |
| H | —CH₂CH₂CH₂CH₂— | | H |
| H | —CH=CH—CH=CH— | | H |
| H | —N=CH—CH=CH— | | H |
| H | —CH=N—CH=CH— | | H |
| H | —N=CH—N=CH— | | H |
| H | —NH—CH=CH— | | H |
| H | —O—CH=CH— | | H |
| H | —S—CH=CH— | | H |
| H | —O—CH=N— | | H |

The present invention is directed to a fungicidal composition characterized by comprising, as active components, (a) at least one of a compound of formula [1] shown above or an agrochemically acceptable salt thereof, and (b) at least one of an agricultural or horticultural fungicidal compound or a salt thereof. Component (b) can be selected from compounds known from, for example, the FRAC (Fungicide Resistance Action Committee) Code List, *the Pesticide Manual* (2013) published by the British Crop Protection Council, Kumiai Nouyaku Souran (2014) published by the National Federation of Agricultural Cooperative Associations in Japan, and SHIBUYA INDEX (17th Edition) published by Zenkoku Noson Kyoiku Kyokai Co., Ltd. The following gives examples of component (b) as mentioned in the FRAC Code List, but these are not the sole examples.

Examples of component (b) include, but are not limited to: "nucleic acids synthesis inhibitors (FRAC Codes 4, 8, 32, 31)", such as benalaxyl, benalaxyl-M, furalaxyl, metalaxyl, metalaxyl-M, oxadixyl, ofurace, bupirimate, dimethirimol, ethirimol, hymexazole, octhilinone, and oxolinic acid; "mitosis and cell division inhibitors (FRAC Codes 1, 10, 22, 20, 43, 39)", such as benomyl, carbendazim, fuberidazole, thiabendazole, thiophanate, thiophanate-methyl, diethofencacrb, zoxamide, ethaboxam, pencycuron, and fluopicolide; "respiration inhibitors (FRAC Codes 39, 7, 11, 21, 29, 30, 38, 45)", such as diflumetorim, tolfenpyrad, benodanil, flutolanil, mepronil, isofetamid, fluopyram, fenfuram, carboxin, oxycarboxin, thifluzamide, benzovindiflupyr, bixafen, fluxapyroxad, furametpyr, isopyrazam, penflufen, penthiopyrad, sedaxane, boscalid, azoxystrobin, coumoxystrobin, enoxastrobin, flufenoxystrobin, picoxystrobin, pyraclostrobin, pyrametostrobin, triclopyricarb, kresoximmethyl, trifloxystrobin, dimoxystrobin, fenaminstrobin, metominostrobin, orysastrobin, famoxadone, fluoxastrobin, mandestrobin, pyriminostrobin, fenamidone, pyribencarb, cyazofamid, amisulbrom, and ametoctradin; "amino acids and protein synthesis inhibitors (FRAC Codes 9, 24, 25, 41)", such as cyprodinil, mepanipyrim, pyrimethanil, blasticidin-S, kasugamycin, streptomycin, and oxytetracycline; "signal transduction inhibitors (FRAC Codes 13, 12, 2)", such as quinoxyfen, proquinazid, fenpiclonil, fludioxonil, chlozolinate, iprodione, procymidone, and vinclozolin; "lipids and cell membrane biosynthesis inhibitors (FRAC Codes 6, 14, 28, 44)", such as edifenphos, iprobenfos (IBP), pyrazophos, isoprothiolane, biphenyl, chloroneb, dicloran, quintozene (PCNB), tecnazene (TCNB), tolclofos-methyl, etridiazole, iodocarb, propamacarb, prothiocarb, *Bacillus subtilis* syn., *Bacillus amyloliquefaciens* strain QST713, *Bacillus amyloliquefaciens* strain FZB24, *Bacillus amyloliquefaciens* strain MBI600, *Bacillus amyloliquefaciens* strain D747, and extract from *Melameuca alternifolia* (tea tree); "inhibitors for sterol biosynthesis in cell membranes (FRAC Codes 3, 5, 17, 18)", such as triforine, pyrifenox, pyrizoxazole, fenarimol, nuarimol, imazalil, oxpoconazole, pefurazoate, prochloraz, triflumizole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole, prothioconazole, aldimorph, dodemorph, fenpropimorph, tridemorph, fenpropidin, piperalin, spiroxamine, fenhexamid, fenpyrazamine, pyributicarb, naftifine, and terbinafine; "cell wall biosynthesis inhibitors (FRAC Codes 26, 19, 40)", such as validamycin, polyoxin, dimethomorph, flumorph, pyrimorph, benthiavalicarb, iprovalicarb, valifenalate, and mandipropamid; "inhibitors for melanin synthesis in cell wall (FRAC Codes 16.1, 16.2, 16.3)", such as fthalide, pyroquilon, tricyclazole, carpropamid, diclocymet, fenoxanil, and tolprocarb; "host plant defence inducers (FRAC Codes P1 to P5)", such as acibenzolar-S-methyl, probenazole, tiadinil, isotianil, laminarin, and extract from *Reynoutria sachalinensis* (giant knotweed); "multi-site contact inhibitors (FRAC Codes M1 to M11)", such as copper, sulphur, ferbam, mancozeb, maneb, metiram, propineb, thiram, zineb, ziram, captan, captafol, folpet, chlorothalonil, dichlofluanid, tolyfluanid, guazatine, iminoctadine, anilazine, dithianon, chinomethionat/quinomethionate, and fluoroimide; "fungicides with unknown mode of action (FRAC Codes 27, 33, 34, 35, 36, 37, 42, U6, U8, U12 to U17)", such as cymoxanil, fosetyl-Al, phosphorous acid and salts, teclofthalam, triazoxide, flusulfamide, diclomezine, methasulfocarb, cyflufenamid, metrafenone, pyriofenone, dodine, flutianil, ferimzone, tebufloquin, oxathiapiprolin, and picarbutrazox. Other examples include, but are not limited to, combined fungicides such as BAF-1107, BAF-1120, KUF-1411, MIF-1002, MIF-1102, NNF-0721, NC-233, NF-171, NF-180, S-2399, SYJ-247, SYJ-252, SYJ-264, and SYJ-269.

The fungicidal composition of the present invention exhibits outstanding synergism by using component (b) selected from a wide variety of groups in combination with a compound of formula [1] shown above.

The fungicidal composition of the present invention has extremely potent fungicidal activity on phytopathogenic fungi, and can be used to control phytopathogenic microorganisms, including protists belonging to Plasmodiophoromycota and Oomycota, fungi belonging to Zygomycota, Ascomycota, Basidiomycota, Deuteromycota, and the like, and bacteria belonging to e.g. Pseudomonadaceae, Rhizobiaceae, Enterobacteriaceae, Corynebacteriaceae, and Streptomycetaceae, as well as plant diseases caused by the foregoing. Furthermore, the fungicidal composition of the present invention exhibits high synergistic fungicidal activity on protists belonging to Plasmodiophoromycota and Oomycota, and thus has an outstanding control effect against plant diseases caused by those protists.

The following gives examples of phytopathogenic microorganisms that can be controlled according to the present invention, but these are not the sole examples.

Examples of pathogenic microorganisms belonging to Oomycota include:
protists of the genus *Albugo* which are pathogens of white rust (e.g. *Albugo candida*);
protists of the genus *Aphanomyces* which are pathogens of root rot and damping-off (e.g. *Aphanomyces euteiches*);
protists of the genus *Bremia* which are pathogens of downy mildew (e.g. *Bremia lactucae*);
protists of the genus *Peronospora* which are pathogens of downy mildew (e.g. *Peronospora pisi, Peronospora brassicae, Peronospora parasitica, Peronospora tabacina*);
protists of the genus *Plasmopara* which are pathogens of downy mildew (e.g. *Plasmopara viticola*);
protists of the genus *Pseudoperonospora* which are pathogens of downy mildew (e.g. *Pseudoperonospora cubensis, Pseudoperonospora humuli*);
protists of the genus *Phytophthora* which are pathogens of late blight, white powdery rot, brown rot, red stele, heart rot, and *phytophthora* rot (e.g. *Phytophthora cactorum, Phytophthora capsici, Phytophthora cinnamoni, Phytophthora infestans, Phytophthora megasperma, Phytophthora parasitica*); and
protists of the genus *Pythium* which are pathogens of root rot, damping-off, browning root rot, and bed rot (e.g. *Pythium aphanidermatum, Pythium ultimum*).

Examples of pathogenic microorganisms belonging to Cercozoa include protists of the genus *Plasmodiophora* which are pathogens of clubroot (e.g. *Plasmodiophora brassicae*).

Examples of pathogenic microorganisms belonging to Zygomycota include fungi of the genus *Rhizopus* which are pathogens of seedling blight, bulb rot, *Rhizopus* rot, and soft rot (e.g. *Rhizopus stolonifer*).

Examples of pathogenic microorganisms belonging to Ascomycota include:
fungi of the genus *Ascochyta* which are pathogens of ray blight, brown spot, *Ascochyta* leaf spot, and leaf spot (e.g. *Ascochyta lentis*);
fungi of the genus *Blumeria* which are pathogens of powdery mildew (e.g. *Blumeria graminis*);
fungi of the genus *Claviceps* which are pathogens of ergot and false smut (e.g. *Claviceps purpurea*);

fungi of the genus *Cochliobolus* which are pathogens of southern leaf blight, spot blotch, and brown stripe (e.g. *Cochliobolus sativus, Cochliobolus miyabeanus, Cochliobolus sativus*);

fungi of the genus *Diaporthe* which are pathogens of diaporthe canker (e.g. *Diaporthe citri*);

fungi of the genus *Elsinoe* which are pathogens of anthracnose, scab, *sphaceloma* scab, white scab, and leaf spot (e.g. *Elsinoe fawcettii, Erysiphe graminis, Erysiphe polygoni*);

fungi of the genus *Gaeumannomyces* which are pathogens of take-all (e.g. *Gaeumannomyces graminis*);

fungi of the genus *Gibberella* which are pathogens of twig blight, bakanae disease, bud rot, and stub dieback (e.g. *Gibberella zeae*);

fungi of the genus *Glomerella* which are pathogens of anthracnose, ripe rot, red rot, and leaf spot (e.g. *Glomerella cingulata*);

fungi of the genus *Guignardia* (e.g. *Guignardia bidwellii*);

fungi of the genus *Helminthosporium* which are pathogens of stem rot, silver scurf, and zonate leaf spot (e.g. *Helminthosporium sigmoideum, Helminthosporium solani, Helminthosporium triticirepentis, Helminthosporium zonatum*);

fungi of the genus *Leptosphaeria* which are pathogens of blight and ring spot (e.g. *Leptosphaeria juncina, Leptosphaeria maculans, Leptosphaeria sacchari*);

fungi of the genus *Magnaporthe* which are pathogens of stem rot (e.g. *Magnaporthe grisea, Magnaporthe salvinii*);

fungi of the genus *Monilinia* which are pathogens of brown rot and blossom blight (e.g. *Monilinia fructicola, Monilinia laxa, Monilinia mali*);

fungi of the genus *Monographella* which are pathogens of leaf scald and snow mold (e.g. *Monographella albescensa, Monographella nivalis*);

fungi of the genus *Mycosphaerella* which are pathogens of black leaf blight and leaf spot (e.g. *Mycosphaerella arachidicola, Mycosphaerella fijiensis, Mycosphaerella graminicola*);

fungi of the genus *Phaeomoniella* which are pathogens of *Phaeomoniella* disease (e.g. *Phaeomoniella chlamydospora*);

fungi of the genus *Phaeosphaeria* which are pathogens of glume blotch (e.g. *Phaeosphaeria nodorum*);

fungi of the genus *Podosphaera* which are pathogens of powdery mildew (e.g. *Podosphaera leucotricha, Podosphaera tridactyla*);

fungi of the genus *Pyrenophora* which are pathogens of stripe and net blotch (e.g. *Pyrenophora graminea, Pyrenophora teres*);

fungi of the genus *Sclerotinia* which are pathogens of downy mildew and *sclerotinia* rot (e.g. *Sclerotinia sclerotiorum*);

fungi of the genus *Sclerotium* which are pathogens of southern blight and white rot (e.g. *Sclerotium rolfsii*);

fungi of the genus *Sphaerotheca* which are pathogenic fungi of powdery mildew (e.g. *Sphaerotheca fuliginea, Sphacelotheca reiliana*);

fungi of the genus *Sphaerulina* which are pathogens of cercospora leaf spot (e.g. *Sphaerulina oryzina*);

fungi of the genus *Tapesia* which are pathogenic fungi of *Tapesia* disease (e.g. *Tapesia acuformis*);

fungi of the genus *Taphrina* which are pathogens of leaf curl and plum pockets (e.g. *Taphrina deformans, Taphrina pruni*);

fungi of the genus *Uncinula* which are pathogens of powdery mildew (e.g. *Uncinula necator, Uncinuliella simulans*); and fungi of the genus *Venturia* which are pathogens of scab (e.g. *Venturia inaequalis, Venturia nashicola*).

Examples of pathogenic microorganisms belonging to Basidiomycota include: fungi of the genus *Ceratobasidium* which are pathogens of foot-rot and winter stem rot (e.g. *Ceratobasidium graminerum*);

fungi of the genus *Corticium* which are pathogens of foot-rot and winter stem rot (e.g. *Corticium graminerum*);

fungi of the genus *Exobasidium* which are pathogens of leaf gall, witches broom, and net blister blight (e.g. *Exobasidium pentasporium, Exobasidium reticulatum, Exobasidium vexans*);

fungi of the genus *Fomitiporia* which are pathogens of Dwarf disease (e.g. *Fomitiporia mediterranea*);

fungi of the genus *Ganoderma* which are pathogens of Stem rot (e.g. *Ganoderma boninense*);

fungi of the genus *Gymnosporangium* which are pathogenic fungi of rust (e.g. *Gymnosporangium sabinae, Gymnosporangium sabinae*);

fungi of the genus *Hemileia* which are pathogenic fungi of rust (e.g. *Hemileia vastatrix*);

fungi of the genus *Nectria* which are pathogens of coral spot disease and *nectria* blight (e.g. *Nectria galligena*);

fungi of the genus *Phakopsora* which are pathogens of red rust and rust (e.g. *Phakopsora meibomiae, Phakopsora pachyrhizi*);

fungi of the genus *Puccinia* which are pathogens of rust, stem rust, and leaf rust (e.g. *Puccinia arachidis, Puccinia graminis, Puccinia hordei, Puccinia recondita, Puccinia striiformis*);

fungi of the genus *Tilletia* which are pathogenic fungi of stinking smut (e.g. *Tilletia caries*);

fungi of the genus *Typhula* which are pathogens of typhula snow blight and typhula rot (e.g. *Typhula incarnata, Typhula ishikariensis*);

fungi of the genus *Urocystis* which are pathogens of smut (e.g. *Urocystis cepulae, Urocystis occulta*);

fungi of the genus *Uromyces* which are pathogens of rust (e.g. *Uromyces appendiculatus, Uromyces phaseoli*); and fungi of the genus *Ustilago* which are pathogens of smut and loose smut (e.g. *Ustilago maydis, Ustilago nuda*).

Examples of pathogenic microorganisms belonging to Deuteromycota include: fungi of the genus *Alternaria* which are pathogens of *Alternaria* blotch, *Alternaria* leaf spot, *Alternaria* black rot, leaf blight, early blight, and early blight (ring spot) (e.g. *Alternaria brassicicola, Alternaria solani*);

fungi of the genus *Aspergillus* which are pathogens of crown rot (e.g. *Aspergillus flavus*);

fungi of the genus *Botrytis* which are pathogens of gray mold, neck rot, and red spot (e.g. *Botrytis cinerea*);

fungi of the genus *Cercosporidium* which are pathogens of leaf spot (e.g. *Cercosporidium personatum*);

fungi of the genus *Cercospora* which are pathogens of leaf spot, leaf spot (brown spot), brown round spot, leaf blight, and purple stain (e.g. *Cercospora arachidicola, Cercospora beticola, Cercospora chaae, Cercospora kikuchii*);

fungi of the genus *Cladosporium* which are pathogenic fungi of scab, false blast, and leaf blotch (e.g. *Cladosporium cucumerinum, Cladosporium cladosporioides, Cladosporium herbarum*);

fungi of the genus *Colletotrichum* which are pathogenic fungi of anthracnose and ripe rot (e.g. *Colletotrichum coc-* codes, *Colletotrichum graminicola, Colletotrichum lindemuthanium, Colletotrichum orbiculare*);

fungi of the genus *Fusarium* which are pathogens of stem rot, *Fusarium* wilt, dry rot, root rot, and *Fusarium* wilt (e.g. *Fusarium culmorum, Fusarium graminearum, Fusarium oxysporum, Fusarium roseum*);

fungi of the genus *Gloeosporium* which are pathogens of anthracnose (e.g. *Gloeosporium laeticolor*);

fungi of the genus *Macrophomina* which are pathogenic fungi of leaf spot, *Macrophoma* leaf spot, and branch canker (e.g. *Macrophoma theicola, Macrophomina phaseolina*);

fungi of the genus *Microdochium* which are pathogens of anthracnose (e.g. *Microdochium nivale*);

fungi of the genus *Penicillium* which are pathogens of blue mold and common green mold (e.g. *Penicillium expansum, Penicillium purpurogenum*);

fungi of the genus *Phoma* which are pathogens of leaf spot, fruit rot, and root rot (e.g. *Phoma* lingam, *Phoma dauci*);

fungi of the genus *Phomopsis* which are pathogens of *Phomopsis* canker and stem blight (e.g. *Phomopsis sojae, Phomopsis viticola*);

fungi of the genus *Pseudocercosporella* which are pathogenic fungi of eye spot (e.g. *Pseudocercosporella herpotrichoides*);

fungi of the genus *Pyricularia* which are pathogens of blast (e.g. *Pyricularia oryzae*);

fungi of the genus *Ramularia* which are pathogens of *Ramularia* leaf spot (e.g. *Ramularia* areola, *Ramularia collo-cygni*);

fungi of the genus *Rhizoctonia* which are pathogens of damping-off, *Rhizoctonia* root rot, stem rot, and sheath blight (e.g. *Rhizopus oryzae, Rhizoctonia solani*); fungi of the genus *Rhynchosporium* which are pathogens of leaf blotch (e.g. *Rhynchosporium secalis*);

fungi of the genus *Sarocladium* which are pathogens of sheath rot (e.g. *Sarocladium oryzae*);

fungi of the genus *Septoria* which are pathogens of black spotted leaf blight, leaf blight, and *Septoria* leaf spot (e.g. *Septoria apii, Septoria lycopersici, Septoria nodorum, Septoria tritici*);

fungi of the genus *Stagonospora* which are pathogens of red leaf spot and leaf scorch (e.g. *Stagonospora nodorum*);

fungi of the genus *Thielaviopsis* which are pathogenic fungi of black root rot and root rot (e.g. *Thielaviopsis basicola*); and fungi of the genus *Verticilium* which are pathogens of *Verticillium* wilt (e.g. *Verticilium alboatrum, Verticillium dahliae*).

Examples of pathogenic microorganisms belonging to Xanthomonadaceae include bacteria of the genus *Xanthomonas* which are pathogens of bacterial leaf blight, bacterial spot, and bacterial brown spot (e.g. *Xanthomonas campestris* pv. *oryzae, Xanthomonas campestris* pv. *vesicatoria*).

Examples of pathogenic microorganisms belonging to Pseudomonadaceae include bacteria of the genus *Pseudomonas* which are pathogens of sheath blown rot and bacterial wilt (e.g. *Pseudomonas syringae* pv. *lachrymans, Pseudomonas syringae* pv. *mori*).

Examples of pathogenic microorganisms belonging to Enterobacteriaceae include bacteria of the genus *Erwinia* which are pathogens of bacterial soft rot (e.g. *Erwinia amylovora, Erwinia carotovora* subsp. *carotovora*).

Examples of bacteria of the family Corynebacteriaceae include bacteria of the genus *Corynebacterium* which are pathogens of fasciation (e.g. *Corynebacterium facians*).

Examples of pathogenic microorganisms belonging to Streptomycetaceae include bacteria of the genus *Streptmyces* which are pathogens of soil smelling yellow rice (e.g. *Streptmyces flavovirens*).

The method of controlling a plant pest according to the present invention comprises a step of treating a plant or a vicinity thereof with (a) a compound of formula [1] and (b) an agricultural or horticultural fungicide or a salt thereof, wherein compounds (a) and (b) are applied for treatment simultaneously, sequentially or separately. As referred to above, the "plant" refers to plants or a group of plants, such as wild plants, bred plants, naturally occurring plants, and cultivated plants, and also includes plants created by breeding methods such as introduction breeding, breeding by separation, crossbreeding, heterosis breeding, mutation breeding, polyploid breeding, gene recombination (gene introduction), or marker aided selection. The plant to be treated can be the whole or part of the plant. Further, the vicinity of the plant refers to soil (soil where seeds are to be sown), rice paddy, water for hydroponic cultivation, cultivation materials, and the like. In addition, the treatment of the plant or the vicinity thereof refers to treatments conducted by misting, spreading, dusting, spraying, dispersing, immersing, lavaging, inserting, sprinkling (exposing to water), bubbling, depositing, dressing, coating, blowing, fumigating, smoking, hazing, painting, and the like.

A treatment with the fungicidal composition of the present invention for the purpose of controlling phytopathogenic microorganisms or plant diseases caused thereby can be conducted throughout the breeding period and storage period of the plant regardless of whether before or after infection with phytopathogenic microorganisms. As referred to above, "part of the plant" refers to all parts constituting the plant, including leaf, stem, trunk, branch, flower, fruiting body, fruit, seed, root, tuber and rhizome, or combinations thereof.

For the purpose of controlling phytopathogenic microorganisms or plant diseases caused thereby, the fungicidal composition of the present invention can be used at a dose adjusted to be effective for but not toxic to the plant. As referred to above, the dose that is "effective for but not toxic to the plant" refers to a dose that is sufficient to control phytopathogenic microorganisms or plant disease caused thereby and, at the same time, does no harm to the plant. This dose can vary in a relatively wide range depending on the microorganism to be controlled, the plant to be treated, the natural environment of use, and the components constituting the composition of the present invention.

The following gives examples of the plant that can be treated with the fungicidal composition of the present invention, but these are not the sole examples.

Examples include:

Malvaceae plants, such as okra and cotton;

Sterculiaceae plants, such as cacao tree;

Chenopodiaceae plants, such as spinach;

Sapotaceae plants, such as miracle fruit;

Rubiaceae plants, such as coffee and *Coffea canephora*;

Cannabaceae plants, such as *Humulus lupulus*;

Brassicaceae plants, such as *Brassica campestris*, turnip, cauliflower, cabbage, *Brassica chinensis* komatsuna, Japanese radish, pak choi, Chinese cabbage, and broccoli;

Poaceae plants, such as rice, barley, wheat, sugarcane, *Zoysia*, corn, and rye;

Cucurbitaceae plants, such as pumpkin, cucumber, watermelon, zucchini, winter melon, *Momordica charantia*, chayote, oriental melon, melon, and *Lagenaria siceraria* var. *hispida;*
Anacardiaceae plants, such as mango;
Nyctaginaceae plants, such as *Pisonia umbellifera;*
Clusiaceae plants, such as mangosteen;
Ebenaceae plants, such as Japanese persimmon;
Asteraceae plants, such as Sanchu lettuce, leaf lettuce, lettuce, *chrysanthemum*, crown daisy, chicory, burdock, sunflower, andfuki;
Betulaceae plants;
Malpighiaceae plants, such as acerola;
Lauraceae plants;
Elaeagnaceae plants, such as *Juglans mandshurica* var. *sachalinensis*, and black walnuts;
Moraceae plants, such as fig and rubber tree;
Dennstaedtiaceae plants, such as bracken;
Pedaliaceae plants, such as sesame;
Punicaceae plants, such as pomegranate;
Araceae plants, such as Amorphophalus and Araceae;
Blechnaceae plants, such as leontiasis;
Lamiaceae plants, such as *F. viridis* and *F. purpurea;*
Tiliaceae plants, such as *Corchorus olitorius;*
Zingiberaceae plants, such as turmeric, ginger, *Zingiber officinale*, and *Zingiber mioga;*
Apiaceae plants, such as parsley, celery, and carrot;
Polygonaceae plants, such as buckwheat;
Ericaceae plants, such as *Rhododendron;*
Theaceae plants, such as *Camellia sinensis;*
Solanaceae plants, such as tobacco, red pepper, green pepper, tomato, potato, and eggplant;
Caryophyllaceae plants, such as carnation;
Bromeliaceae plants, such as pineapple;
Cabombaceae plants, such as *Brasenia schreberi;*
Musaceae plants, such as banana;
Caricaceae plants, such as *papaya;*
Rosaceae plants, such as apricot, strawberry, *Prunus mume, Pseudocydonia sinensis, Prunus salicina*, European pear, pear, nectarine, rose, loquat, black raspberry, quince, Miniature rose, peach, and apple;
Convolvulaceae plants, such as sweet potato;
Amaranthaceae plants, such as sugar beet;
Vitaceae plants, such as grape;
Fagaceae plants, such as chestnut;
Crassulaceae plants, such as Yatsugashira (a type of *Colocasia antiquorum Schott*. var. *esculenta Engl*);
Fabaceae plants, such as azuki bean, kidney bean, pea, black azuki, *Vigna unguiculata*, fova bean, soy bean, black bean, and peanut;
Rutaceae plants, such as *Poncirus, Citrus* Kawano natsudaidai, orange, kumquat, grapefruit, *Zanthoxylum piperitum, Citrus sudachi, Citrus aurantium, Citrus tachibana*, Tahichi Lime, *Citrus natsudaidai, Citrus hassaku, Citrus unshiu, Citrus maxima, Citrus poonensis, Citrus junos*, lime, and lemon; Oleaceae plants, such as olive;
Arecaceae plants, such as coconut;
Trochodendraceae plants, such as *Phytolacca esculenta;*
Dioscoreaceae plants, such as *Dioscorea batatas* and yam;
Liliaceae plants, such as asparagus, tulip, onion, garlic chives, garlic, welsh onion, *Allium chinense*, shallot, and lilly;
Moringaceae plants, such as *Moringa oleifera* Lam; and genetically engineered varieties of the foregoing plants.

A further aspect of the present invention is directed to seeds treated with the fungicidal composition of the present invention. Such seeds are used to prevent the occurrence of plant diseases caused by phytopathogenic microorganisms. When seeds infected with or adsorbed by phytopathogenic microorganisms (hereinafter referred to as "contaminated seeds") are mixed in healthy seeds, the contaminated seeds serve as a source of infection with phytopathogenic microorganism, and the disease spreads to healthy plants cultivated nearby. Therefore, the seeds treated with the fungicidal composition of the present invention having high fungicidal activity against plant disease microorganisms can serve as an effective means for preventing the occurrence of plant diseases and the spread of pathogenic microorganisms to healthy plants.

The fungicidal composition of the present invention can be used for seeds of all plants. The seeds of this invention are effective as a means for preventing the occurrence of plant diseases caused by phytopathogenic microorganisms, particularly in rice, wheat, barley, rye, corn, soy bean, cotton, potato, sugarbeet and the like, since such plants are cultivated in a large scale and have a tendency to experience more severe damage from the spread of diseases caused by contaminated seeds. In addition, treating seeds of genetically engineered crops with the fungicidal composition of the present invention is effective as a means for preventing the occurrence of plant diseases caused by phytopathogenic microorganism.

The following gives examples of genetically engineered plants that can be treated with the fungicidal composition of the present invention, but these are not the sole examples. Examples include:

plants transformed to be resistant to herbicides, such as glyphosate resistant plants, bialaphos resistant plants, bromoxynil resistant plants, sulfonyl urea herbicide resistant crops, imidazolinone herbicide resistant crops, 2,4-D resistant plants, dicamba resistant plants, isoxaflutole resistant plants, and mesotrione resistant plants;

plants transformed to be resistant to insect pests, such as plants transformed to produce Bt toxin (pesticidal toxin of *Bacillus thuringiensis*), and plants transformed to produce natural enemy attractants;

plants transformed to be resistant to plant diseases, such as virus resistant plants, and plants transformed to produce defensin;

plants transformed to improve the storability of fruits by expanding their optimum harvest time, such as plants transformed to inhibit the production of polygalacturonase, and plants transformed to inhibit the production of ethylene biosynthase; plants transformed to improve the safety of crops, such as plants producing mycotoxin degrading enzyme;

plants transformed to be useful in breeding, such as plants transformed to exhibit male sterility transduction;

transformed plants having characters that are useful as a raw material for bioethanol, such as plants producing heat-resistant α-amylase;

plants transformed to be resistant to environmental stress, such as drought-tolerance plants utilizing RNA chaperon, plants storing glycine betaine which is a compatible solute abundant in low temperature tolerance plants, plants storing proline as a compatible solute, drought-tolerance plants storing trehalose which has a strong water holding capacity, plants producing excessive active oxygen-eliminating enzymes, plants exhibiting tolerance to iron deficiency in alkaline soil by producing mugineic acids, and plants exhibiting tolerance to iron deficiency by producing mugineic acids; and plants transformed to produce particular functional nutrients, such as plants producing excessive oleic acid, plants producing excessive stearidonic acid, plants producing excessive lycine, pro-vitamin A-enhanced crops, vitamin E-enhanced crops, plants producing excessive anthocyanin, plants producing cedar allergens to mitigate cedar pollinosis.

The fungicidal composition of the present invention has high fungicidal activity on microorganisms and thus can be used for protecting industrial materials from development of microorganisms. Non-limiting examples of industrial materials include wood, plastic material, paper material, leather material, tile, ceramic, cement, paint, cooling lubricant and adhesive. The treatment of such an industrial material to be protected with the fungicidal composition of the present invention can be conducted by applying the composition to the material by misting, spreading, spreading as powder, spraying, dispersing, immersing, lavaging, sprinkling (exposing to water), bubbling, depositing, dressing, coating, blowing, fumigating, smoking, hazing, painting, or mixing.

The fungicidal composition of the present invention may, as necessary, contain any type of additives commonly used in agrochemical preparations. Examples of those additives include carriers such as solid or liquid carriers, surfactants, binders, tackifiers, thickeners, coloring agents, spreaders, antifreezing agents, anticaking agents, disintegrators, and stabilizers. If necessary, preservatives and plant fragments may also be used as additives.

Those additives may be used alone or in combination of two or more thereof.

The aforementioned additives will be described below.

Examples of solid carriers include, but are not limited to: natural minerals such as quartz, clay, kaolinite, pyrophyllite, sericite, talc, chalk, bentonite, attapulgite, montmorillonite, acid clay, zeolite, natural rock, diatomaceous earth, calcite, marble, pumice, sepiolite, and dolomite; inorganic salts such as calcium carbonate, ammonium sulfate or other ammonium salts, sodium sulfate, calcium chloride, and potassium chloride; organic solid carriers such as starch, cellulose, and plant powders; plastic carriers such as polyethylene, polypropylene, and polyvinylidene chloride; as well as synthetic silicic acid, synthetic silicate, alumina, micronized silica, and silicate. Those solid carriers may be used alone or in combination of two or more thereof.

Examples of liquid carriers include, but are not limited to: alcohols broadly divided into monohydric alcohols such as methanol, ethanol, propanol, isopropanol, and butanol, and polyhydric alcohols such as ethylene glycol, diethylene glycol, propylene glycol, hexylene glycol, polyethylene glycol, polypropylene glycol, and glycerin; polyhydric alcohol derivatives such as propylene glycol ethers; ketones such as acetone, methylethylketone, methylisobutylketone, diisobutylketone, cyclohexanone, and isophorone; ethers such as ethyl ether, dioxane, cellosolve, dipropyl ether, and tetrahydrofuran; aliphatic hydrocarbons such as normal paraffin, naphthene, isoparaffin, kerosine, and mineral oil; aromatic hydrocarbons such as benzene, toluene, xylene, solvent naphtha, and alkylnaphthalene; halogenated hydrocarbons such as dichloroethane, chloroform, and carbon tetrachloride; esters such as ethyl acetate, diisopropyl phthalate, dibutyl phthalate, dioctyl phthalate, and dimethyl adipate; lactones such as γ-butyrolactone; amides such as dimethylformamide, diethylformamide, dimethylacetamide, and N-alkylpyrrolidine; nitriles such as acetonitrile; sulfuric compounds such as dimethylsulfoxide; vegetable oils such as soy bean oil, rapeseed oil, cottonseed oil, and castor oil; and water. Those liquid carriers may be used alone or in combination of two or more thereof.

Surfactants are not particularly limited, but surfactants that gelate or swell in water are preferred. Examples include nonionic surfactants such as sorbitan fatty acid ester, polyoxyethylene sorbitan fatty acid ester, sucrose fatty acid ester, polyoxyethylene fatty acid ester, polyoxyethylene resin acid ester, polyoxyethylene fatty acid diester, polyoxyethylene alkyl ether, polyoxyethylene alkyl phenol ether, polyoxyethylene dialkyl phenyl ether, polyoxyethylene alkyl phenol formalin condensates, polyoxyethylene-polyoxy-propylene block polymers, alkyl-polyoxyethylene-polypropylene block polymer ether, polyoxyethylene alkyl amine, polyoxyethylene fatty acid amide, polyoxyethylene fatty acid bisphenyl ether, polyalkylene benzyl phenyl ether, polyoxyalkylene styrene phenyl ether, acetylenediol, polyoxy alkylene-added acetylenediol, polyoxyethylene ether silicone, ester silicone, fluorine surfactants, polyoxyethylene castor oil, and polyoxyethylene hydrogenated castor oil; anionic surfactants such as alkyl sulfate, polyoxyethylene alkyl ether sulfate, polyoxyethylene alkyl phenyl ether sulfate, alkylbenzene sulfonate, lignin sulfonate, alkylsulfosuccinate, naphthalene sulfonate, alkylnaphthalene sulfonate, salts of naphthalene sulfonate formalin condensates, salts of alkylnaphthalene sulfonate formalin condensates, fatty acid salts, polycarboxylate, N-methyl fatty acid sarcosinate, resinate, polyoxyethylene alkyl ether phosphate, and polyoxyethylene alkyl phenyl ether phosphate; cationic surfactants such as alkyl amine salts, including lauryl amine hydrochloride, stearyl amine hydrochloride, oleyl amine hydrochloride, stearyl amine acetate, stearyl aminopropyl amine hydrochloride, alkyl trimethyl ammonium chloride, and alkyl dimethyl benzalkonium chloride; and amino acid, betaine and other amphoteric surfactants. Those surfactants may be used alone or in combination of two or more thereof.

Examples of binders and tackifiers include, but are not limited to, carboxymethyl cellulose or a salt thereof, dextrin, water-soluble starch, xanthan gum, guar gum, sucrose, polyvinyl pyrrolidone, gum arabic, polyvinyl alcohol, polyvinyl acetate, sodium polyacrylate, polyethylene glycols having an average molecular weight of 6,000-20,000, polyethylene oxides having an average molecular weight of 100,000-5 million, and natural phospholipids (e.g. cephalin acid, lecithin acid). These binders and tackifiers may be used alone or as a combination of two or more thereof. Examples of thickeners include, but are not limited to: water-soluble polymers such as xanthan gum, guar gum, carboxymethyl cellulose, polyvinyl pyrrolidone, carboxyvinyl polymers, acrylic polymers, starch derivatives, and polysaccharides; and inorganic fine powders such as high purity bentonite, and white carbon. These thickeners may be used alone or in combination of two or more thereof. Examples of coloring agents include, but are not limited to: inorganic pigments such as iron oxide, titanium oxide, and prussian blue; and organic dyes such as alizarin dyes, azo dyes, and metal phthalocyanine dyes. These coloring agents may be used alone or in combination of two or more thereof.

Examples of spreaders include, but are not limited to, silicone surfactants, cellulose powder, dextrin, processed starch, aminopolycarboxylate chelate compounds, cross-linked polyvinyl pyrrolidone, maleic acid and styrene acid, methacrylic copolymers, half esters of polyhydric alcohol polymer and dicarboxylic anhydride, and a water-soluble salt of polystyrene sulfonic acid. These spreaders may be used alone or in combination of two or more thereof. Examples of stickers include, but are not limited to: various surfactants such as sodium dialkyl sulfosuccinate, polyoxyethylene alkyl ether, polyoxyethylene alkyl phenyl ether, and polyoxyethylene fatty acid ester; and paraffin, terpene, polyamide resins, polyacrylate, polyoxyethylene, wax, polyvinyl alkyl ether, alkylphenol formalin condensates, and synthetic resin emulsions. These stickers may be used alone or in combination of two or more thereof.

Examples of antifreezing agents include, but are not limited to, polyhydric alcohols such as ethylene glycol, diethylene glycol, propylene glycol, and glycerin. Those antifreezing agents may be used alone or in combination of two or more thereof.

Examples of anticaking agents include, but are not limited to: polysaccharides such as starch, alginic acid, mannose, and galactose; and polyvinyl pyrrolidone, white carbon, ester gum, and petroleum resin. Those anticaking agents may be used alone or in combination of two or more thereof. Examples of disintegrators include, but are not limited to, sodium tripolyphosphate, sodium hexametaphosphate, stearic acid metal salts, cellulose powder, dextrin, copolymers of methacrylic acid ester, polyvinyl pyrrolidone, aminopolycarboxylate chelate compounds, styrene sulfonate-isobutylene-maleic anhydride copolymers, and starch-polyacrylonitrile graft copolymers. Those disintegrators may be used alone or in combination of two or more thereof.

Examples of stabilizers include, but are not limited to: drying agents such as zeolite, calx, and magnesium oxide; phenolic, aminic, sulfuric, phosphoric and other antioxidants; and salicylic acid, benzophenone and other UV absorbers. Those stabilizers may be used alone or in combination of two or more thereof.

Examples of preservatives include, but are not limited to, potassium sorbate and 1,2-benzthiazolin-3-one. Those preservatives may be used alone or in combination of two or more thereof.

Examples of plant fragments include, but are not limited to, sawdust, coconut shell, corncob, and tobacco stem.

The aforementioned additives are incorporated in the fungicidal composition or combination of the present invention in the following proportions on a mass basis: the percent content of a carrier is selected from the range of generally 5-95%, preferably 20-90%, that of a surfactant is selected from the range of generally 0.1-30%, preferably 0.5-10%, and that of other additives is selected from the range of generally 0.1-30%, preferably 0.5-10%.

The fungicidal composition of the present invention can be used as a drug suitable for agricultural or horticultural fungicides, such as granule, powder granule, microgranule, liquid formulation, water-soluble chemical, oil solution, emulsifiable concentrate, spreading oil, emulsion, microemulsion, suspoemulsion, EW (emulsion oil in water), microcapsule, wettable powder, suspension concentrate, flowable, tablet, water dispersible granule, dry flowable, water dispersible granule, aerosol, paste, cyclodextrin formulation, jumbo agent, pack agent, water-soluble packed formulation, dusting powder, smoking agent, or fumigant.

Such a mode of the composition of the present invention as described above can be obtained by a common method of mixing at least one compound selected from the compounds of formula [1] and at least one selected from examples of component (b) together with an appropriate solid or liquid carrier, and optionally an appropriate adjuvant (e.g. surfactant, solvent, stabilizer) for improving the dispersibility or other properties of the active components. In the process of use, the composition of the present invention can be sprayed after diluted to an appropriate concentration or can be directly applied.

The fungicidal composition of the present invention contains, as a cooperative component, any of compounds typically known from *the Pesticide Manual* (2013) published by the British Crop Protection Council, *Kumiai Nouyaku Souran* (2014) published by the National Federation of Agricultural Cooperative Associations in Japan, and *SHIBUYA INDEX* (17th Edition) published by Zenkoku Noson Kyoiku Kyokai Co., Ltd.—for example, insecticide, miticide, nematicide, snail pesticide, ingestion inhibitor, herbicide, algicide, miticide, nematicide, biological pesticide, pheromone agent, natural fungicide, and natural pesticide—and thereby can form a multi-component pest control agent that offers a wider scope of agricultural protection. The following gives examples of the cooperative component, but these are not the sole examples.

Examples of the pesticide, acaricide, nematicide, snail pesticide and ingestion inhibitor include, but are not limited to, the following: 1,2-dichloropropane, 1,3-dichloropropene, abamectin, acephate, acequinocyl, acetamiprid, acethion, acetophos, acetoprole, acrinathrin, acrylonitrile, afidopyropen, alanycarb, aldoxycarb, allethrin, allicin, allosamidin, allyxycarb, alpha-cypermethrin, alpha-endosulfan, amidithion, amidoflumet, aminocarb, amiton, amitraz, anabasine, aramite, athidathion, azadirachtin, azamethiphos, azinphos-ethyl, azinphos-methyl, azobenzene, azocyclotin, azothoate, *Bacillus thuringiensis* kurstaki, *Bacillus thuringiensis* Buibui, *Bacillus thuringiensis* aisawai, barium hexafluorosilicate, barthrin, benclothiaz, bendiocarb, benfuracarb, benoxafos, bensultap, benzoximate, benzyl benzoate, beta-cyfluthrin, beta-cypermethrin, bifenazate, bifenthrin, bifujunzhi, binapacryl, bioallethrin, bioethanomethrin, biopermethrin, bistrifluron, borax, boric acid, brofenvalerate, broflanilid, brofluthrinate, bromethrin, bromfenvinfos, bromoacetamide, bromocyclen, bromo-DDT, bromophos, bromophos-ethyl, bromopropylate, bufencarb, buprofezin, butacarb, butathiofos, butethrin, butocarboxim, butonate, butoxycarboxim, cadusafos, calcium polysulfide, calvinphos, camphechlor, carbanolate, carbaryl, carbofuran, carbon disulfide, carbon tetrachloride, carbonyl sulfide, carbophenothion, carbosulfan, cartap, carvacrol, chinomethionat, chloramine phosphorus, chlorantraniliprole, chlorbenside, chlorbenzuron, chlorbicyclen, chlordecone, chlorempenthrin, chlorethoxyfos, chlorfenapyr, chlorfenethol, chlorfenson, chlorfensulphide, chlorfenvinphos, chlorfluazuron, chlormephos, chloroform, chloromebuform, chloromethiuron, chloropicrin, chloroprallethrin, chloropropylate, chlorphoxim, chlorprazophos, chlorpyrifos, chlorpyrifos-methyl, chlorthiophos, chromafenozide, cinerin I, cinerin II, cinerins, cismethrin, clenpirin, cloethocarb, clofentezine, closantel, clothianidin, colophonate, copper naphthenate, copper oleate, copper sulfate, coumaphos, coumithoate, CPMC, crotamiton, crotoxyphos, crufomate, cryolite, cyanofenphos, cyanogen, cyanophos, cyanthoate, cyantraniliprole, cyclaniliprole, cyclethrin, cycloprate, cycloprothrin, cyenopyrafen, cyflumetofen, cyfluthrin, cyhalodiamide, cyhalothrin, cyhexatin, cymiazole, cypermethrin, cyromazine, cythioate, dayoutong, dazomet, DBCP, DCIP, decarbofuran, deltamethrin, demephion, demephion-O, demephion-S, demeton, demeton-methyl, demeton-O, demeton-O-methyl, demeton-S, demeton-S-methyl, demeton-S-methylsulphon, d-fanshiluquebingjuzhi, diafenthiuron, dialifos, diamidafos, diatomaceous earth, diazinon, dicapthon, dichlofenthion, dichlofluanid, dichlorbenzuron, dichlorvos, dicloromezotiaz, dicofol, dicresyl, dicrotophos, dicyclanil, dienochlor, diflovidazin, diflubenzuron, dilor, dimefluthrin, dimefox, dimetan, dimethacarb, dimethoate, dimethrin, dimethylvinphos, dimetilan, dinex, dinobuton, dinocap, dinocap-4, dinocap-6, dinocton, dinopenton, dinoprop, dinosam, dinosulfon, dinotefuran, dinoterbon, diofenolan, dioxabenzofos, dioxacarb, dioxathion, diphenyl sulfone, dipymetitrone, disulfiram, disulfoton, dithicrofos, dithioether, d-limonene, DNOC, dofenapyn, doramectin, ecdysterone, emamectin, EMPC, empenthrin, endothion, endrin, EPN, epofenonane, eprinomectin, epsilon-metofluthrin, epsilon-momfluorothrin, esddpalldthrine, esfenvalerate, etaphos, ethiofencarb, ethion, ethiprole, ethoate-methyl, ethoprophos, ethyl formate, ethyl-DDD, ethylene dibromide, ethylene dichloride, etofenprox, etoxazole, etrimfos, EXD, famphur, fenamiphos, fenazaflor, fenazaquin, fenbutatin oxide, fenchlorphos, fenethacarb, fenfluthrin, fenitrothion, fenobucarb, fenothiocarb, fenoxacrim, fenoxycarb, fenpirithrin, fenpropathrin, fenpyroximate, fenson, fensulfothion, fenthion, fenthion-ethyl, fentrifanil, fenvalerate, ferric phosphate, fipronil, flometoquin, flonicamid, fluacrypyrim, fluazaindolizine, fluazuron, flubendiamide, flubenzimine, flucofuron, flucycloxuron, flucycloxuron, flucythrinate, fluenetil, fluensulfone, flufenerim, flufenoxuron, flufenoxystrobin, flufenprox, flufiprole, fluhexafon, flumethrin, fluorbenside, flupyradifurone, fluralaner, flursulamid, fluvalinate, fluxametamide, fonofos, formetanate, formetanate hydrochloride, formothion, formparanate, fosmethilan, fospirate, fosthiazate, fosthietan, furamethrin, furan tebufenozide, furathiocarb, furethrin, furfural, gamma-cyhalothrin, gamma-HCH, genit, guazatine, halfenprox, halofenozide, HCH, HEOD, heptafluthrin, heptenophos, heterophos, hexachlorophene, hexaflumuron, hexythiazox, HHDN, hydramethylnon, hydroprene, hyquincarb, imicyafos, imidacloprid, imidaclothiz, imiprothrin, indoxacarb, IPSP, isamidofos, isazofos, isobenzan, isocarbophos, isodrin, isofenphos, isofenphos-methyl, isolan, isoprocarb, isoprothiolane, isothioate, isoxathion, ivermectin, japothrins, jasmolin I, jasmolin II, jiahuangchongzong, jodfenphos, juvenile hormone I, juvenile hormone II, juvenile hormone III, kadethrin, kappa-bifenthrin, kappa-tefluthrin, kelevan, kinoprene, lambda-cyhalothrin, lepimectin, leptophos, lirimfos, lufenuron, lythidathion, malathion, malonoben, maltodextrin, matrine, mazidox, mecarbam, mecarphon, medimeform, menazon, meperfluthrin, mephosfolan, mesulfen, mesulfenfos, metaflumizone, metaldehyde, metam, methacrifos, methidathion, methiocarb, methocrotophos, methomyl, methoprene, methothrin, methoxychlor, methoxyfenozide, methyl iodide, methyl isothiocyanate, methylacetophos, methylchloroform, methylene chloride, metofluthrin, metolcarb, metoxadiazone, mevinphos, mexacarbate, milbemictin, milbemycin oxime, mipafox, mirex, MNAF, momfluorothrin, morphothion, moxidectin, naftalofos, naled, naphthalene, niclosamide, nicotine, nifluridide, nikkomycins, nitenpyram, nithiazine, nitrilacarb, nornicotine, novaluron, noviflumuron, ometoate, oxamyl, oxydemeton-methyl, oxydeprofos, oxydisulfoton, oxymatrine, paichongding, para-dichlorobenzene, penfluron, pentachlorophenol, pentmethrin, permethrin, phenkapton, phenothrin, phenproxide, phenthoate, phorate, phosalone, phosfolan, phosfolan-methyl, phosglycin, phosmet, phosnichlor, phosphine, phosphocarb, phostin, phoxim, phoxim-methyl, pirimetaphos, pirimicarb, pirimioxyphos, pirimiphos-ethyl, pirimiphos-methyl, plifenate, polythialan, potassium thiocyanate, prallethrin, precocene I, precocene II, precocene III, primidophos, proclonol, profenofos, profluthrin, promacyl, promecarb, propaphos, propargite, proparthrin, propetamphos, propoxur, propoxur, prothidathion, prothiofos, prothoate, protrifenbute, pyflubumide, pymetrozine, pyraclofos, pyrafluprole, pyramat, pyrazophos, pyrazothion, pyresmethrin, pyrethrin I, pyrethrin II, pyrethrins, pyridaben, pyridalyl, pyridaphenthion, pyrifluquinazon, pyrimidifen, pyriminostrobin, pyrimitate, pyriprole, pyriproxyfen, pyrolan, quassia, quinalphos, quinalphos-methyl, quinothion, quintiofos, rafoxanide, resmethrin, rhodojaponin-III, rotenone, ryania, sabadilla, sanguinarine, schradan, selamectin, semiamitraz, semiamitraz chloride, silafluofen, silica gel, sodium fluoride, sodium hexafluorosilicate, sodium pentachlorophenoxide, sodium tetrathiocarbonate, sodium thiocyanate, sophamide, spinetoram, spinosad, spirodiclofen, spiromesifen, spirotetramat, sulcofuron, sulcofuron-sodium, sulfiram, sulfluramid, sulfotep, sulfoxaflor, sulfoxime, sulfur, sulfuryl fluoride, sulprofos, tau-fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetradifon, tetramethrin, tetramethylfluthrin, tetranactin, tetraniliprole, tetrasul, theta-cypermethrin, thiacloprid, thiamethoxam, thiapronil, thicrofos, thiocarboxime, thiocyclam, thiodicarb, thiofanox, thiofluoximate, thiometon, thionazin, thioquinox, thiosultap, thiosultap-sodium, tioxazafen, tirpate, tolfenpyrad, tralocythrin, tralomethrin, tralopyril, transpermethrin, triarathene, triazamate, triazophos, trichlorfon, trichlormetaphos-3, trichloronat, trifenmorph, trifenofos, triflumezopyrim, triflumuron, trimethacarb, triprene, triptolide, valerate, vamidothion, vaniliprole, xiaochongliulin, XMC, xylenols, xylylcarb, yishijing, zeta-cypermethrin, zolaprofos, α-ecdysone, AKD-1193, DKN-2601, IKI-3106, KUI-1103, KUI-1301, KYIF-1402, ME5382, MIE-1209, MIE-1405, MSI-1301, MSI-1302, NA-89, NC-515, ZDI-2501, and ZDI-2502.

Examples of the herbicide and algicide include, but are not limited to, the following: 2,3,6-TBA, 2,4,5-TB, 2,4-D, 2,4-DB, 2,4-DEB, 2,4-DEP, 3,4-DA, 3,4-DB, 3,4-DP, 4-CPA, 4-CPB, 4-CPP, acetochlor, acifluorfen, aclonifen, acrolein, allidochlor, alloxydim, allyl alcohol, alorac, ametridione, ametryn, amibuzin, amicarbazone, amidosulfuron, aminocyclopyrachlor, aminopyralid, amiprofos-methyl, amiprophos, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, bentranil, benzadox, benzalkonium chloride, benzfendizone, benzipram, benzobicyclon, benzofenap, benzofluor, benzoylprop, benzthiazuron, bethoxazin, bicyclopyrone, bifenox, bilanafos, bispyribac, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole, carfentrazone, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornidine, chlornitrofen, chloropon, chlorotoluron, chloroxuron, chloroxynil, chlorprocarb, chlorpropham, chlorsulfuron, chlorthal, chlorthiamid, cinidon-ethyl, cinmethylin, cinosulfuron, cisanilide, clacyfos, clethodim, cliodinate, clodinafop, clofop, clomazone, clomeprop, cloprop, cloproxydim, clopyralid, cloransulam, CMA, copper sulfate, CPMF, CPPC, credazine, cresol, cumyluron, cyanamide, cyanatryn, cyanazine, cyanogen, cybutryne, cycloate, cyclopyrimorate, cyclosulfamuron, cycloxydim, cycluron, cyhalofop, cyperquat, cyprazine, cyprazole, cypromid, daimuron, dalapon, dazomet, delachlor, desmedipham, desmetryn, di-allate, dicamba, dichlobenil, dichlone, dichloralurea, dichlormate, dichlorophen, dichlorprop, dichlorprop-P, diclofop, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoterb, diphenamid, dipropalin, dipropetryn, diquat, disul, dithioether, dithiopyr, diuron, DMPA, DNOC, DSMA, EBEP, eglinazine, endothal, epronaz, EPTC, erbon, erlujixiancaoan, esprocarb, ethachlor, ethalfluralin, ethametsulfuron, ethaprochlor, ethidimuron, ethiolate, ethiozin, ethofumesate, ethoxyfen, ethoxysulfuron, etinofen, etnipromid, etobenzanid, EXD, fenasulam, fenoprop, fenoxaprop, fenoxaprop-P, fenoxasulfone, fenquinotrione, fenteracol, fenthiaprop, fentin, fentrazamide, fenuron, ferrous sulfate, flamprop, flamprop-M, flazasulfuron, florasulam, fluazifop, fluazifop-P, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, flurochloridone, fluroxypyr, flurtamone, fluthiacet, fomesafen, foramsulfuron, fosamine, fucaojing, fucaomi, funaihecaoling, furyloxyfen, glufosinate, glufosinate-P, glyphosate, halauxifen, halosafen, halosulfuron, haloxydine, haloxyfop, haloxyfop-P, herbimycin, hexachloroacetone, hexaflurate, hexazinone, huancaiwo, huangcaoling, hydrated lime, imazamethabenz, imazamox, imazapic, imazapyr, imazaquin, imazethapyr, imazosulfuron, indanofan, indaziflam, iodobonil, iodosulfuron, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, kuicaoxi, lactofen, lenacil, linuron, MAA, MAMA, MCPA, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiopyrisulfuron, methiozolin, methiuron, methometon, methoprotryne, methoxyphenone, methyl bromide, methyl iodide, methyl isothiocyanate, methyldymron, metobenzuron, metobromuron, metolachlor, metosulam, metoxuron, metribuzin, metsulfuron, molinate, monalide, monisouron, monochloroacetic acid, monolinuron, monosulfuron, monuron, morfamquat, MSMA, nabam, naproanilide, napropamide-M, naptalam, neburon, nicosulfuron, nipyraclofen, nitralin, nitrofen, nitrofluorfen, norflurazon, noruron, OCH, orbencarb, ortho-dichlorobenzene, orthosulfamuron, oryzalin, oxadiargyl, oxadiazon, oxapyrazon, oxasulfuron, oxaziclomefone, oxyfluorfen, parafluron, paraquat, pebulate, pelargonic acid, pendimethalin, penoxsulam, pentachlorophenyl laurate, pentanochlor, pentoxazone, perfluidone, pethoxamid, phenisopham, phenmedipham, phenmedipham-ethyl, phenobenzuron, picloram, picolinafen, pinoxaden, piperophos, pretilachlor, primisulfuron, procyazine, prodiamine, profluazol, profluralin, profoxydim, proglinazine, prometon, prometryn, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribambenz-isopropyl, pyribambenz-propyl, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, quizalofop, quizalofop-P, rhodethanil, rimsulfuron, saflufenacil, sebuthylazine, secbumeton, sethoxydim, shuangjiaancaolin, siduron, simazine, simeton, simetryn, SMA, S-metolachlor, sodium chlorate, sulcotrione, sulfallate, sulfentrazone, sulfometuron, sulfosulfuron, sulglycapin, swep, tavron, TCA, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr, thidiazimin, thidiazuron, thiencarbazone, thifensulfuron, thiobencarb, tiafenacil, tiocarbazil, tioclorim, tolpyralate, topramezone, tralkoxydim, triafamone, triallate, triasulfuron, triaziflam, tribenuron, tricamba, triclopyr, tridiphane, trietazine, trifloxysulfuron, trifludimoxazin, trifluralin, triflusulfuron, trifop, trifopsime, trihydroxytriazine, trimeturon, tripropindan, tritac, tritosulfuron, vernolate, xylachlor, zuomihuanglong, DAH-500, and SL-261.

Examples of the biological penticide include, but are not limited to, the following: nuclear polyhedrosis virus (NPV), granulosis virus (GV), cytoplasmic polyhedrosis virus (CPV), *Steinernema carpocapsae*, *Steinernema glaseri*, *Monacrosporium phymatophagum*, *Steinernema kushidai*, *Pasteuria penetrans*, *Agrobacterium radiobacter*, *Bacillus subtilis*, *Bucillus amyloliquefaciens*, *Erwinia carotovora*, *Pseudomonas fluorescens*, *Talaromyces flavus*, *Trichoderma atroviride*, *Bacillus thuringiensis*, *Beauveria brongniartii*, *Beauveria bassiana*, *Paecilomyces fumosoroseus*, *Verticillium lecanii*, *Xanthomonas campestris*, *Encarsia formosa*, *Eretmocerus eremicus*, *Eretmocerus mundus*, *Aphidoletes aphidimyza*, *Aphidoletes aphidimyza*, *Diglyphus isaea*, *Dacnusa sibirica*, *Phytoseiulus persimilis*, *Amblyseius cucumeris*, *Amblyseius californicus*, and *Orius strigicollis*.

Examples of the pheromone agent (insect pest attractant) include, but are not limited to, the following: brevicomin, ceralure, codlelure, cue-lure, disparlure, dominicalure-1, eugenol, frontalin, gossyplure, grandlure, hexalure, ipsdienol, ipsenol, japonilure, latilure, lineatin, litlure, looplure, medlure, megatomoic acid, methyl eugenol, moguchun, muscalure, orfralure, oryctalure, ostramone, rescalure, siglure, sulcatol, trimedlure, trunc-call, and α-multistriatin.

Examples of the pheromone agent (insect pest repellant) include, but are not limited to, the following: acrep, butopyronoxyl, camphor, d-camphor, carboxide, dibutyl phthalate, diethyltoluamide, dimethyl carbate, dimethyl phthalate, dibutyl succinate, ethohexadiol, hexamide, icaridin, methoquin-butyl, methylneodecanamide, 2-(methylthio)ethanol, oxamate, quwenzhi, quyingding, rebemide, and zengxiaoan.

Examples of the natural fungicide and natural pesticide include, but are not limited to, machine oils, methylphenyl acetate, α-pinene, protein hydrolysate, (Z)-1-tetradecen-1-ol, and turpentine.

Also, the fungicidal composition of the present invention may optionally contain, as a cooperative component, at least one biologically effective component, for example, plant growth regulators such as root stimulator, and fertilizers such as plant nutrient element, and thereby can form a multi-component pest control agent that offers a much wider scope of agricultural protection.

The mixing ratio by weight of (a) a compound of formula [1] or a salt thereof to (b) an agricultural or horticultural fungicide or a salt thereof in the fungicidal composition of the present invention is in the range of 1:3000 to 3000:1, preferably 1:1000 to 1000:1.

The dose of the fungicidal composition of the present invention varies with various factors including the crop to be treated, the disease to be controlled, the tendency of occurrence, the environmental conditions, and the dosage form to be used. When the composition is used in an "as-is" form such as powder or granule, the dose of the composition as calculated in terms of active components can be selected as appropriate from the range of 1 g to 50 kg, preferably 10 g to 10 kg, per hectare. When the composition is used in a liquid form such as emulsion, wettable powder or flowable, said dose can be selected as appropriate from the range of 0.1-50,000 ppm, preferably 10-10,000 ppm.

EXAMPLES

Those skilled in the art would recognize that the compound of formula [1] and its intermediates as described herein may be subjected to electrophilic reaction, nucleophilic reaction, radical reaction, organometallic reaction, oxidative reaction, or reductive reaction to thereby add a substituent or modify an existing substituent.

Even without any more detailed description, those skilled in the art in view of the descriptions given hereinabove should be able to make full use of the present invention. Hence, the working examples given below are understood to be merely illustrative and not limitative in any way of the disclosures herein. The steps given in the examples below are intended to describe the procedure of the steps in the whole synthesis process, and the starting materials used in each step do not necessarily have to be prepared by following the particular preparation procedures described in other examples or steps.

It should be noted that, as used hereinbelow, "%" refers to a percentage by weight and "parts" refers to parts by weight.

Example 1: Preparation of 4-[4-(6,9-difluoro-1,5-dihydro-3H-2,4-benzodioxepin-3-yl)-2-thiazolyl]-1-[2-[5-methyl-3-(trifluoromethyl)-1H-pyrazol-1-yl]acetyl]piperidine (Compound 1-3

The following starting materials, i.e., 4-(4-formyl-2-thiazolyl)-1-[2-[5-methyl-3-(trifluoromethyl)-1H-pyrazol-1-yl]acetyl]piperidine (210 mg) (compound as disclosed in WO 2008/013622), 3,6-difluoro-1,2-benzene dimethanol (210 mg), and para-toluene sulfonic acid monohydrate (11 mg), were dissolved in toluene (15 mL), and the mixture was refluxed by heating using a Dean-Stark apparatus for 1 hour. The reaction solution was cooled to room temperature, diluted with ethyl acetate, and washed with water and brine. The organic layer was dried with anhydrous sodium sulfate, the inorganic material was filtered off, and then the solvent was distilled off under reduced pressure. The residues were purified by flash silica gel chromatography (eluted with ethyl acetate/hexane (40-100%)) on an automatic flash purification system (Isolera™ produced by Biotage AB) to afford the title compound as a white amorphous solid (245 mg, yield 83%).

Example 2: Preparation of 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine (Compound 1-6

The following starting materials, i.e., 4-(4-formyl-2-thiazolyl)-1-[2-[5-methyl-3-(trifluoromethyl)-1H-pyrazol-1-yl]acetyl]piperidine (200 mg), 3-methylsulfonyloxy-1,2-benzenedimethanol (121 mg), and para-toluenesulfonic acid monohydrate (20 mg), were dissolved in toluene (20 mL), then reacted and purified in the same way as in the case of preparation of Compound 1-3 to afford the title compound as a white amorphous solid (298 mg, yield 96%).

Example 3: Preparation of 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine (Compound 1-8

The following starting materials, i.e., 4-(4-formyl-2-thiazolyl)-1-[2-[5-methyl-3-(trifluoromethyl)-1H-pyrazol-1-yl]acetyl]piperidine (220 mg), 3-fluoro-6-methylsulfonyloxy-1,2-benzenedimethanol (150 mg), and para-toluenesulfonic acid monohydrate (20 mg), were dissolved in toluene (15 mL), then reacted and purified in the same way as in the case of preparation of Compound 1-3 to afford the title compound as a white amorphous solid (297 mg, yield 84%). The resulting resinous product was mixed with methanol and dissolved therein under reflux by heating, and then the solution was left to stand at room temperature to afford a white solid (melting point 151° C.).

Example 4: Preparation of 4-[4-(6-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine (Compound 1-38

The following starting materials, i.e., 4-(4-formyl-2-thiazolyl)-1-[2-[3,5-bis(difluoromethyl)-1H-pyrazol-1-yl]acetyl]piperidine (202 mg) (compound as disclosed in WO 2010/066353), 3-methylsulfonyloxy-1,2-benzenedimethanol (232 mg), and para-toluenesulfonic acid monohydrate (5 mg), were dissolved in toluene (15 mL), then reacted and purified in the same way as in the case of preparation of Compound 1-3 to afford the title compound as a white amorphous solid (164 mg, yield 53%).

Example 5: Preparation of 4-[4-(6-methoxy-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine (Compound 1-39

The following materials, i.e., 4-(4-formyl-2-thiazolyl)-1-[2-[3,5-bis(difluoromethyl)-1H-pyrazol-1-yl]acetyl]piperidine (202 mg), 3-methoxy-6-methylsulfonyloxy-1,2-benzenedimethanol (232 mg), and para-toluenesulfonic acid monohydrate (5 mg), were dissolved in toluene (15 mL), then reacted and purified in the same way as in the case of preparation of Compound 1-3 to afford the title compound as a white amorphous solid (268 mg, yield 75%). The resulting resinous product was mixed with methanol and dissolved therein under reflux by heating, and then the solution was left to stand at room temperature to afford a white solid (melting point 123-125° C.).

Example 6: Preparation of 4-[4-(6-methylsulfonyloxy-1,5-dihydro-3H-2,4-benzodioxepin-3-yl)-2-thiazolyl]-1-[2-[3,5-bis(trifluoromethyl)-1H-pyrazol-1-yl]acetyl]piperidine (Compound 1-42

The following starting materials, i.e., 4-(4-formyl-2-thiazolyl)-1-[2-[3,5-bis(trifluoromethyl)-1H-pyrazol-1-yl]acetyl]piperidine (200 mg) (synthesized in the same way as 4-(4-formyl-2-thiazolyl)-1-[2-[5-methyl-3-(trifluoromethyl)-1H-pyrazol-1-yl]acetyl]piperidine), 3-methylsulfonyloxy-1,2-benzenedimethanol (109 mg), and para-toluenesulfonic acid monohydrate (5 mg), were dissolved in toluene (100 mL), then reacted and purified in the same way as in the case of preparation of Compound 1-3 to afford the title compound as a white amorphous solid (96 mg, yield 31%).

Example 7: Preparation of 4-[4-(6,9-difluoro-1,5-dihydro-3H-2,4-benzodioxepin-3-yl)-2-thiazolyl]-1-[2-[3,5-bis(trifluoromethyl)-1H-pyrazol-1-yl]acetyl] piperidine (Compound 1-50

The following starting materials, i.e., 4-(4-formyl-2-thiazolyl)-1-[2-[3,5-bis(trifluoromethyl)-1H-pyrazol-1-yl] acetyl]piperidine (200 mg), 3,6-difluoro-1,2-benzenedimethanol (82 mg), and para-toluenesulfonic acid monohydrate (5 mg), were dissolved in toluene (100 mL), then reacted and purified in the same way as in the case of preparation of Compound 1-3 to afford the title compound as a white amorphous solid (183 mg, yield 53%).

Example 8: Preparation of 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine (Compound 1-62

The following starting materials, i.e., 4-(4-formyl-2-thiazolyl)-1-[2-[3,5-bis(difluoromethyl)-1H-pyrazol-1-yl] acetyl]piperidine (202 mg), 3-fluoro-6-methylsulfonyloxy-1,2-benzenedimethanol (250 mg), and para-toluenesulfonic acid monohydrate (5 mg), were dissolved in toluene (15 mL), then reacted and purified in the same way as in the case of preparation of Compound 1-3 to afford the title compound as a white amorphous solid (105 mg, yield 33%).

The following Examples 9 to 12 are preparation examples of some starting materials used in Examples 1 to 8 above.

Example 9: Preparation of 3,6-difluoro-1,2-benzenedimethanol

Lithium aluminum hydride (870 mg) and 3,6-difluorophthalic anhydride were dissolved in that order in 27 mL of tetrahydrofuran under cooling with ice, and the reaction solution was refluxed by heating for 2 hours. The reaction solution was cooled to room temperature, water was added under cooling with ice, and then the mixture was stirred at room temperature for 1 hour. The solution was filtered through celite, and the solvent was distilled off under reduced pressure to afford the title compound as a white solid (640 mg, yield 68%).

$^1$H-NMR (CDCl$_3$/TMS δ (ppm)): 2.89 (brs, 2H), 4.84 (s, 4H), 7.03 (dd, 2H)

Example 10: Preparation of 3-methylsulfonyloxy-1,2-benzenedimethanol

The starting material, 3-methylsulfonyloxy phthalic anhydride (2.2 g) (compound as disclosed in WO 2004/000796), was dissolved in tetrahydrofuran (60 mL), borane tetrahydrofuran complex (0.9M tetrahydrofuran solution, 50 mL) was added, and the mixture was stirred at 60° C. for 6 hours. After completion of the reaction, methanol was added under cooling with ice, and the solvent was distilled off under reduced pressure. The residues were diluted with ethyl acetate and washed with 1N hydrochloric acid and brine. The organic layer was dried with anhydrous sodium sulfate, the inorganic material was filtered off, and the solvent was distilled off under reduced pressure. The residues were purified by flash silica gel chromatography (eluted with ethyl acetate/hexane (30-100%)) on an automatic flash purification system (Isolera™ produced by Biotage AB) to afford 3-methylsulfonyloxy-1,2-benzenedimethanol as a white solid (1.36 mg, yield 64%, melting point 56-58° C.).

$^1$H-NMR (DMSO-d6/TMS δ(ppm)): 3.42 (s, 3H), 4.57 (d, 2H), 4.70 (d, 2H), 4.98 (t, 1H), 5.27 (t, 1H), 7.25 (d, 1H), 7.36 (t, 1H), 7.46 (d, 1H)

Example 11: Preparation of 3-fluoro-6-methylsulfonyloxy-1,2-benzenedimethanol

Step 1: Preparation of 5-fluoro-2-methylsulfonyloxyphthalide

The starting material, 5-fluoro-2-hydroxyphthalide (200 mg) (compound as disclosed in WO 2003/076424), was dissolved in N,N-dimethylformamide (10 mL), methylsulfonyl chloride (150 mg) and triethyl amine (133 mg) were added, and the mixture was stirred at room temperature overnight. The reaction solution was diluted with ethyl acetate and washed with brine. The organic layer was dried with anhydrous sodium sulfate, the inorganic material was filtered off, and the solvent was distilled off under reduced pressure to afford 5-fluoro-2-methylsulfonyloxyphthalide as a white solid (290 mg, yield 100%).

Step 2: Preparation of 3-fluoro-6-methylsulfonyloxy-1,2-benzenedimethanol

The starting material, 5-fluoro-2-methylsulfonyloxyphthalide (290 mg), was dissolved in tetrahydrofuran (10 mL), lithium aluminum hydride (45 mg) was added, and the mixture was stirred at room temperature for 30 minutes. Then, 1N hydrochloric acid was added to the reaction solution under cooling with ice, and the mixture was stirred at room temperature for 1 hour. The reaction solution was subjected to extraction with dichloromethane and washed with brine. The organic layer was dried with anhydrous sodium sulfate, the inorganic material was filtered off, and the solvent was distilled off under reduced pressure to afford 3-fluoro-6-methylsulfonyloxy-1,2-benzenedimethanol as a white solid (290 mg, yield 100%, melting point 85-87° C.).

$^1$H-NMR (CDCl$_3$/TMS δ (ppm)): 3.28 (s, 3H), 3.45 (brs, 2H), 4.84 (s, 4H), 7.11 (dd, 1H), 7.25 to 7.28 (m, 1H)

Example 12: Preparation of 3-methoxy-6-methylsulfonyloxy-1,2-benzenedimethanol

Step 1: Preparation of 2,3-bis(methoxycarbonyl)-1-methoxy-4-methylsulfonyloxybenzene The starting material, 2,3-bis(methoxycarbonyl)-4-methoxyphenol (2.0 g) (compound as disclosed in Synthetic Communication, 43(2), 260-267; 2013), was dissolved in tetrahydrofuran (30 mL), methylsulfonyl chloride (1.05 g) and triethyl amine (1.01 g) were added, and the mixture was stirred at room temperature for 1 hour. Water was added to the reaction solution, and the mixture was subjected to extraction with ethyl acetate and washed with brine. The organic layer was dried with anhydrous sodium sulfate, the inorganic material was filtered off, and the solvent was distilled off under reduced pressure to afford 2,3-bis(methoxycarbonyl)-1-methoxy-4-methylsulfonyloxybenzene as a white solid (2.5 g, yield 100%).

Step 2: Preparation of 3-methoxy-6-methylsulfonyloxy-1,2-benzenedimethanol

The starting material, 2,3-bis(methoxycarbonyl)-1-methoxy-4-methylsulfonyloxybenzene (2.5 g), was dissolved in tetrahydrofuran (30 mL), lithium aluminum hydride (620 mg) was added under cooling with ice, and the mixture was stirred under cooling with ice for 1 hour. Then, 1N hydrochloric acid was added to the reaction solution under cooling with ice, and the mixture was stirred at room temperature for 1 hour. The reaction solution was subjected to extraction with ethyl acetate and washed with brine. The organic layer was dried with anhydrous sodium sulfate, the inorganic material was filtered off, and the solvent was distilled off under reduced pressure. The residues were purified by flash silica gel chromatography (eluted with ethyl acetate/hexane (30-100%)) on an automatic flash purification system (Isolera™ produced by Biotage AB) to afford 3-methoxy-6-methylsulfonyloxy-1,2-benzenedimethanol as a white solid (906 mg, yield 42%).

$^1$H-NMR (DMSO-d6/TMS δ (ppm)): 3.39 (s, 3H), 3.81 (s, 3H), 4.62 to 4.64 (m, 4H), 4.84 (t, 1H), 5.06 (t, 1H), 7.03 (d, 1H), 7.28 (d, 1H)

Compounds 1-1, 1-2, 1-4, 1-5, 1-7, 1-9 to 1-37, 1-40, 1-41, 1-43 to 1-49, 1-51 to 1-61, and 1-63 to 1-161 as shown in Tables 5 to 8 were synthesized by the same preparation method.

TABLE 5

[1k]

| No. | $R^7$ | $R^8$ | $R^9$ | $R^{10}$ | $G^1$ | $R^6$ | n | T | $R^1$ | $R^3$ | $X^1$ | $X^2$ | $X^3$ | $X^4$ |
|---|---|---|---|---|---|---|---|---|---|---|---|---|---|---|
| 1-1 | CF$_3$ | Me | H | H | O | — | 0 | CH | H | H | H | H | H | H |
| 1-2 | CF$_3$ | Me | H | H | O | — | 0 | CH | H | H | F | H | H | H |
| 1-3 | CF$_3$ | Me | H | H | O | — | 0 | CH | H | H | F | H | H | F |
| 1-4 | CF$_3$ | Me | H | H | O | — | 0 | CH | H | H | H | Me | Me | H |
| 1-5 | CF$_3$ | Me | H | H | O | — | 0 | CH | H | H | H | Cl | Cl | H |
| 1-6 | CF$_3$ | Me | H | H | O | — | 0 | CH | H | H | OSO$_2$Me | H | H | H |
| 1-7 | CF$_3$ | Me | H | H | O | — | 0 | CH | H | H | OSO$_2$Et | H | H | H |
| 1-8 | CF$_3$ | Me | H | H | O | — | 0 | CH | H | H | OSO$_2$Me | H | H | F |
| 1-9 | CF$_3$ | Me | H | H | O | — | 0 | CH | H | H | H | OSO$_2$Me | H | H |
| 1-10 | CF$_3$ | Me | H | H | O | — | 0 | CH | H | H | H | —CH=CH—CH=CH— | | H |
| 1-11 | CF$_3$ | Me | H | H | O | — | 0 | CH | H | H | H | F | H | H |
| 1-12 | CF$_3$ | Me | H | H | O | — | 0 | CH | H | H | NO$_2$ | H | H | H |
| 1-13 | CF$_3$ | Me | H | H | O | — | 0 | CH | H | H | OSO$_2$c-Pr | H | H | H |
| 1-14 | CF$_3$ | Me | H | H | O | — | 0 | CH | H | H | Me | H | H | H |
| 1-15 | CF$_3$ | Me | H | H | O | — | 0 | CH | H | H | Br | H | H | H |
| 1-16 | CF$_3$ | Me | H | H | O | — | 0 | CH | H | H | H | CF$_3$ | H | H |
| 1-17 | CF$_3$ | Me | H | H | O | — | 0 | CH | H | H | F | F | F | F |
| 1-18 | CF$_3$ | Me | H | H | O | — | 0 | CH | H | Me | H | H | H | H |
| 1-19 | CF$_3$ | Me | H | H | O | — | 0 | CH | H | H | OSO$_2$Me | H | H | Me |
| 1-20 | CF$_3$ | Me | H | H | O | — | 0 | CH | H | H | H | Me | H | H |
| 1-21 | CF$_3$ | Me | H | H | O | — | 0 | CH | H | H | OSO$_2$n-Bu | H | H | H |
| 1-22 | CF$_3$ | Me | H | H | O | — | 0 | CH | H | H | OSO$_2$n-Pr | H | H | H |
| 1-23 | CF$_3$ | Me | H | H | O | — | 0 | CH | H | H | Cl | H | H | H |
| 1-24 | CF$_3$ | Me | H | H | O | — | 0 | CH | H | H | OMe | H | H | Br |
| 1-25 | CF$_3$ | Me | H | H | O | — | 0 | CH | H | H | OSO$_2$n —C$_8$H$_{17}$ | H | H | H |
| 1-26 | CF$_3$ | Me | H | H | O | — | 0 | CH | H | H | OSO$_2$Me | H | H | OMe |
| 1-27 | CF$_3$ | Me | H | H | O | — | 0 | CH | H | H | H | NO$_2$ | H | H |
| 1-28 | CF$_3$ | Me | H | H | O | — | 0 | CH | H | H | OSO$_2$i-Pr | H | H | H |
| 1-29 | CF$_3$ | Me | H | H | O | — | 0 | CH | H | H | H | OSO$_2$Et | H | H |
| 1-30 | CF$_3$ | Me | H | H | O | — | 0 | CH | H | H | OSO$_2$CH$_2$CH$_2$CF$_3$ | H | H | H |
| 1-31 | CF$_3$ | Me | H | H | O | — | 0 | CH | H | H | H | —CH$_2$CH$_2$CH$_2$— | | H |
| 1-32 | CF$_3$ | Me | H | H | O | — | 0 | CH | H | H | OSO$_2$Me | H | H | NO$_2$ |
| 1-33 | CF$_3$ | Me | H | H | O | — | 0 | CH | H | H | OH | H | H | H |
| 1-34 | CF$_3$ | Me | H | H | O | — | 0 | CH | H | H | OC(=O)c-Pr | H | H | H |
| 1-35 | CHF$_2$ | CHF$_2$ | H | H | O | — | 0 | CH | H | H | F | H | H | H |
| 1-36 | CF$_3$ | Me | H | H | O | — | 0 | CH | H | H | OSO$_2$CF$_3$ | H | H | H |
| 1-37 | CF$_3$ | Me | H | H | O | — | 0 | CH | H | H | OC(=O)OMe | H | H | H |
| 1-38 | CHF$_2$ | CHF$_2$ | H | H | O | — | 0 | CH | H | H | OSO$_2$Me | H | H | H |
| 1-39 | CHF$_2$ | CHF$_2$ | H | H | O | — | 0 | CH | H | H | OSO$_2$Me | H | H | OMe |
| 1-40 | CF$_3$ | Me | H | H | O | — | 0 | CH | H | H | H | Cl | H | H |
| 1-41 | CF$_3$ | CF$_3$ | H | H | O | — | 0 | CH | H | H | F | H | H | H |
| 1-42 | CF$_3$ | CF$_3$ | H | H | O | — | 0 | CH | H | H | OSO$_2$Me | H | H | H |
| 1-43 | CF$_3$ | Me | H | H | O | — | 0 | CH | H | H | NHSO$_2$Me | H | H | H |

TABLE 6

| No. | R⁷ | R⁸ | R⁹ | R¹⁰ | G¹ | R⁶ | n | T | R¹ | R³ | X¹ | X² | X³ | X⁴ |
|---|---|---|---|---|---|---|---|---|---|---|---|---|---|---|
| 1-44 | CHF₂ | CHF₂ | H | H | O | — | 0 | CH | H | H | OSO₂Me | H | H | Me |
| 1-45 | CF₃ | Me | H | H | O | — | 0 | CH | H | H | OSO₂Me | F | H | H |
| 1-46 | CF₃ | Me | H | H | O | — | 0 | CH | H | H | OMe | H | H | NO₂ |
| 1-47 | CF₃ | Me | H | H | O | — | 0 | CH | H | H | SO₂Me | H | H | H |
| 1-48 | CF₃ | Me | H | H | O | — | 0 | CH | H | H | OSO₂Ph | H | H | H |
| 1-49 | CHF₂ | CHF₂ | H | H | O | — | 0 | CH | H | H | H | NO₂ | H | H |
| 1-50 | CF₃ | CF₃ | H | H | O | — | 0 | CH | H | H | F | H | H | F |
| 1-51 | CHF₂ | CHF₂ | H | H | O | — | 0 | CH | H | H | F | H | H | F |
| 1-52 | CF₃ | Me | H | H | O | — | 0 | CH | H | H | CH₂OH | H | H | H |
| 1-53 | CHF₂ | CHF₂ | H | H | O | — | 0 | CH | H | H | OSO₂i-Pr | H | H | H |
| 1-54 | CHF₂ | CHF₂ | H | H | O | — | 0 | CH | H | H | OSO₂n-Bu | H | H | H |
| 1-55 | CHF₂ | CHF₂ | H | H | O | — | 0 | CH | H | H | F | F | F | F |
| 1-56 | CF₃ | Me | H | H | O | — | 0 | CH | H | H | Ph | H | H | H |
| 1-57 | CHF₂ | CHF₂ | H | H | O | — | 0 | CH | H | H | OMe | H | H | Br |
| 1-58 | CHF₂ | CHF₂ | H | H | O | — | 0 | CH | H | H | Cl | H | H | H |
| 1-59 | CHF₂ | CHF₂ | H | H | O | — | 0 | CH | H | H | OSO₂n-C₈H₁₇ | H | H | H |
| 1-60 | CHF₂ | CHF₂ | H | H | O | — | 0 | CH | H | H | H | CF₃ | H | H |
| 1-61 | CHF₂ | CHF₂ | H | H | O | — | 0 | CH | H | H | H | —CH₂CH₂CH₂— | | H |
| 1-62 | CHF₂ | CHF₂ | H | H | O | — | 0 | CH | H | H | OSO₂Me | H | H | F |
| 1-63 | CF₃ | Me | H | H | O | — | 0 | CH | H | H | C(=NOMe)H | H | H | H |
| 1-64 | CF₃ | Me | H | H | O | — | 0 | CH | H | H | OSO₂Me | H | Me | Me |
| 1-65 | CF₃ | Me | H | H | O | — | 0 | CH | H | H | OSO₂Me | H | H | Cl |
| 1-66 | CF₃ | Me | H | H | O | — | 0 | CH | H | H | OSO₂Me | H | H | Br |
| 1-67 | CF₃ | CF₃ | H | H | O | — | 0 | CH | H | H | OSO₂i-Pr | H | H | H |
| 1-68 | CF₃ | CF₃ | H | H | O | — | 0 | CH | H | H | OSO₂n-Bu | H | H | H |
| 1-69 | CF₃ | Me | H | H | O | — | 0 | CH | H | H | CH₂Cl | H | H | H |
| 1-70 | CF₃ | Me | H | H | O | — | 0 | CH | H | H | CHO | H | H | H |
| 1-71 | CF₃ | Me | H | H | O | — | 0 | CH | H | H | C(=NNMe₂)H | H | H | H |
| 1-72 | CF₃ | Me | H | H | O | — | 0 | CH | H | H | CH₂CN | H | H | H |
| 1-73 | CHF₂ | CHF₂ | H | H | O | — | 0 | CH | H | H | Ph | H | H | H |
| 1-74 | CHF₂ | CHF₂ | H | H | O | — | 0 | CH | H | H | OMe | H | H | NO₂ |
| 1-75 | CHF₂ | CHF₂ | H | H | O | — | 0 | CH | H | Me | H | H | H | H |
| 1-76 | CHF₂ | CHF₂ | H | H | O | — | 0 | CH | H | H | H | H | H | H |
| 1-77 | CHF₂ | CHF₂ | H | H | O | — | 0 | CH | H | H | H | —CH=CH—CH=CH— | | H |
| 1-78 | CHF₂ | CHF₂ | H | H | O | — | 0 | CH | H | H | H | t-Bu | H | H |
| 1-79 | CF₃ | Me | H | H | O | — | 0 | CH | H | H | H | t-Bu | H | H |
| 1-80 | CHF₂ | CHF₂ | H | H | O | — | 0 | CH | H | H | H | F | H | H |
| 1-81 | CHF₂ | CHF₂ | H | H | O | — | 0 | CH | H | H | H | CF₃ | H | H |
| 1-82 | CF₃ | CF₃ | H | H | O | — | 0 | CH | H | H | OMe | H | H | Br |
| 1-83 | CF₃ | CF₃ | H | H | O | — | 0 | CH | H | H | OMe | H | H | NO₂ |
| 1-84 | CF₃ | CF₃ | H | H | O | — | 0 | CH | H | H | F | F | F | F |
| 1-85 | CF₃ | CF₃ | H | H | O | — | 0 | CH | H | H | H | H | H | H |
| 1-86 | CF₃ | Me | H | H | O | — | 0 | CH | H | H | OMe | H | H | OCF₃ |
| 1-87 | CF₃ | CF₃ | H | H | O | — | 0 | CH | H | H | OSO₂Me | H | H | F |
| 1-88 | CF₃ | CF₃ | H | H | O | — | 0 | CH | H | Me | H | H | H | H |
| 1-89 | CF₃ | CF₃ | H | H | O | — | 0 | CH | H | H | H | —CH=CH—CH=CH— | | H |
| 1-90 | CF₃ | Me | H | H | O | — | 0 | CH | H | H | OSO₂NMe₂ | H | H | H |
| 1-91 | CF₃ | CF₃ | H | H | O | — | 0 | CH | H | H | H | F | H | H |
| 1-92 | CF₃ | CF₃ | H | H | O | — | 0 | CH | H | H | H | t-Bu | H | H |
| 1-93 | CF₃ | CF₃ | H | H | O | — | 0 | CH | H | H | Cl | H | H | H |
| 1-94 | CF₃ | Me | H | H | O | — | 0 | CH | H | H | OCHF₂ | H | H | H |
| 1-95 | CF₃ | CF₃ | H | H | O | — | 0 | CH | H | H | H | NO₂ | H | H |
| 1-96 | CF₃ | Me | H | H | O | — | 0 | CH | H | H | C(=NOH)H | H | H | H |

TABLE 7

| No. | R⁷ | R⁸ | R⁹ | R¹⁰ | G¹ | R⁶ | n | T | R¹ | R³ | X¹ | X² | X³ | X⁴ |
|---|---|---|---|---|---|---|---|---|---|---|---|---|---|---|
| 1-97 | CF₃ | Me | H | H | O | — | 0 | CH | H | H | CHF₂ | H | H | H |
| 1-98 | CF₃ | Me | H | H | O | — | 0 | CH | H | H | H | Br | H | H |
| 1-99 | CHF₂ | CHF₂ | H | H | O | — | 0 | CH | H | H | H | Br | H | H |
| 1-100 | CF₃ | Me | H | H | O | — | 0 | CH | H | H | Br | H | H | Br |
| 1-101 | CF₃ | Me | H | H | O | — | 0 | CH | H | H | OSO₂Me | H | H | I |
| 1-102 | CF₃ | Me | H | H | O | — | 0 | CH | H | H | OSO₂Me | H | H | Cl |
| 1-103 | CF₃ | Me | H | H | O | — | 0 | CH | H | H | OSO₂Me | H | H | OSO₂Me |
| 1-104 | CF₃ | Me | H | H | O | — | 0 | CH | H | H | CN | H | H | H |
| 1-105 | Me | Me | H | H | O | — | 0 | CH | H | H | OSO₂Me | H | H | H |
| 1-106 | CF₃ | Me | H | H | S | — | 0 | CH | H | H | OSO₂Me | H | H | H |
| 1-107 | CF₃ | Me | H | H | S | — | 0 | CH | H | H | OSO₂Me | H | H | F |
| 1-108 | CF₃ | Cl | H | H | O | — | 0 | CH | H | H | OSO₂Me | H | H | OMe |
| 1-109 | Cl | Cl | H | H | O | — | 0 | CH | H | H | OSO₂Me | H | H | OMe |
| 1-110 | CF₃ | CF₃ | H | H | O | — | 0 | CH | H | H | OMe | H | H | Cl |
| 1-111 | CF₃ | CF₃ | H | H | O | — | 0 | CH | H | H | Br | H | H | H |
| 1-112 | CHF₂ | CHF₂ | H | H | O | — | 0 | CH | H | H | OMe | H | H | Cl |
| 1-113 | CHF₂ | CHF₂ | H | H | O | — | 0 | CH | H | H | Br | H | H | H |

TABLE 7-continued

| No. | R⁷ | R⁸ | R⁹ | R¹⁰ | G¹ | R⁶ | n | T | R¹ | R³ | X¹ | X² | X³ | X⁴ |
|---|---|---|---|---|---|---|---|---|---|---|---|---|---|---|
| 1-114 | CF₃ | CF₃ | H | H | O | — | 0 | CH | H | H | NO₂ | H | H | H |
| 1-115 | Me | Me | H | H | O | — | 0 | CH | H | H | OSO₂Me | H | H | OMe |
| 1-116 | CHF₂ | CHF₂ | H | H | O | — | 0 | CH | H | H | OSO₂Me | H | H | Cl |
| 1-117 | CF₃ | CF₃ | H | H | O | — | 0 | CH | H | H | OSO₂Me | H | H | OMe |
| 1-118 | CF₃ | CF₃ | H | H | O | — | 0 | CH | H | H | OSO₂Me | H | H | Cl |
| 1-119 | CHCl₂ | CHCl₂ | H | H | O | — | 0 | CH | H | H | OSO₂Me | H | H | H |
| 1-120 | Me | Me | H | H | O | — | 0 | CH | H | H | OSO₂Me | H | H | F |
| 1-121 | CHF₂ | CHF₂ | H | H | O | — | 0 | CH | H | H | OSO₂Me | H | Me | Me |
| 1-122 | CF₃ | CF₃ | H | H | O | — | 0 | CH | H | H | OSO₂Me | H | Me | Me |
| 1-123 | CF₃ | CF₃ | H | H | O | — | 0 | CH | H | H | OSO₂Me | H | H | Br |
| 1-124 | CHF₂ | CHF₂ | H | H | O | — | 0 | CH | H | H | OSO₂Me | H | H | NO₂ |
| 1-125 | CHF₂ | CHF₂ | H | H | O | — | 0 | CH | H | H | OSO₂Me | H | H | Br |
| 1-126 | CHF₂ | CHF₂ | H | H | O | — | 0 | CH | H | H | NO₂ | H | H | H |
| 1-127 | CF₃ | Me | H | H | O | — | 0 | N | H | H | OSO₂Me | H | H | H |
| 1-128 | CF₃ | CF₃ | H | H | O | — | 0 | CH | H | H | OSO₂Me | H | H | NO₂ |
| 1-129 | CF₃ | CF₃ | H | H | O | — | 0 | CH | H | H | OSO₂Me | H | H | I |
| 1-130 | CHF₂ | CHF₂ | H | H | O | — | 0 | CH | H | H | OSO₂Me | H | H | I |
| 1-131 | CF₃ | CF₃ | H | H | O | — | 0 | CH | H | H | OSO₂Me | F | H | H |
| 1-132 | CHF₂ | CHF₂ | H | H | O | — | 0 | CH | H | H | OSO₂Me | F | H | H |
| 1-133 | CF₃ | Me | H | H | O | — | 0 | CH | H | H | OMe | H | H | F |
| 1-134 | CF₃ | CF₃ | H | H | O | — | 0 | CH | H | H | OMe | H | H | Me |
| 1-135 | CF₃ | Me | H | H | O | — | 0 | CH | H | H | OMe | H | H | H |
| 1-136 | CHF₂ | CHF₂ | H | H | O | — | 0 | CH | H | H | OCHF₂ | H | H | H |
| 1-137 | CF₃ | CF₃ | H | H | O | — | 0 | CH | H | H | OCHF₂ | H | H | H |
| 1-138 | CHF₂ | CHF₂ | H | H | O | — | 0 | CH | H | H | H | OSO₂Me | H | H |
| 1-139 | CF₃ | CF₃ | H | H | O | — | 0 | CH | H | H | H | OSO₂Me | H | H |
| 1-140 | CF₃ | CF₃ | H | H | O | — | 0 | CH | H | H | OMe | H | H | H |
| 1-141 | CHF₂ | CHF₂ | H | H | O | — | 0 | CH | H | H | OMe | H | H | H |
| 1-142 | CF₃ | CF₃ | H | H | O | — | 0 | CH | H | H | OMe | H | H | F |
| 1-143 | CF₃ | Me | H | H | O | — | 0 | CH | H | H | OSO₂Me | H | H | OCHF₂ |
| 1-144 | CF₃ | Me | H | H | O | — | 0 | CH | H | H | OAc | H | H | H |
| 1-145 | CHF₂ | CHF₂ | H | H | O | — | 0 | CH | H | H | C(=NOH)H | H | H | H |
| 1-146 | CHF₂ | CHF₂ | H | H | O | — | 0 | CH | H | H | OSO₂Me | H | H | OSO₂Me |

TABLE 8

| No. | R⁷ | R⁸ | R⁹ | R¹⁰ | G¹ | R⁶ | n | T | R¹ | R³ | X¹ | X² | X³ | X⁴ |
|---|---|---|---|---|---|---|---|---|---|---|---|---|---|---|
| 1-147 | CF₃ | CF₃ | H | H | O | — | 0 | CH | H | H | OSO₂Me | H | H | OSO₂Me |
| 1-148 | CHF₂ | CHF₂ | H | H | O | — | 0 | CH | H | H | CN | H | H | H |
| 1-149 | CF₃ | CF₃ | H | H | O | — | 0 | CH | H | H | C(=NOH)H | H | H | H |
| 1-150 | CF₃ | CF₃ | H | H | O | — | 0 | CH | H | H | CN | H | H | H |
| 1-151 | CHF₂ | CHF₂ | H | H | O | — | 0 | N | H | H | OSO₂Me | H | H | H |
| 1-152 | CF₃ | Me | Me | H | O | — | 0 | CH | H | H | OSO₂Me | H | H | H |
| 1-153 | CHF₂ | Me | H | H | O | — | 0 | CH | H | H | OSO₂Me | H | H | F |
| 1-154 | CF₃ | Me | H | H | O | — | 0 | CH | Me | H | OSO₂Me | H | H | F |
| 1-155 | CF₃ | Me | F | F | O | — | 0 | CH | H | H | OSO₂Me | H | H | F |
| 1-156 | CF₃ | Me | Me | H | O | — | 0 | CH | H | H | OSO₂Me | H | H | F |
| 1-157 | CF₃ | Me | H | H | O | 3-Me | 1 | CH | H | H | OSO₂Me | H | H | F |
| 1-158 | CHF₂ | CHF₂ | H | H | S | — | 0 | CH | H | H | OSO₂Me | H | H | F |
| 1-159 | CF₃ | Me | H | H | O | 2-Me | 1 | CH | H | H | OSO₂Me | H | H | F |
| 1-160 | CHF₂ | CHF₂ | Me | H | O | — | 0 | CH | H | H | OSO₂Me | H | H | F |
| 1-161 | CF₃ | Me | H | H | O | — | 0 | CH | H | H | OH | H | H | F |

Tables 9 to 18 show the ¹H-NMR data (CDCl₃/TMS δ (ppm)) of the compounds prepared in the above Examples and the compounds of the present invention prepared by the same method.

TABLE 9

| No. | CDCl₃/TMS δ (ppm) |
|---|---|
| 1-1 | 1.75 (m, 2H), 2.22 (m, 2H), 2.32 (s, 3H), 2.84 (t, 1H), 3.27-3.36 (m, 2H), 4.04 (d, 1H), 4.60 (d, 1H), 5.02 (m, 6H), 6.03 (s, 1H), 6.33 (s, 1H), 7.19 (m, 2H), 7.23 (m, 2H), 7.39 (s, 1H) |
| 1-2 | 1.75 (m, 2H), 2.27 (m, 2H), 2.32 (s, 3H), 2.87 (t, 1H), 3.25-3.36 (m, 2H), 4.04 (d, 1H), 4.61 (d, 1H), 4.93-5.06 (m, 5H), 5.24(d, 1H), 6.03 (s, 1H), 6.34 (s, 1H), 6.95 (m, 2H), 7.12 (m, 1H), 7.39 (s, 1H) |

TABLE 9-continued

| No. | CDCl₃/TMS δ (ppm) |
|---|---|
| 1-3 | 1.75 (m, 2H), 2.22 (m, 2H), 2.32 (s, 3H), 2.85 (t, 1H), 3.25-3.36 (m, 2H), 4.05 (d, 1H), 4.60 (d, 1H), 4.91~5.06 (m, 5H), 5.17 (d, 1H), 6.04 (s, 1H), 6.34 (s, 1H), 6.91 (dd, 2H), 7.40 (s, 1H) |
| 1-4 | 1.75 (m, 2H), 2.23 (m, 8H), 2.32 (s, 3H), 2.84 (t, 1H), 3.29-3.35 (m, 2H), 4.03 (d, 1H), 4.59 (d, 1H), 4.96 (m, 6H), 6.01 (s, 1H), 6.33 (s, 1H), 6.95 (s, 2H), 7.37 (s, 1H) |
| 1-5 | 1.74 (m, 2H), 2.22 (m, 2H), 2.25 (s, 3H), 2.67 (t, 1H), 3.25-3.34 (m, 2H), 4.04 (d, 1H), 4.60 (d, 1H), 4.69 (d, 2H), 4.87-5.03 (m, 4H), 6.00 (s, 1H), 6.34 (s, 1H), 7.26 (s, 2H), 7.47 (s, 1H) |
| 1-6 | 1.75 (m, 2H), 2.20 (m, 2H), 2.31 (s, 3H), 2.85 (t, 1H), 3.20 (s, 3H), 3.25-3.46 (m, 2H), 4.03 (d, 1H), 4.59 (d, 1H), 4.92-5.08 (m, 5H), 5.26 (d, 1H), 6.03 (s, 1H), 6.33 (s, 1H), 7.12 (m, 1H), 7.21 (m, 2H) 7.39 (s, 1H) |
| 1-7 | 1.56 (t, 2H), 1.75 (m, 2H), 2.26 (m, 2H), 2.31 (s, 3H), 2.84 (t, 1H), 3.24-3.38 (m, 4H), 4.02 (d, 1H), 4.59 (d, 1H), 4.94-5.08 (m, 5H), 5.27 (d, 1H), 6.02 (s, 1H), 6.33 (s, 1H), 7.11 (d, 1H), 7.21 (m, 2H), 7.39 (s, 1H) |
| 1-8 | 1.75 (m, 2H), 2.21 (m, 2H), 2.31 (s, 3H), 2.85 (t, 1H), 3.20 (s, 3H), 3.23-3.48 (m, 2H), 4.03 (d, 1H), 4.59 (d, 1H), 4.96 (m, 4H), 5.20 (d, 2H), 6.03 (s, 1H), 6.33 (s, 1H), 6.99 (dd, 1H), 7.18 (dd, 1H), 7.40 (s, 1H) |
| 1-9 | 1.74 (m, 2H), 2.21 (m, 2H), 2.34 (s, 3H), 2.85 (t, 1H), 3.20 (s, 3H), 3.23-3.47 (m, 2H), 4.01 (d, 1H), 4.59 (d, 1H), 5.00 (m, 6H), 6.03 (s, 1H), 6.33 (s, 1H), 7.12 (m, 2H), 7.22 (m, 1H), 7.39 (s, 1H) |
| 1-10 | 1.77 (m, 2H), 2.22 (m, 2H), 2.32 (s, 3H), 2.84 (t, 1H), 3.27-3.37 (m, 2H), 4.04 (d, 1H), 4.60 (d, 1H), 4.98 (dd, 2H), 5.19 (m, 4H), 6.08 (s, 1H), 6.33 (s, 1H), 7.40 (s, 1H), 7.48 (m, 2H), 7.68 (s, 2H), 7.80 (m, 2H) |
| 1-11 | 1.76 (m, 2H), 2.20 (m, 2H), 2.31 (s, 3H), 2.83 (t, 1H), 3.23-3.35 (m, 2H), 4.02 (d, 1H), 4.60 (d, 1H), 4.99 (m, 6H), 6.02 (s, 1H), 6.33 (s, 1H), 6.91 (m, 2H), 7.14 (m, 1H), 7.38 (s, 1H) |
| 1-12 | 1.78 (m, 2H), 2.22 (m, 2H), 2.32 (s, 3H), 2.86 (t, 1H), 3.29-3.37 (m, 2H), 4.05 (d, 1H), 4.61 (d, 1H), 4.95 (m, 3H), 5.13 (m, 2H), 5.30 (d, 1H), 6.06 (s, 1H), 6.33 (s, 1H), 7.38 (m, 3H), 7.84 (m, 1H) |
| 1-13 | 1.16 (dd, 1H), 1.32 (dd, 1H), 1.78 (m, 2H), 2.21 (m, 2H), 2.32 (s, 3H), 2.65 (m, 1H), 2.85 (t, 1H), 3.27-3.37 (m, 2H), 4.03 (d, 1H), 4.60 (d, 1H), 5.06 (m, 5H), 5.31 (d, 1H), 6.03 (s, 1H), 6.33 (s, 1H), 7.11 (m, 1H), 7.25 (m, 2H), 7.38 (s, 1H) |
| 1-14 | 1.75 (m, 2H), 2.14-2.36 (m, 8H), 2.84 (t, 1H), 3.24-3.36 (m, 2H), 4.03 (d, 1H), 4.60 (d, 1H), 4.98 (m, 5H), 5.15 (d, 1H), 6.04 (s, 1H), 6.33 (s, 1H), 7.00 (d, 1H), 7.11 (m, 2H), 7.39 (s, 1H) |
| 1-15 | 1.76 (m, 2H), 2.22 (m, 2H), 2.32 (s, 3H), 2.88 (t, 1H), 3.25-3.36 (m, 2H), 4.04 (d, 1H), 4.60 (d, 1H), 5.00 (m, 5H), 5.25 (d, 1H), 6.03 (s, 1H), 6.33 (s, 1H), 7.07 (m, 2H), 7.44 (s, 1H), 7.46 (d, 1H) |
| 1-16 | 1.75 (m, 2H), 2.22 (m, 2H), 2.32 (s, 3H), 2.88 (t, 1H), 3.25-3.36 (m, 2H), 4.04 (d, 1H), 4.60 (d, 1H), 5.00-5.10 (m, 6H), 6.05 (s, 1H), 6.33 (s, 1H), 7.27 (m, 1H), 7.40 (m, 2H), 7.49 (d, 1H) |
| 1-17 | 1.75 (m, 2H), 2.20 (m, 2H), 2.32 (s, 3H), 2.84 (t, 1H), 3.25-3.35 (m, 2H), 4.05 (d, 1H), 4.61 (d, 1H), 4.92 (d, 2H), 5.07 (d, 2H), 5.16 (d, 2H), 6.02 (s, 1H), 6.33 (s, 1H), 7.39 (s, 1H) |

TABLE 10

| No. | CDCl₃/TMS δ (ppm) |
|---|---|
| 1-18 | 1.75 (m, 5H), 2.20 (m, 2H), 2.32 (s, 3H), 2.89 (t, 1H), 3.27-3.35 (m, 2H), 4.02 (d, 1H), 4.59 (d, 1H), 4.93-5.06 (m, 4H), 5.27 (q, 1H), 6.13 (s, 1H), 6.33 (s, 1H), 7.19-7.31 (m, 4H), 7.37 (s, 1H) |
| 1-19 | 1.75 (m, 2H), 2.21 (m, 2H), 2.26 (s, 3H), 2.31 (s, 3H), 2.85 (t, 1H), 3.18 (s, 3H), 3.22-3.36 (m, 2H), 4.02 (d, 1H), 4.59 (d, 1H), 4.87-5.12 (m, 4H), 5.11 (d, 1H), 6.03 (s, 1H), 6.33 (s, 1H), 7.09 (s, 2H), 7.39 (s, 1H) |
| 1-20 | 1.76 (m, 2H), 2.24 (m, 2H), 2.31 (s, 3H), 2.32 (s, 3H), 2.80 (t, 1H), 3.22-3.34 (m, 2H), 4.02 (d, 1H), 4.59 (d, 1H), 4.98 (m, 6H), 6.02 (s, 1H), 6.33 (s, 1H), 7.04 (m, 3H), 7.37 (s, 1H) |
| 1-21 | 0.99 (t, 3H), 1.54 (m, 2H), 1.77 (m, 2H), 1.99 (m, 2H), 2.21 (m, 2H), 2.32 (s, 3H), 2.85 (t, 1H), 3.24-3.37 (m, 4H), 4.03 (d, 1H), 4.60 (d, 1H), 4.94-5.08 (m, 5H), 5.26 (d, 1H), 6.03 (s, 1H), 6.33 (s, 1H), 7.11 (d, 1H), 7.20 (d, 1H), 7.24 (m, 1H), 7.39 (s, 1H) |
| 1-22 | 1.14 (t, 3H), 1.70 (m, 2H), 2.04 (m, 2H), 2.22 (m, 2H), 2.31 (s, 3H), 2.84 (t, 1H), 3.24-3.37 (m, 4H), 4.02 (d, 1H), 4.60 (d, 1H), 4.99-5.08 (m, 5H), 5.29 (d, 1H), 6.02 (s, 1H), 6.32 (s, 1H), 7.11 (d, 1H), 7.22 (m, 2H), 7.39 (s, 1H) |
| 1-23 | 1.74 (m, 2H), 2.22 (m, 2H), 2.32 (s, 3H), 2.85 (t, 1H), 3.25-3.34 (m, 2H), 4.02 (d, 1H), 4.61 (d, 1H), 4.89-5.06 (m, 5H), 5.29 (d, 1H), 6.03 (s, 1H), 6.33 (s, 1H), 7.03 (d, 1H), 7.14 (t, 1H), 7.24 (m, 1H), 7.40 (s, 1H) |
| 1-24 | 1.78 (m, 2H), 2.22 (m, 2H), 2.32 (s, 3H), 2.85 (t, 1H), 3.25-3.36 (m, 2H), 3.79 (s, 3H), 4.03 (d, 1H), 4.60 (d, 1H), 4.90-5.04 (m, 4H), 5.15 (m, 2H), 6.03 (s, 1H), 6.33 (s, 1H), 6.65 (d, 1H), 7.39 (m, 2H) |
| 1-25 | 0.89 (t, 3H), 1.31 (m, 8H), 1.51 (m, 2H), 1.77 (m, 2H), 2.00 (m, 2H), 2.22 (m, 2H), 2.32 (s, 3H), 2.85 (t, 1H), 3.25-3.39 (m, 4H), 4.04 (d, 1H), 4.60 (d, 1H), 4.94-5.08 (m, 5H), 5.27 (d, 2H), 6.03 (s, 1H), 6.34 (s, 1H), 7.11 (d, 1H), 7.21 (m, 2H), 7.39 (s, 1H) |

TABLE 10-continued

| No. | CDCl$_3$/TMS δ (ppm) |
|---|---|
| 1-26 | 1.75 (m, 2H), 2.20 (m, 2H), 2.31 (s, 3H), 2.86 (t, 1H), 3.16 (s, 3H), 3.25-3.35 (m, 2H), 3.82 (s, 3H), 4.03 (d, 1H), 4.59 (d, 1H), 4.89-5.03 (m, 4H), 5.18 (m, 2H), 6.02 (s, 1H), 6.33 (s, 1H), 6.78 (d, 1H), 7.16 (d, 1H), 7.39 (m, 2H) |
| 1-27 | 1.76 (m, 2H), 2.22 (m, 2H), 2.37 (s, 3H), 2.85 (t, 1H), 3.16 (s, 3H), 3.25-3.36 (m, 2H), 4.05 (d, 1H), 4.61 (d, 1H), 4.94-5.05 (m, 5H), 5.12 (m, 1H), 6.06 (s, 1H), 6.34 (s, 1H), 7.32 (d, 1H), 7.40 (s, 1H), 8.03 (s, 1H), 8.08 (m, 1H) |
| 1-28 | 1.56 (m, 6H), 1.77 (m, 2H), 2.26 (m, 2H), 2.31 (s, 3H), 2.85 (t, 1H), 3.27-3.38 (m, 2H), 3.54 (m, 1H), 4.02 (d, 1H), 4.60 (d, 1H), 4.93-5.08 (m, 5H), 5.28 (d, 1H), 6.02 (s, 1H), 6.33 (s, 1H), 7.09 (d, 1H), 7.21 (m, 2H), 7.39 (s, 1H) |
| 1-29 | 1.53 (t, 3H), 1.76 (m, 2H), 2.21 (m, 2H), 2.31 (s, 3H), 2.81 (t, 1H), 3.24-3.35 (m, 4H), 4.02 (d, 1H), 4.60 (d, 1H), 4.99 (m, 6H), 6.03 (s, 1H), 6.33 (s, 1H), 7.10 (m, 2H), 7.20 (d, 1H), 7.38 (s, 1H) |
| 1-30 | 1.76 (m, 2H), 2.26 (m, 2H), 2.32 (s, 3H), 2.85 (m, 3H), 3.24-3.36 (m, 2H), 3.55 (m, 1H), 4.04 (d, 1H), 4.60 (d, 1H), 4.93-5.05 (m, 5H), 5.23 (d, 1H), 6.03 (s, 1H), 6.33 (s, 1H), 7.16 (m, 2H), 7.29 (m, 1H), 7.39 (s, 1H) |
| 1-31 | 1.73 (m, 2H), 2.07 (m, 2H), 2.20 (m, 2H), 2.31 (s, 3H), 2.85 (m, 5H), 3.23-3.34 (m, 2H), 4.02 (d, 1H), 4.59 (d, 1H), 4.99 (m, 6H), 6.02 (s, 1H), 6.33 (s, 1H), 7.06 (s, 2H), 7.37 (s, 1H) |
| 1-32 | 1.77 (m, 2H), 2.28 (m, 2H), 2.33 (s, 3H), 2.87 (t, 1H), 3.31 (s, 3H), 3.32 (m, 2H), 4.06 (d, 1H), 4.60 (d, 1H), 4.98-5.33 (m, 6H), 6.05 (s, 1H), 6.34 (s, 1H), 7.40 (m, 2H), 7.94 (d, 1H) |
| 1-33 | 1.71 (m, 2H), 2.21 (m, 2H), 2.30 (s, 3H), 2.80 (t, 1H), 3.20-3.31 (m, 2H), 3.97 (d, 1H), 4.56 (d, 1H), 4.89-5.00 (m, 5H), 5.30 (d, 1H), 6.02 (s, 1H), 6.33 (s, 1H), 6.64 (d, 1H), 6.68 (d, 1H), 6.73 (brs, 1H), 6.99 (t, 1H), 7.38 (s, 1H) |

TABLE 11

| No. | CDCl$_3$/TMS δ (ppm) |
|---|---|
| 1-34 | 1.02 (m, 2H), 1.15 (m, 2H), 1.76 (m, 2H), 1.84 (m, 1H), 2.21 (m, 2H), 2.31 (s, 3H), 2.84 (t, 1H), 3.24-3.34 (m, 2H), 4.04 (d, 1H), 4.60 (d, 1H), 4.83 (d, 1H), 4.92-5.07 (m, 5H), 6.01 (s, 1H), 6.33 (s, 1H), 6.97 (d, 1H), 7.03 (d, 1H), 7.22 (t, 1H), 7.38 (s, 1H) |
| 1-35 | 1.78 (m, 2H), 1.84 (m, 1H), 2.25 (dd, 2H), 2.88 (t, 1H), 3.33 (m, 2H), 3.92 (d, 1H), 4.60 (d, 1H), 4.83 (d, 1H), 4.93-5.15 (m, 5H), 5.24 (d, 1H), 6.04 (s, 1H), 6.51-7.01 (m, 5H), 7.28 (m, 1H), 7.39 (s, 1H) |
| 1-36 | 1.78 (m, 2H), 1.84 (m, 1H), 2.23 (m, 2H), 2.37 (s, 3H), 2.85 (t, 1H), 3.25-3.36 (m, 2H), 4.05 (d, 1H), 4.60 (d, 1H), 4.94-5.11 (m, 5H), 5.23 (d, 1H), 6.04 (s, 1H), 6.34 (s, 1H), 7.19 (m, 2H), 7.30 (d, 1H), 7.40 (s, 1H) |
| 1-37 | 1.78 (m, 2H), 2.22 (m, 2H), 2.32 (s, 3H), 2.85 (t, 1H), 3.20-3.33 (m, 2H), 4.04 (d, 1H), 4.60 (d, 1H), 4.86-5.13 (m, 6H), 6.02 (s, 1H), 6.33 (s, 1H), 7.06 (m, 2H), 7.23 (d, 1H), 7.39 (s, 1H) |
| 1-38 | 1.78 (m, 2H), 2.25 (dd, 2H), 2.92 (t, 1H), 3.21 (s, 3H), 3.35 (m, 2H), 3.91 (d, 1H), 4.61 (d, 1H), 4.83 (d, 1H), 4.96-5.15 (m, 3H), 5.15 (d, 1H), 5.26 (d, 1H), 6.03 (s, 1H), 6.53-7.02 (m, 3H), 7.13 (d, 1H), 7.21 (m, 2H), 7.40 (s, 1H) |
| 1-39 | 1.83 (m, 2H), 2.24 (dd, 2H), 2.90 (t, 1H), 3.23 (s, 3H), 3.35 (m, 2H), 3.82 (s, 3H), 3.91 (d, 1H), 4.60 (d, 1H), 4.93 (t, 2H), 5.14-5.23 (m, 4H), 5.26 (d, 1H), 6.02 (s, 1H), 6.53-7.02 (m, 4H), 7.16 (d, 1H), 7.40 (s, 1H) |
| 1-40 | 1.76 (m, 2H), 2.20 (m, 2H), 2.31 (s, 3H), 2.83 (t, 1H), 3.26-3.32 (m, 2H), 4.03 (d, 1H), 4.59 (d, 1H), 4.91-5.01 (m, 6H), 6.01 (s, 1H), 6.33 (s, 1H), 7.10 (d, 1H), 7.16-7.19 (m, 2H), 7.38 (s, 1H) |
| 1-41 | 1.75-1.84 (m, 2H), 2.20 (d, 2H), 2.30 (d, 2H), 2.88 (t, 1H), 3.28-3.38 (m, 2H), 3.84 (d, 1H), 4.59 (d, 1H), 4.93-5.06 (m, 3H), 5.18-5.26 (m, 3H), 6.04 (s, 1H), 6.93-7.16 (m, 3H), 7.16-7.18 (m, 1H), 7.40 (s, 1H) |
| 1-42 | 1.79-1.88 (m, 2H), 2.21 (d, 2H), 2.30 (d, 2H), 2.90 (t, 1H), 3.21 (s, 3H), 3.29-3.38 (m, 2H), 3.85 (d, 1H), 4.59 (d, 1H), 4.99-5.09 (m, 3H), 5.19 (s, 2H), 5.26 (d, 1H), 6.03 (s, 1H), 6.95 (s, 1H), 7.13 (d, 1H), 7.20-7.27 (m, 1H), 7.40 (s, 1H) |
| 1-43 | 1.68-1.75 (m, 2H), 2.09-2.18 (m, 2H), 2.31 (s, 3H), 2.91 (m, 1H), 2.97 (s, 3H), 3.22-3.28 (m, 2H), 3.95 (dd, 1H), 4.41-4.54 (m, 3H), 4.73 (dd, 1H), 4.91-5.03 (m, 3H), 6.33 (s, 1H), 6.85 (s, 1H), 7.02 (d, 1H) 7.25-7.30 (m, 2H), 7.60 (d, 1H) |
| 1-44 | 1.76-1.88 (m, 2H), 2.20-2.31 (m, 5H), 2.90 (t, 1H), 3.18 (s, 3H), 3.29-3.39 (m, 2H), 3.92 (d, 1H), 4.60 (d, 1H), 4.90 (d, 1H), 4.98 (d, 1H), 5.09-5.23 (m, 4H), 6.04 (s, 1H), 6.53-7.00 (m, 3H), 7.11 (s, 2H), 7.40 (s, 1H) |
| 1-45 | 1.74-1.80 (m, 2H), 2.17-2.27 (m, 2H), 2.32 (s, 3H), 2.86 (t, 1H), 3.24-3.36 (m, 5H), 4.03 (d, 1H), 4.59 (d, 1H), 4.90-5.04 (m, 5H), 5.28 (d, 1H), 6.02 (s, 1H), 6.33 (s, 1H), 7.07 (s, 2H), 7.39 (s, 1H) |
| 1-46 | 1.79 (m, 2H), 2.18-2.31 (m, 2H), 2.37 (s, 3H), 2.86 (t, 1H), 3.29-3.37 (m, 2H), 3.90 (s, 3H), 4.08 (d, 1H), 4.60 (d, 1H), 4.92-5.00 (m, 3H), 5.14 (dd, 2H), 5.30 (d, 1H), 6.04 (s, 1H), 6.34 (s, 1H), 6.83 (d, 1H), 7.40 (s, 1H), 7.99 (d, 1H) |
| 1-47 | 1.72-1.83 (m, 2H), 2.17, −2.32 (m, 2H), 2.37 (s, 3H), 2.85 (t, 1H), 3.12 (s, 3H), 3.28-3.36 (m, 2H), 4.04 (d, 1H), 4.60 (d, 1H), 4.98-5.15 (m, 4H), 5.27 (d, 1H), 5.62 (d, 1H), 6.05 (s, 1H), 6.33 (s, 1H), 7.40-7.45 (m, 3H), 7.98 (m, 1H) |
| 1-48 | 1.73-1.82 (m, 2H), 2.17-2.28 (m, 2H), 2.32 (s, 3H), 2.85 (t, 1H), 3.28-3.35 (m, 2H), 4.04 (d, 1H), 4.60 (d, 1H), 4.72 (d, 1H), 4.88-5.02 (m, 5H), 5.93 (s, 1H), 6.33 (s, 1H), 6.84 (d, 1H), 7.05 (d, 1H), 7.14 (t, 1H), 7.32 (s, 1H), 7.55 (t, 2H), 7.69 (t, 1H), 7.86 (d, 2H) |

TABLE 11-continued

| No. | CDCl$_3$/TMS δ (ppm) |
|---|---|
| 1-49 | 1.78-1.88 (m, 2H), 2.25 (dd, 2H), 2.88 (t, 1H), 3.14-3.38 (m, 2H), 3.92 (d, 1H), 4.61 (d, 1H), 5.00 (d, 2H), 5.11-5.19 (m, 4H), 6.06 (s, 1H), 6.53-7.02 (m, 3H), 7.32 (d, 1H), 7.40 (s, 1H), 8.04-8.11 (m, 2H) |

TABLE 12

| No. | CDCl$_3$/TMS δ (ppm) |
|---|---|
| 1-50 | 1.78-1.92 (m, 2H), 2.26 (dd, 2H), 2.89 (t, 1H), 3.30-3.40 (m, 2H), 3.85 (d, 1H), 4.60 (d, 1H), 4.93 (d, 2H), 5.15-5.22 (m, 4H), 6.04 (s, 1H), 6.89-6.95 (m, 3H), 7.41 (s, 1H) |
| 1-51 | 1.78-1.88 (m, 2H), 2.26 (dd, 2H), 2.88 (t, 1H), 3.29-3.38 (m, 2H), 3.92 (d, 1H), 4.61 (d, 1H), 4.93 (d, 2H), 5.10-5.19 (m, 4H), 6.04 (s, 1H), 6.53-7.02 (m, 5H), 7.41 (s, 1H) |
| 1-52 | 1.71-1.80 (m, 2H), 2.19 (dd, 2H), 2.30 (s, 3H), 2.81 (t, 1H), 3.24-3.37 (m, 2H), 4.01 (d, 1H), 4.56 (d, 1H), 4.66 (s, 2H), 4.90-5.05 (m, 5H), 5.25 (d, 1H), 6.01 (s, 1H), 6.33 (s, 1H), 7.10 (d, 1H), 7.12-7.28 (m, 3H), 7.38 (s, 1H) |
| 1-53 | 1.58 (d, 6H), 1.74-1.90 (m, 2H), 2.24 (dd, 2H), 2.88 (t, 1H), 3.21-3.29 (m, 2H), 3.49-3.60 (m, 1H), 3.90 (d, 1H), 4.57 (d, 1H), 4.93-5.08 (m, 3H), 5.14 (s, 2H), 5.28 (d, 1H), 6.03 (s, 1H), 6.53-7.11 (m, 3H), 7.19-7.25 (m, 2H), 7.40 (s, 1H) |
| 1-54 | 0.99 (t, 3H), 1.48-1.56 (m, 2H), 1.82-1.90 (m, 2H), 1.92-2.04 (m, 2H), 2.22 (dd, 2H), 2.88 (t, 1H), 3.24-3.39 (m, 4H), 3.90 (d, 1H), 4.58 (d, 1H), 4.94-5.17 (m, 5H), 5.27 (d, 2H), 6.03 (s, 1H), 6.53-7.10 (m, 3H), 7.11 (d, 1H), 7.19-7.28 (m, 2H), 7.40 (s, 1H) |
| 1-55 | 1.74-1.88 (m, 2H), 2.24 (dd, 2H), 2.87 (t, 1H), 3.27-3.37 (m, 2H), 3.91 (d, 1H), 4.60 (d, 1H), 4.91 (d, 2H), 5.10-5.18 (m, 4H), 6.02 (s, 1H), 6.53-7.10 (m, 3H), 7.40 (s, 1H) |
| 1-56 | 1.72-1.79 (m, 2H), 2.14-2.25 (m, 2H), 2.31 (s, 3H), 2.83 (t, 1H), 3.25-3.31 (m, 2H), 4.02 (d, 1H), 4.58 (d, 1H), 4.86-5.12 (m, 6H), 6.01 (s, 1H), 6.33 (s, 1H), 7.17 (d, 1H), 7.25-7.29 (m, 3H), 7.33-7.42 (m, 5H) |
| 1-57 | 1.76-1.91 (m, 2H), 2.26 (dd, 2H), 2.89 (t, 1H), 3.25-3.39 (m, 2H), 3.80 (s, 3H), 3.91 (d, 1H), 4.60 (d, 1H), 4.88-4.99 (m, 2H), 5.11-5.20 (m, 4H), 6.03 (s, 1H), 6.53-7.02 (m, 4H), 7.36-7.40 (m, 2H) |
| 1-58 | 1.78-1.90 (m, 2H), 2.25 (dd, 2H), 2.88 (t, 1H), 3.32-3.38 (m, 2H), 3.92 (d, 1H), 4.61 (d, 1H), 4.91 (d, 1H), 5.05 (dd, 2H), 5.15 (s, 2H), 5.29 (d, 1H), 6.04 (s, 1H), 6.53-6.88 (m, 3H), 7.02-7.05 (m, 1H), 7.15 (t, 1H), 7.20-7.29 (m, 2H), 7.41 (s, 1H) |
| 1-59 | 0.89 (t, 3H), 1.22-1.39 (m, 8H), 1.43-1.52 (m, 2H), 1.74-1.90 (m, 2H), 1.95-2.04 (m, 2H), 2.24 (dd, 2H), 2.88 (t, 1H), 3.34-3.40 (m, 4H), 3.91 (d, 1H), 4.59 (d, 1H), 4.94-5.18 (m, 5H), 5.27 (d, 1H), 6.03 (s, 1H), 6.53-7.02 (m, 3H), 7.11 (d, 1H), 7.19-7.27 (m, 2H), 7.40 (s, 1H) |
| 1-60 | 1.77-1.87 (m, 2H), 2.25 (dd, 2H), 2.91 (t, 1H), 3.28-3.38 (m, 2H), 3.92 (d, 1H), 4.60 (d, 1H), 4.98-5.19 (m, 6H), 6.05 (s, 1H), 6.53-7.02 (m, 3H), 7.27 (m, 1H), 7.40-7.42 (m, 2H), 7.50 (d, 1H) |
| 1-61 | 1.74-1.88 (m, 2H), 2.04-2.09 (m, 2H), 2.24 (dd, 2H), 2.84-2.93 (m, 5H), 3.26-3.38 (m, 2H), 3.90 (d, 1H), 4.59 (d, 1H), 4.94-5.04 (m, 4H), 5.14 (s, 2H), 6.03 (s, 1H), 6.53-7.02 (m, 3H), 7.06 (s, 2H), 7.38 (s, 1H) |
| 1-62 | 1.78-1.88 (m, 2H), 2.25 (dd, 2H), 2.89 (t, 1H), 3.21 (s, 3H), 3.29-3.38 (m, 2H), 3.92 (d, 1H), 4.60 (d, 1H), 4.96 (dd, 2H), 5.14-5.22 (m, 4H), 6.03 (s, 1H), 6.53-6.98 (m, 3H), 7.01 (d, 1H), 7.18-7.21 (m, 1H), 7.41 (s, 1H) |
| 1-63 | 1.72-1.80 (m, 2H), 2.22 (dd, 2H), 2.31 (s, 3H), 2.84 (t, 1H), 3.24-3.36 (m, 2H), 3.97 (s, 3H), 4.04 (d, 1H), 4.60 (d, 1H), 4.89-5.09 (m, 5H), 5.41 (d, 1H), 6.05 (s, 1H), 6.33 (s, 1H), 7.16 (d, 1H), 7.22-7.26 (m, 1H), 7.40 (s, 1H), 7.44 (d, 1H), 8.26 (s, 1H) |
| 1-64 | 1.73-1.85 (m, 2H), 2.14 (s, 3H), 2.17-2.30 (m, 5H), 2.32 (s, 3H), 2.87 (t, 1H), 3.18 (s, 3H), 3.23-3.39 (m, 2H), 4.04 (d, 1H), 4.60 (d, 1H), 4.91-5.05 (m, 4H), 5.17 (dd, 2H), 6.02 (s, 1H), 6.34 (s, 1H), 7.02 (s, 1H), 7.38 (s, 1H) |
| 1-65 | 1.72-1.84 (m, 2H), 2.17-2.28 (m, 2H), 2.32 (s, 3H), 2.85 (t, 1H), 3.24-3.37 (m, 2H), 3.79 (s, 3H), 4.03 (d, 1H), 4.60 (d, 1H), 4.89-5.04 (m, 4H), 5.14 (dd, 2H), 6.03 (s, 1H), 6.33 (s, 1H), 6.71 (d, 1H), 7.19 (d, 1H), 7.39 (s, 1H) |
| 1-66 | 1.72-1.86 (m, 2H), 2.17-2.29 (m, 2H), 2.36 (s, 3H), 2.86 (t, 1H), 3.24 (s, 3H), 3.25-3.39 (m, 2H), 4.03 (d, 1H), 4.60 (d, 1H), 4.94-5.05 (m, 4H), 5.20 (dd, 2H), 6.03 (s, 1H), 6.33 (s, 1H), 7.09 (d, 1H), 7.40 (s, 1H), 7.48 (d, 1H) |

TABLE 13

| No. | CDCl$_3$/TMS δ (ppm) |
|---|---|
| 1-67 | 1.52-1.69 (m, 6H), 1.72-1.90 (m, 2H), 2.24 (dd, 2H), 2.89 (t, 1H), 3.24-3.40 (m, 2H), 3.53 (m, 1H), 3.84 (d, 1H), 4.59 (d, 1H), 4.93-5.33 (m, 6H), 6.03 (s, 1H), 6.95 (s, 1H), 7.10 (d, 1H), 7.17-7.30 (m, 2H), 7.40 (s, 1H) |
| 1-68 | 0.99 (t, 3H), 1.51-1.61 (m, 2H), 1.71-1.90 (m, 2H), 1.91-2.02 (m, 2H), 2.25 (dd, 2H), 2.89 (t, 1H), 3.27-3.40 (m, 4H), 3.53 (m, 1H), 3.84 (d, 1H), 4.60 (d, 1H), 4.96-5.31 (m, 6H), 6.03 (s, 1H), 6.95 (s, 1H), 7.11 (d, 1H), 7.20 (d, 1H), 7.22-7.28 (d, 1H), 7.40 (s, 1H) |

TABLE 13-continued

| No. | CDCl$_3$/TMS δ (ppm) |
|---|---|
| 1-69 | 1.70-1.85 (m, 2H), 2.22 (m, 2H), 2.32 (s, 3H), 2.85 (t, 1H), 3.22-3.38 (m, 2H), 4.03 (d, 1H), 4.55-4.67 (m, 3H), 4.94-5.07 (m, 5H), 5.30 (d, 1H), 6.05 (s, 1H), 6.33 (s, 1H), 7.14-7.22 (m, 3H), 7.40 (s, 1H) |
| 1-70 | 1.71-1.84 (m, 2H), 2.23 (m, 2H), 2.33 (s, 3H), 2.86 (t, 1H), 3.24-3.39 (m, 2H), 4.04 (d, 1H), 4.61 (d, 1H), 4.90-5.14 (m, 4H), 5.35 (d, 1H), 5.63 (d, 1H), 6.07 (s, 1H), 6.34 (s, 1H), 7.37-7.45 (m, 3H), 7.73 (s, 1H), 10.11 (s, 1H) |
| 1-71 | 1.70-1.84 (m, 2H), 2.21 (m, 2H), 2.31 (s, 3H), 2.84 (t, 1H), 2.98 (s, 6H), 3.26-3.38 (m, 2H), 4.02 (d, 1H), 4.60 (d, 1H), 4.90-5.12 (m, 5H), 5.47 (d, 1H), 6.05 (s, 1H), 6.33 (s, 1H), 7.02 (d, 1H), 7.18 (t, 1H), 7.33 (s, 1H), 7.39 (s, 1H), 7.50 (d, 1H) |
| 1-72 | 1.71-1.82 (m, 2H), 2.22 (m, 2H), 2.32 (s, 3H), 2.85 (t, 1H), 3.25-3.36 (m, 2H), 3.69 (s, 2H), 4.04 (d, 1H), 4.60 (d, 1H), 4.92-5.15 (m, 6H), 6.05 (s, 1H), 6.33 (s, 1H), 7.16 (d, 1H), 7.21 (m, 2H), 7.39 (s, 1H) |
| 1-73 | 1.71-1.90 (m, 2H), 2.23 (dd, 2H), 2.88 (t, 1H), 3.24-3.39 (m, 2H), 3.89 (d, 1H), 4, 59 (d, 1H), 4.88 (d, 1H), 5.02-5.20 (m, 5H), 6.01 (s, 1H), 6.53-7.01 (m, 3H), 7.15-7.22 (m, 2H), 7.25-7.48 (m, 7H) |
| 1-74 | 1.73-1.95 (m, 2H), 2.25 (dd, 2H), 2.89 (t, 1H), 3.28-3.43 (m, 2H), 3.90-4.01 (m, 4H), 4.60 (d, 1H), 4.94 (d, 1H), 5.10-5.21 (m, 4H), 5.30 (d, 1H), 6.05 (s, 1H), 6.53-7.02 (m, 4H), 7.43 (s, 1H), 8.00 (d, 1H) |
| 1-75 | 1.64 (d, 3H), 1.75-1.94 (m, 2H), 2.25 (dd, 2H), 2.90 (t, 1H), 3.26-3.40 (m, 2H), 3.91 (d, 1H), 4.58 (d, 1H), 5.14-5.24 (m, 5H), 6.10 (s, 1H), 6.53-7.02 (m, 3H), 7.11-7.26 (m, 4H), 7.41 (s, 1H) |
| 1-76 | 1.73-1.92 (m, 2H), 2.24 (dd, 2H), 2.87 (t, 1H), 3.25-3.40 (m, 2H), 3.90 (d, 1H), 4.60 (d, 1H), 5.02-5.20 (m, 6H), 6.04 (s, 1H), 6.53-7.02 (m, 3H), 7.17-7.25 (m, 4H), 7.39 (s, 1H) |
| 1-77 | 1.74-1.91 (m, 2H), 2.24 (dd, 2H), 2.87 (t, 1H), 3.24-3.40 (m, 2H), 3.91 (d, 1H), 4.60 (d, 1H), 5.10-5.27 (m, 6H), 6.09 (s, 1H), 6.53-7.02 (m, 3H), 7.40 (s, 1H), 7.47-7.50 (m, 2H), 7.68 (s, 2H), 7.79-7.82 (m, 2H) |
| 1-78 | 1.31 (s, 9H), 1.71-1.91 (m, 2H), 2.24 (dd, 2H), 2.87 (t, 1H), 3.25-3.40 (m, 2H), 3.90 (d, 1H), 4.59 (d, 1H), 4.99-5.20 (m, 6H), 6.03 (s, 1H), 6.53-7.02 (m, 3H), 7.12 (d, 1H), 7.20 (s, 1H), 7.24-7.28 (m, 1H), 7.40 (s, 1H) |
| 1-79 | 1.31 (s, 9H), 1.70-1.84 (m, 2H), 2.21 (m, 2H), 2.32 (s, 3H), 2.84 (t, 1H), 3.24-3.38 (m, 2H), 4.04 (d, 1H), 4.60 (d, 1H), 4.92-5.10 (m, 6H), 6.03 (s, 1H), 6.33 (s, 1H), 7.12 (d, 1H), 7.20-7.31 (m, 1H), 7, 38 (s, 1H) |
| 1-80 | 1.73-1.92 (m, 2H), 2.24 (m, 2H), 2.87 (t, 1H), 3.30-3.37 (m, 2H), 3.90 (d, 1H), 4.60 (d, 1H), 4.91-5.21 (m, 6H), 6.02 (s, 1H), 6.53-7.02 (m, 5H), 7.12 (m, 1H), 7.39 (s, 1H) |
| 1-81 | 1.73-1.94 (m, 2H), 2.25 (dd, 2H), 2.82 (t, 1H), 3.28-3.40 (m, 2H), 3.92 (d, 1H), 4.60 (d, 1H), 4.98-5.20 (m, 6H), 6.05 (s, 1H), 6.53-7.02 (m, 3H), 7.25-7.28 (m, 1H), 7.40 (s, 1H), 7.42 (s, 1H), 7.50 (d, 1H) |
| 1-82 | 1.72-1.91 (m, 2H), 2.25 (dd, 2H), 2.89 (t, 1H), 3.29-3.39 (m, 2H), 3.83-3.90 (m, 4H), 4.59 (d, 1H), 4.90-5.25 (m, 6H), 6.03 (s, 1H), 6.65 (d, 1H), 6.95 (s, 1H), 7.37-7.41 (m, 2H) |

TABLE 14

| No. | CDCl$_3$/TMS δ (ppm) |
|---|---|
| 1-83 | 1.75-1.92 (m, 2H), 2.26 (dd, 2H), 2.90 (t, 1H), 3.30-3.41 (m, 2H), 3.84-3.92 (m, 4H), 4.60 (d, 1H), 4.94 (d, 1H), 5.10-5.19 (m, 4H), 5.30 (d, 1H), 6.05 (s, 1H), 6.83 (d, 1H), 6.96 (s, 1H), 7.40 (s, 1H), 8.00 (d, 1H) |
| 1-84 | 1.70-1.89 (m, 2H), 2.25 (dd, 2H), 2.89 (t, 1H), 3.29-3.39 (m, 2H), 3.86 (d, 1H), 4.60 (d, 1H), 4.92 (d, 2H), 5.15-5.27 (m, 4H), 6.03 (s, 1H), 6.96 (s, 1H), 7.40 (s, 1H) |
| 1-85 | 1.74-1.91 (m, 2H), 2.24 (dd, 2H), 2.87 (t, 1H), 3.27-3.38 (m, 2H), 3.82 (d, 1H), 4.58 (d, 1H), 5.02 (s, 4H), 5.18 (s, 2H), 6.04 (s, 1H), 6.95 (s, 1H), 7.17-7.27 (m, 4H), 7.40 (s, 1H) |
| 1-86 | 1.72-1.84 (m, 2H), 2.22 (m, 2H), 2.37 (s, 3H), 2.85 (t, 1H), 3.25-3.40 (m, 2H), 3.81 (s, 3H), 4.04 (d, 1H), 4.60 (d, 1H), 4.89-5.19 (m, 6H), 6.02 (s, 1H), 6.34 (s, 1H), 6.76 (d, 1H), 7.10 (d, 1H), 7.39 (s, 1H) |
| 1-87 | 1.75-1.92 (m, 2H), 2.25 (m, 2H), 2.90 (t, 1H), 3.21 (s, 3H), 3.29-3.41 (m, 2H), 3.84 (d, 1H), 4.58 (d, 1H), 4.93-4.99 (m, 2H), 5.14-5.25 (m, 4H), 6.04 (s, 1H), 6.95 (s, 1H), 7.01 (d, 1H), 7.17-7.20 (m, 1H), 7.41 (s, 1H) |
| 1-88 | 1.64 (d, 1H), 1.73-1.93 (m, 2H), 2.26 (m, 2H), 2.91 (t, 1H), 3.27-3.40 (m, 2H), 3.84 (d, 1H), 4.59 (d, 1H), 5.03 (s, 2H), 5.14-5.27 (m, 3H), 6.10 (s, 1H), 6.95 (s, 1H), 7.11-7.31 (m, 4H), 7.40 (s, 1H) |
| 1-89 | 1.70-1.88 (m, 2H), 2.22 (dd, 2H), 2.87 (t, 1H), 3.22-3.36 (m, 2H), 3.79 (d, 1H), 4.57 (d, 1H), 5.10-5.27 (m, 6H), 6.08 (s, 1H), 6.95 (s, 1H), 7.40 (s, 1H), 7.44-7.50 (m, 2H), 7.67 (s, 2H), 7.77-7.83 (m, 2H) |
| 1-90 | 1.70-1.82 (m, 2H), 2.22 (m, 2H), 2.36 (s, 3H), 2.85 (t, 1H), 3.03 (s, 6H), 3.22-3.38 (m, 2H), 4.03 (d, 1H), 4.59 (d, 1H), 4.92-5.07 (m, 5H), 5.32 (d, 1H), 6.03 (s, 1H), 6.33 (s, 1H), 7.08 (dd, 1H), 7.24-7.28 (m, 2H), 7.39 (s, 1H) |
| 1-91 | 1.71-1.89 (m, 2H), 2.24 (dd, 2H), 2.84 (t, 1H), 3.25-3.39 (m, 2H), 3.84 (d, 1H), 4.58 (d, 1H), 4.91-5.07 (m, 4H), 5.14-5.25 (m, 2H), 6.03 (s, 1H), 6.86-6.97 (m, 3H), 7.11-7.16 (m, 1H), 7.40 (s, 1H) |
| 1-92 | 1.31 (s, 9H), 1.74-1.90 (m, 2H), 2.24 (dd, 2H), 2.88 (t, 1H), 3.28-3.40 (m, 2H), 3.84 (d, 1H), 4.58 (d, 1H), 5.00-5.07 (m, 4H), 5.18 (s, 2H), 6.04 (s, 1H), 6.95 (s, 1H), 7.12 (d, 1H), 7.20 (s, 1H), 7.25 (d, 1H), 7.39 (s, 1H) |

TABLE 14-continued

| No. | CDCl₃/TMS δ (ppm) |
|---|---|
| 1-93 | 1.70-1.91 (m, 2H), 2.25 (dd, 2H), 2.89 (t, 1H), 3.29-3.38 (m, 2H), 3.84 (d, 1H), 4.59 (d, 1H), 4.91 (d, 1H), 5.01-5.24 (m, 4H), 5.30 (d, 2H), 6.04 (s, 1H), 6.95 (s, 1H), 7.04 (d, 1H), 7.15 (t, 1H), 7.26 (d, 1H), 7.41 (s, 1H) |
| 1-94 | 1.71-1.84 (m, 2H), 2.22 (m, 2H), 2.85 (t, 1H), 3.22-3.38 (m, 2H), 4.04 (d, 1H), 4.60 (d, 1H), 4.92-5.08 (m, 5H), 5.25 (d, 1H), 6.03 (s, 1H), 6.31-6.68 (m, 2H), 7.01 (s, 1H), 7.03 (s, 1H), 7.22 (t, 1H), 7.39 (s, 1H) |
| 1-95 | 1.75-1.92 (m, 2H), 2.25 (dd, 2H), 2.89 (t, 1H), 3.30-3.38 (m, 2H), 3.86 (d, 1H), 4.60 (d, 1H), 5.01 (d, 2H), 5.11-5.26 (m, 4H), 6.06 (s, 1H), 6.96 (s, 1H), 7.32 (d, 1H), 7.42 (s, 1H), 8.03 (s, 1H), 8.09 (d, 1H) |
| 1-96 | 1.67-1.79 (m, 2H), 2.17 (m, 2H), 2.29 (s, 3H), 2.81 (t, 1H), 3.22-3.30 (m, 2H), 3.98 (d, 1H), 4.57 (d, 1H), 4.90-5.08 (m, 5H), 5.31-5.37 (m, 1H), 6.06 (s, 1H), 6.33 (s, 1H), 7.14 (d, 1H), 7.22 (t, 1H), 7.38-7.91 (m, 2H), 8.30 (s, 1H), 9.40 (d, 1H) |
| 1-97 | 1.71-1.84 (m, 2H), 2.22 (m, 2H), 2.32 (s, 3H), 2.85 (t, 1H), 3.25-3.36 (m, 2H), 4.04 (d, 1H), 4.60 (d, 1H), 4.98-5.10 (m, 5H), 5.27 (d, 1H), 6.04 (s, 1H), 6.33 (s, 1H), 6.71 (t, 1H), 7.26-7.32 (m, 2H), 7.39-7.41 (m, 1H) |
| 1-98 | 1.70-1.82 (m, 2H), 2.22 (m, 2H), 2.32 (s, 3H), 2.84 (t, 1H), 3.24-3.35 (m, 2H), 4.03 (d, 1H), 4.60 (d, 1H), 4.90-5.05 (m, 6H), 6.03 (s, 1H), 6.33 (s, 1H), 7.17-7.25 (m, 3H), 7.39 (s, 1H) |
| 1-99 | 1.73-1.89 (m, 2H), 2.24 (dd, 2H), 2.87 (t, 1H), 3.30-3.39 (m, 2H), 3.90 (d, 1H), 4.60 (d, 1H), 4.91-5.20 (m, 6H), 6.04 (s, 1H), 6.53-7.02 (m, 3H), 7.17-7.25 (m, 3H), 7.39 (s, 1H) |

TABLE 15

| No. | CDCl₃/TMS δ (ppm) |
|---|---|
| 1-100 | 1.71-1.87 (m, 2H), 2.23 (m, 2H), 2.32 (s, 3H), 2.85 (t, 1H), 3.26-3.39 (m, 2H), 4.05 (d, 1H), 4.61 (d, 1H), 4.91-5.08 (m, 4H), 5.09 (d, 2H), 6.04 (s, 1H), 6.34 (s, 1H), 7.30 (s, 2H), 7.41 (s, 1H) |
| 1-101 | 1.70-1.87 (m, 2H), 2.23 (m, 2H), 2.36 (s, 3H), 2.85 (t, 1H), 3.21 (s, 3H), 3.24-3.38 (m, 2H), 4.02 (d, 1H), 4.60 (d, 1H), 4.88-5.22 (m, 6H), 6.03 (s, 1H), 6.33 (s, 1H), 6.93 (d, 1H), 7.40 (s, 1H), 7.77 (d, 1H) |
| 1-102 | 1.74-1.85 (m, 2H), 2.22 (m, 2H), 2.37 (s, 3H), 2.86 (t, 1H), 3.21 (s, 3H), 3.24-3.37 (m, 2H), 4.04 (d, 1H), 4.60 (d, 1H), 4.94-5.07 (m, 4H), 5.17-5.27 (m, 2H), 6.03 (s, 1H), 6.34 (s, 1H), 7.16 (d, 1H), 7.31 (d, 1H), 7.40 (s, 1H) |
| 1-103 | 1.73-1.85 (m, 2H), 2.22 (m, 2H), 2.32 (s, 3H), 2.86 (t, 1H), 3.23 (s, 6H), 3.27-3.36 (m, 2H), 4.03 (d, 1H), 4.59 (d, 1H), 4.97-5.01 (m, 4H), 5.22 (d, 2H), 6.02 (s, 1H), 6.33 (s, 1H), 7.27 (s, 2H), 7.39 (s, 1H) |
| 1-104 | 1.71-1.84 (m, 2H), 2.23 (m, 2H), 2.32 (s, 3H), 2.86 (t, 1H), 3.25-3.36 (m, 2H), 4.05 (d, 1H), 4.61 (d, 1H), 4.94-5.14 (m, 5H), 5.34 (d, 1H), 6.05 (s, 1H), 6.34 (s, 1H), 7.31-7.39 (m, 2H), 7.40 (s, 1H), 7.56 (d, 1H) |
| 1-105 | 1.69-1.82 (m, 2H), 2.15-2.27 (m, 8H), 2.81 (t, 1H), 3.20 (s, 3H), 3.21-3.37 (m, 2H), 4.05 (d, 1H), 4.62 (d, 1H), 4.86-5.09 (m, 5H), 5.25 (d, 1H), 5.85 (s, 1H), 6.03 (s, 1H), 7.12 (d, 1H), 7.21-7.29 (m, 2H), 7.38 (s, 1H) |
| 1-106 | 1.80-1.95 (m, 2H), 2.25 (m, 2H), 2.47 (s, 3H), 2.81 (t, 1H), 3.20 (s, 3H), 3.30-3.57 (m, 2H), 4.75 (d, 1H), 4.77-5.08 (m, 3H), 5.24-5.30 (m, 3H), 5.43 (d, 1H), 6.02 (s, 1H), 6.32 (s, 1H), 7.12 (d, 1H), 7.21-7.28 (m, 2H), 7.39 (s, 1H) |
| 1-107 | 1.80-1.96 (m, 2H), 2.27 (m, 2H), 2.47 (s, 3H), 3.20 (s, 3H), 3.29-3.56 (m, 3H), 4.75 (d, 1H), 4.77-4.99 (m, 2H), 5.19 (d, 2H), 5.32 (s, 2H), 5.43 (d, 1H), 6.02 (s, 1H), 6.32 (s, 1H), 7.00 (dd, 1H), 7.17-7.20 (m, 1H), 7.40 (s, 1H) |
| 1-108 | 1.75-1.94 (m, 2H), 2.25 (dd, 2H), 2.87 (t, 1H), 3.17 (s, 3H), 3.28-3.40 (m, 3H), 3.83 (s, 3H), 3.89 (d, 1H), 4.60 (d, 1H), 4.89-5.23 (m, 6H), 6.03 (s, 1H), 6.55 (s, 1H), 6.78 (d, 1H), 7.16 (d, 1H), 7.40 (s, 1H) |
| 1-109 | 1.74-1.91 (m, 2H), 2.24 (dd, 2H), 2.87 (t, 1H), 3.17 (s, 3H), 3.21-3.38 (m, 2H), 3.80-3.34 (m, 4H), 4.61 (d, 1H), 4.89-4.97 (m, 4H), 5.15-5.23 (m, 2H), 6.02 (s, 1H), 6.28 (s, 1H), 6.78 (d, 1H), 7.16 (d, 1H), 7.39 (s, 1H) |
| 1-110 | 1.75-1.92 (m, 2H), 2.25 (dd, 2H), 2.89 (t, 1H), 3.32-3.38 (m, 2H), 3.79-3.89 (m, 4H), 4.59 (d, 1H), 4.90-5.00 (m, 2H), 5.14-5.21 (m, 4H), 6.03 (s, 1H), 6.71 (d, 1H), 6.95 (s, 1H), 7.19 (d, 1H), 7.41 (s, 1H) |
| 1-111 | 1.72-1.91 (m, 2H), 2.25 (dd, 2H), 2.89 (t, 1H), 3.35-3.40 (m, 2H), 3.84 (d, 1H), 4.59 (d, 1H), 4.91 (d, 1H), 5.03-5.30 (m, 5H), 6.04 (s, 1H), 6.95 (s, 1H), 7.04-7.12 (m, 2H), 7.41-7.48 (m, 2H) |
| 1-112 | 1.75-1.92 (m, 2H), 2.25 (dd, 2H), 2.89 (t, 1H), 3.38-3.40 (m, 2H), 3.80 (s, 3H), 3.91 (d, 1H), 4.60 (d, 1H), 4.90-5.00 (m, 2H), 5.11-5.23 (m, 4H), 6.03 (s, 1H), 6.53-7.02 (m, 4H), 7.20 (d, 1H), 7.40 (s, 1H) |
| 1-113 | 1.73-1.89 (m, 2H), 2.25 (dd, 2H), 2.88 (t, 1H), 3.35-3.41 (m, 2H), 3.90 (d, 1H), 4.60 (d, 1H), 4.90-5.28 (m, 6H), 6.04 (s, 1H), 6.53-7.02 (m, 3H), 7.05-7.11 (m, 2H), 7.40 (s, 1H), 7.45 (d, 1H) |
| 1-114 | 1.75-1.95 (m, 2H), 2.26 (dd, 2H), 2.90 (t, 1H), 3.29-3.40 (m, 2H), 3.86 (d, 1H), 4.60 (d, 1H), 4.98 (d, 1H), 5.11-5.35 (m, 5H), 6.06 (s, 1H), 6.96 (s, 1H), 7.34-7.44 (m, 3H), 7.87 (d, 1H) |
| 1-115 | 1.68-1.83 (m, 2H), 2.15-2.24 (m, 8H), 2.79 (t, 1H), 3.16 (s, 3H), 3.20-3.37 (m, 2H), 3.82 (s, 3H), 4.06 (d, 1H), 4.61 (d, 1H), 4.86-4.97 (m, 4H), 5.14-5.22 (m, 2H), 5.85 (s, 1H), 6.02 (s, 1H), 6.78 (d, 1H), 7.16 (d, 1H), 7.38 (s, 1H) |

TABLE 16

| No. | CDCl₃/TMS δ (ppm) |
|---|---|
| 1-116 | 1.75-1.91 (m, 2H), 2.25 (dd, 2H), 2.89 (t, 1H), 3.21 (s, 3H), 3.24-3.39 (m, 2H), 3.91 (d, 1H), 4.59 (d, 1H), 4.96-5.03 (m, 2H), 5.11-5.27 (m, 4H), 6.03 (s, 1H), 6.53-7.02 (m, 3H), 7.16 (d, 1H), 7.30 (d, 1H), 7.40 (s, 1H) |
| 1-117 | 1.75-1.92 (m, 2H), 2.26 (dd, 2H), 2.91 (t, 1H), 3.17 (s, 3H), 3.29-3.39 (m, 2H), 3.82-3.87 (m, 4H), 4.58 (d, 1H), 4.89-4.97 (m, 2H), 5.14-5.23 (m, 4H), 6.03 (s, 1H), 6.78 (d, 1H), 6.95 (s, 1H), 7.17 (d, 1H), 7.40 (s, 1H) |
| 1-118 | 1.77-1.92 (m, 2H), 2.26 (dd, 2H), 2.91 (t, 1H), 3.21 (s, 3H), 3.30-3.38 (m, 2H), 3.85 (d, 1H), 4.59 (d, 1H), 4.96-5.03 (m, 2H), 5.14-5.30 (m, 4H), 6.04 (s, 1H), 6.96 (s, 1H), 7.16 (d, 1H), 7.31 (d, 1H), 7.42 (s, 1H) |
| 1-119 | 1.70-1.87 (m, 2H), 2.22 (m, 2H), 2.87 (t, 1H), 3.20 (s, 3H), 3.22-3.38 (m, 2H), 3.99 (d, 1H), 4.59 (d, 1H), 4.98-5.28 (m, 6H), 6.02 (s, 1H), 6.72 (s, 1H), 6.89 (s, 1H), 6.95 (s, 1H), 7.12 (d, 1H), 7.21-7.26 (m, 2H), 7.32-7.40 (m, 2H) |
| 1-120 | 1.69-1.80 (m, 2H), 2.14-2.26 (m, 8H), 2.81 (t, 1H), 3.20 (s, 3H), 3.22-3.38 (m, 2H), 4.07 (d, 1H), 4.63 (d, 1H), 4.83-4.99 (m, 4H), 5.17-5.21 (m, 2H), 5.85 (s, 1H), 6.03 (s, 1H), 7.00 (dd, 1H), 7.17-7.21 (m, 1H), 7.39 (s, 1H) |
| 1-121 | 1.75-1.90 (m, 2H), 2.11-2.37 (m, 8H), 2.89 (t, 1H), 3.17 (s, 3H), 3.27-3.39 (m, 2H), 3.91 (d, 1H), 4.59 (d, 1H), 4.91-4.97 (m, 2H), 5.11-5.21 (m, 4H), 6.03 (s, 1H), 6.53-6.88 (m, 3H), 7.02 (s, 1H), 7.39 (s, 1H) |
| 1-122 | 1.76-1.91 (m, 2H), 2.16-2.35 (m, 8H), 2.90 (t, 1H), 3.18 (s, 3H), 3.32-3.39 (m, 2H), 3.85 (d, 1H), 4.59 (d, 1H), 4.92-4.97 (m, 2H), 5.15-5.24 (m, 4H), 6.03 (s, 1H), 6.95 (s, 1H), 7.02 (s, 1H), 7.40 (s, 1H) |
| 1-123 | 1.75-1.91 (m, 2H), 2.26 (dd, 2H), 2.88 (t, 1H), 3.22 (s, 3H), 3.28-3.40 (m, 2H), 3.86 (d, 1H), 4.59 (d, 1H), 4.99 (d, 2H), 5.19-5.24 (m, 4H), 6.04 (s, 1H), 6.96 (s, 1H), 7.10 (d, 1H), 7.42 (s, 1H), 7.50 (d, 1H) |
| 1-124 | 1.70-1.93 (m, 2H), 2.25 (dd, 2H), 2.89 (t, 1H), 3.27-3.40 (m, 5H), 3.91 (d, 1H), 4.59 (d, 1H), 5.00-5.32 (m, 6H), 6.04 (s, 1H), 6.52-6.87 (m, 3H), 7.37-7.43 (m, 2H), 7.92 (m, 1H) |
| 1-125 | 1.72-1.90 (m, 2H), 2.25 (dd, 2H), 2.89 (t, 1H), 3.21 (s, 3H), 3.25-3.38 (m, 2H), 3.91 (d, 1H), 4.59 (d, 1H), 4.98 (d, 2H), 5.11-5.23 (m, 4H), 6.03 (s, 1H), 6.53-7.02 (m, 3H), 7.09 (d, 1H), 7.41 (s, 1H), 7.48 (d, 1H) |
| 1-126 | 1.78-1.92 (m, 2H), 2.26 (dd, 2H), 2.89 (t, 1H), 3.29-3.41 (m, 2H), 3.92 (d, 1H), 4.61 (d, 1H), 4.95 (d, 1H), 5.09-5.19 (m, 4H), 5.30 (d, 1H), 6.06 (s, 1H), 7.35-7.41 (m, 3H), 7.86 (d, 1H) |
| 1-127 | 2.33 (s, 3H), 3.16 (s, 3H), 3.47-3.58 (m, 4H), 3.68-3.79 (m, 4H), 4.90-5.08 (m, 5H), 5.26 (d, 1H), 5.84 (s, 1H), 6.34 (s, 1H), 6.79 (s, 1H), 7.10 (d, 1H), 7.20-7.28 (m, 2H) |
| 1-128 | 1.74-1.94 (m, 2H), 2.26 (dd, 2H), 2.92 (t, 1H), 3.30-3.41 (m, 5H), 3.86 (d, 1H), 4, 59 (d, 1H), 5.01-5.32 (m, 6H), 6.05 (s, 1H), 6.96 (s, 1H), 7.40 (s, 1H), 7.43 (d, 1H), 7.93 (d, 1H) |
| 1-129 | 1.76-1.93 (m, 2H), 2.26 (dd, 2H), 2.91 (t, 1H), 3.21 (s, 3H), 3.30-3.40 (m, 2H), 3.86 (d, 1H), 4.59 (d, 1H), 4.90-5.27 (m, 6H), 6.04 (s, 1H), 6.93-6.96 (m, 2H), 7.42 (s, 1H), 7.78 (d, 1H) |
| 1-130 | 1.74-1.92 (m, 2H), 2.25 (dd, 2H), 2.89 (t, 1H), 3.21 (s, 3H), 3.22-3.39 (m, 2H), 3.91 (d, 1H), 4.59 (d, 1H), 4.89-5.00 (m, 2H), 5.09-5.22 (m, 2H), 6.03 (s, 1H), 6.53-7.02 (m, 4H), 7.41 (s, 1H), 7.78 (d, 1H) |
| 1-131 | 1.73-1.92 (m, 2H), 2.26 (dd, 2H), 2.90 (t, 1H), 3.25-3.40 (m, 5H), 3.85 (d, 1H), 4.58 (d, 1H), 4.91-5.31 (m, 6H), 6.02 (s, 1H), 6.95 (s, 1H), 7.07 (m, 2H), 7.40 (s, 1H) |
| 1-132 | 1.75-1.91 (m, 2H), 2.24 (dd, 2H), 2.89 (t, 1H), 3.25-3.38 (m, 5H), 3.91 (d, 1H), 4.58 (d, 1H), 4.91-5.30 (m, 6H), 6.02 (s, 1H), 6.53-7.01 (m, 3H), 7.07 (m, 2H), 7.39 (s, 1H) |

TABLE 17

| No. | CDCl₃/TMS δ (ppm) |
|---|---|
| 1-133 | 1.72-1.83 (m, 2H), 2.23 (m, 2H), 2.32 (s, 3H), 2.85 (t, 1H), 3.25-3.37 (m, 2H), 3.78 (s, 3H), 4.05 (d, 1H), 4.60 (d, 1H), 4.88-5.02 (m, 4H), 5.13-5.20 (m, 2H), 6.03 (s, 1H), 6.33 (s, 1H), 6.69-6.72 (m, 1H), 6.89 (dd, 1H), 7.39 (s, 1H) |
| 1-134 | 1.75-1.92 (m, 2H), 2.19-2.32 (m, 5H), 2.90 (t, 1H), 3.18 (s, 3H), 3.29-3.40 (m, 2H), 3.84 (d, 1H), 4.59 (d, 1H), 4.92-5.22 (m, 6H), 6.04 (s, 1H), 6.95 (s, 1H), 7.10 (s, 2H), 7.41 (s, 1H) |
| 1-135 | 1.71-1.84 (m, 2H), 2.22 (m, 2H), 2.32 (s, 3H), 2.84 (t, 1H), 3.22-3.37 (m, 2H), 3.81 (s, 3H), 4.02 (d, 1H), 4.60 (d, 1H), 4.90-5.03 (m, 5H), 5.27 (d, 1H), 6.03 (s, 1H), 6.33 (s, 1H), 6.74-6.80 (m, 2H), 7.17 (dd, 1H), 7.38 (s, 1H) |
| 1-136 | 1.72-1.90 (m, 2H), 2.26 (m, 2H), 2.88 (t, 1H), 3.27-3.39 (m, 2H), 3.91 (d, 1H), 4.59 (d, 1H), 4.79-5.27 (m, 6H), 6.03 (s, 1H), 6.33 (s, 1H), 6.49-6.88 (m, 3H), 7.01-7.03 (m, 2H), 7.20-7.24 (m, 1H), 7.40 (s, 1H) |
| 1-137 | 1.74-1.91 (m, 2H), 2.25 (dd, 2H), 2.89 (t, 1H), 3.29-3.37 (m, 2H), 3.84 (d, 1H), 4.59 (d, 1H), 4.92-5.28 (m, 6H), 6.03 (s, 1H), 6.49 (t, 1H), 6.95 (s, 1H), 7.01-7.03 (m, 2H), 7.20-7.24 (m, 1H), 7.40 (s, 1H) |
| 1-138 | 1.72-1.90 (m, 2H), 2.24 (dd, 2H), 2.87 (t, 1H), 3.14-3.36 (m, 2H), 3.91 (d, 1H), 4.60 (d, 1H), 4.94-5.14 (m, 6H), 6.03 (s, 1H), 6.67-7.02 (m, 3H), 7.11-7.23 (m, 3H), 7.39 (s, 1H) |
| 1-139 | 1.72-1.89 (m, 2H), 2.25 (dd, 2H), 2.88 (t, 1H), 3.32-3.40 (m, 2H), 3.85 (d, 1H), 4.59 (d, 1H), 4.95-5.06 (m, 4H), 5.18 (d, 2H), 6.04 (s, 1H), 6.95 (s, 1H), 7.12-7.23 (m, 3H), 7.40 (s, 1H) |

TABLE 17-continued

| No. | CDCl$_3$/TMS δ (ppm) |
|---|---|
| 1-140 | 1.73-1.90 (m, 2H), 2.25 (dd, 2H), 2.89 (t, 1H), 3.28-3.39 (m, 2H), 3.81-3.86 (m, 4H), 4.58 (d, 1H), 4.61-5.29 (m, 6H), 6.03 (s, 1H), 6.75-6.78 (m, 2H), 6.95 (s, 1H), 7.16 (d, 1H), 7.40 (s, 1H) |
| 1-141 | 1.75-1.90 (m, 2H), 2.25 (dd, 2H), 2.89 (t, 1H), 3.26-3.39 (m, 2H), 3.78 (s, 3H), 3.91 (d, 1H), 4.60 (d, 1H), 4.88-4.94 (m, 2H), 5.10-5.21 (m, 4H), 6.04 (s, 1H), 6.53-7.02 (m, 6H), 7.40 (s, 1H) |
| 1-142 | 1.77-1.90 (m, 2H), 2.26 (dd, 2H), 2.89 (t, 1H), 3.29-3.39 (m, 2H), 3.78-3.84 (m, 4H), 4.59 (d, 1H), 4.88-4.94 (m, 2H), 5.13-5.22 (m, 4H), 6.04 (s, 1H), 6.69-6.72 (m, 1H), 6.89 (t, 1H), 6.95 (s, 1H), 7.40 (s, 1H) |
| 1-143 | 1.75-1.85 (m, 2H), 2.23 (m, 2H), 2.32 (s, 3H), 2.86 (t, 1H), 3.22 (s, 3H), 3.24-3.39 (m, 2H), 4.04 (d, 1H), 4.60 (d, 1H), 4.94-5.04 (m, 4H), 5.20 (d, 2H), 6.02 (s, 1H), 6.32-6.68 (m, 2H), 7.07 (d, 1H), 7.22 (d, 1H), 7.39 (s, 1H) |
| 1-144 | 1.70-1.85 (m, 2H), 2.20-2.46 (m, 8H), 2.85 (t, 1H), 3.25-3.38 (m, 2H), 4.04 (d, 1H), 4.60 (d, 1H), 4.82 (d, 1H), 4.94-5.07 (m, 5H), 6.01 (s, 1H), 6.34 (m, 2H), 6.97 (d, 1H), 7.04 (d, 1H), 7.22-7.30 (m, 1H), 7.38 (s, 1H) |
| 1-145 | 1.70-1.88 (m, 2H), 2.26 (dd, 2H), 2.87 (t, 1H), 3.25-3.38 (m, 2H), 3.89 (d, 1H), 4.58 (d, 1H), 4.94-5.20 (m, 5H), 5.35 (d, 1H), 6.07 (s, 1H), 6.53-7.02 (m, 3H), 7.16 (d, 1H), 7.24 (dd, 1H), 7.39-7.42 (m, 2H), 8.31 (s, 1H), 8.59 (brs, 1H) |
| 1-146 | 1.75-1.90 (m, 2H), 2.25 (dd, 2H), 2.90 (t, 1H), 3.24 (s, 6H), 3.27-3.38 (m, 2H), 3.92 (d, 1H), 4.59 (d, 1H), 5.00 (d, 2H), 5.14-5.21 (m, 4H), 6.02 (s, 1H), 6.53-6.72 (m, 4H), 7.27 (m, 1H), 7.40 (s, 1H) |
| 1-147 | 1.75-1.92 (m, 2H), 2.25 (dd, 2H), 2.91 (t, 1H), 3.24 (s, 6H), 3.29-3.38 (m, 2H), 3.84 (d, 1H), 4.56 (d, 1H), 5.00 (d, 2H), 5.19-5.25 (m, 4H), 6.02 (s, 1H), 7.27 (m, 2H), 7.41 (s, 1H) |
| 1-148 | 1.73-1.91 (m, 2H), 2.26 (dd, 2H), 2.89 (t, 1H), 3.28-3.40 (m, 2H), 3.91 (d, 1H), 4.61 (d, 1H), 4.95-5.20 (m, 5H), 5.33 (d, 1H), 6.06 (s, 1H), 6.53-7.02 (m, 3H), 7.31-7.39 (m, 2H), 7.41 (s, 1H), 7.56 (d, 1H) |

TABLE 18

| No. | CDCl$_3$/TMS δ (ppm) |
|---|---|
| 1-149 | 1.75-1.96 (m, 2H), 2.26 (dd, 2H), 2.91 (t, 1H), 3.29-3.40 (m, 2H), 3.84 (d, 1H), 4.58 (d, 1H), 4.95 (d, 1H), 5.06-5.19 (m, 4H), 5.35 (d, 1H), 6.06 (s, 1H), 6.95 (s, 1H), 7.21-7.30 (m, 2H), 7.41-7.44 (m, 2H), 8.31 (s, 1H) |
| 1-150 | 1.74-1.92 (m, 2H), 2.26 (dd, 2H), 2.89 (t, 1H), 3.28-3.42 (m, 2H), 3.85 (d, 1H), 4.60 (d, 1H), 4.95-5.36 (m, 6H), 6.06 (s, 1H), 6.95 (s, 1H), 7.31-7.37 (m, 2H), 7.42 (s, 1H), 7.55 (d, 1H) |
| 1-151 | 3.20 (s, 3H), 3.50-3.77 (m, 8H), 4.91-5.28 (m, 6H), 5.85 (s, 1H), 6.53-7.02 (m, 4H), 7.11 (d, 1H), 7.20-7.30 (m, 2H) |
| 1-152 | 1.65-1.74 (m, 3H), 1.91-1.99 (m, 2H), 2.10-2.23 (m, 1H), 2.30-2.33 (m, 3H), 2.74-3.12 (m, 2H), 3.19-3.29 (m, 5H), 3.90 (t, 1H), 4.65 (dd, 1H), 4.97-5.07 (m, 3H), 5.24 (d, 1H), 5.32-5.39 (m, 1H), 6.01 (s, 1H), 6.31 (s, 1H), 7.12 (d, 1H), 7.20-7.29 (m, 2H), 7.36 (s, 1H) |
| 1-153 | 1.74-1.83 (m, 2H), 2.22 (m, 2H), 2.30 (s, 3H), 2.86 (t, 1H), 3.20 (s, 3H), 3.22-3.37 (m, 2H), 4.03 (d, 1H), 4.61 (d, 1H), 4.90-5.07 (m, 4H), 5.19 (d, 2H), 6.03 (s, 1H), 6.29 (s, 1H), 6.62 (t, 1H), 6.99 (dd, 1H), 7.17-7.27 (m, 1H), 7.39 (s, 1H) |
| 1-154 | 1.75-1.83 (m, 5H), 2.23 (m, 2H), 2.32 (s, 3H), 2.87 (t, 1H), 3.19 (s, 3H), 3.24-3.37 (m, 2H), 4.04 (d, 1H), 4.60 (d, 1H), 4.80-5.06 (m, 6H), 6.33 (s, 1H), 6.95 (dd, 1H), 7.13-7.17 (m, 1H), 7.38 (s, 1H) |
| 1-155 | 1.89-1.97 (m, 2H), 2.08 (d, 1H), 2.28 (d, 1H), 2.56 (s, 3H), 3.04 (t, 1H), 3.14-3.21 (m, 4H), 3.31-3.38 (m, 1H), 3.80 (d, 1H), 4.80 (d, 1H), 4.96 (dd, 2H), 5.19 (d, 2H), 6.03 (s, 1H), 6.46 (s, 1H), 6.99 (dd, 1H), 7.17-7.20 (m, 1H), 7.40 (s, 1H) |
| 1-156 | 1.55-1.87 (m, 4H), 2.00 (dd, 1H), 2.70 (m, 1H), 2.30 and 3.34 (s, 3H), 2.74-3.13 (m, 2H), 3.18-3.29 (m, 4H), 3.90 (t, 1H), 4.57 and 4.72 (d, 1H), 4.91-4.98 (m, 2H), 5.18 (d, 2H), 5.37 (q, 1H), 6.01 (s, 1H), 6.32 (s, 1H), 6.99 (dd, 1H), 7.17-7.20 (m, 1H), 7.36 (s, 1H) |
| 1-157 | 0.75-0.91 (m, 3H), 1.59-1.95 (m, 1H), 1.98-2.17 (m, 1H), 2.30-2.51 (m, 5H), 2.68-3.40 (m, 5H), 3.46-3.50 (m, 1H), 3.78-4.69 (m, 2H), 4.91-5.10 (m, 4H), 5.15-5.27 (m, 2H), 6.04 (s, 1H), 6.33 (s, 1H), 6.97-7.02 (m, 1H), 7.17-7.20 (m, 1H), 7.39-7.41 (m, 1H) |
| 1-158 | 1.74-1.90 (m, 2H), 2.26 (dd, 2H), 2.89 (t, 1H), 3.21 (s, 3H), 3.28-3.39 (m, 2H), 3.92 (d, 1H), 4.59 (d, 1H), 4.98 (dd, 2H), 5.18 (dd, 4H), 6.03 (s, 1H), 6.53-7.02 (m, 4H), 7.17-7.20 (m, 1H), 7.41 (s, 1H) |
| 1-159 | 1.09-1.36 (m, 3H), 1.61-1.76 (m, 1H), 1.84-2.02 (m, 1H), 2.17-2.34 (m, 5H), 2.87-3.90 (m, 6H), 4.38-4.63 (m, 1H), 4.90-5.08 (m, 4H), 5.17-5.22 (m, 2H), 6.03 (s, 1H), 6.34 (s, 1H), 6.97-7.02 (m, 1H), 7.17-7.20 (m, 1H), 7.39-7.41 (m, 1H) |
| 1-160 | 1.15-1.28 (m, 1H), 1.61-1.88 (m, 4H), 2.02-2.30 (m, 2H), 2.74-4.37 (m, 6H), 3.80-3.97 (m, 1H), 4.52-4.77 (m, 1H), 4.90-4.99 (m, 2H), 5.13-5.24 (m, 2H), 5.55 (q, 1H), 6.01 (s, 1H), 6.57-7.01 (m, 4H), 7.17-7.19 (m, 1H), 7.38-7.39 (m, 1H) |
| 1-161 | 1.70-1.81 (m, 2H), 2.20 (dd, 2H), 2.30 (s, 3H), 2.82 (t, 1H), 3.24-3.32 (m, 2H), 3.99 (d, 1H), 4.56 (d, 1H), 4.88 (d, 2H), 4.99 (d, 2H), 5.11-5.21 (m, 2H), 6.02 (s, 1H), 6.33 (s, 1H), 6.55-6.58 (m, 1H), 6.74 (dd, 1H), 7.39 (s, 1H) |

The following gives formulation examples of the present invention.

<Formulation Example 1> Wettable Powder

Five parts of the compound of the present invention, 5 parts of metalaxyl-M, 2 parts of sodium lauryl sulfate, 4 parts of sodium lignin sulfonate, 20 parts of white carbon, and 64 parts of clay were mixed together and pulverized to afford 10% wettable powder.

<Formulation Example 2> Flowable

Five parts of the compound of the present invention, 5 parts of chlorothalonil, 4 parts of polyoxyethylene arylphenyl ether sulfate, 5 parts of polyoxyethylene alkyl ether, 5 parts of propylene glycol, 0.2 part of a silicon antifoaming agent, 0.8 part of sodium montmorillonite, and 50 parts of water were added and mixed together, and the mixture was wet-pulverized in a Dyno-Mill to afford a suspension of pulverized powder.

To 75 parts of the suspension of pulverized powder were added 10 parts of a xanthan gum solution containing 0.2 parts of xanthan gum and 0.1 part of 2-benzisothiazoline-3-one, and 15 parts of water, and then the contents were mixed together to afford a 10% agrochemical composition in an aqueous suspension state.

<Formulation Example 3> Emulsifiable Concentrate

Five parts of the compound of the present invention, 5 parts of azoxystrobin, 2 parts of calcium dodecylbenzene sulfonate, and 15 parts of castor oil ethoxylate were mixed with, and dissolved in, 73 parts of an aromatic hydrocarbon mixture to afford a homogenous 10% emulsifiable oily liquid.

<Formulation Example 4> Water Dispersible Granule

Five parts of the compound of the present invention, 5 parts of benthiavalicarb isopropyl, 20 parts of sodium lignosulfonate, 10 parts of a sodium salt of naphthalenesulfonic acid condensate, 3 parts of sodium alkylbenzene sulfonate, 0.5 parts of a silicon antifoaming agent, 5 parts of diatomaceous earth, 10 parts of ammonium sulfate, 10 parts of talc, and 31.5 parts of clay were added and mixed well together by stirring, and the mixture was pulverized to give a pulverized product. To the pulverized product, a moderate amount of water was added as necessary. And the mixture was granulated with a granulator, dried and sieved to afford 10% wettable fine granules.

<Formulation Example 5> Emulsion

Five parts of the compound of the present invention, 5 parts of cyazofamid, 15 parts of an aromatic hydrocarbon mixture, 2 parts of calcium dodecylbenzene sulfonate, 20 parts of polyoxyethylene castor oil, and 4 parts of propylene glycol were added and dissolved to give a liquid mixture. The liquid mixture was added to 49 parts of water, and the contents were mixed in a homogenizer to afford a homogenous 10% emulsified liquid.

<Formulation Example 6> Granule

Five parts of the compound of the present invention, 5 parts of amisulbrom, 3 parts of polycarboxylic acid anionic surfactant, 0.2 parts of dioctyl sodium sulfosuccinate, 2 parts of dextrin, 15 parts of sodium bentonite, and 69.8 parts of calcium carbonate were added and mixed homogenously. After a moderate amount of water was added, the mixture was kneaded, granulated by extrusion in a basket granulator, dried, and sieved to afford 10% fine granules.

<Formulation Example 7> Microemulsion

Five parts of the compound of the present invention, 5 parts of mandipropamid, 12 parts of fatty acid dimethyl amide, 10 parts of cyclohexanone, and 15 parts of aryl phenol ethoxylate were mixed, 10 parts of alcohol ethoxylate and 43 parts of water were added, and the mixture was stirred under heating for a few minutes to afford a stable 10% water-soluble liquid.

The following gives biological examples of the present invention.

(1) Procedure for preparing test suspensions

In order to prepare test suspensions for use in tests 1 and 2, 10 parts of the compound of the present invention, 2 parts of sodium lauryl sulfate, 4 parts of sodium lignin sulfonate, 20 parts of white carbon, and 64 parts of clay were mixed together and pulverized according to Formulation Example 1, to thereby prepare 10% wettable powder of each compound. As regards component (b), benthiavalicarb, valifenalate, zoxamide, famoxadone, iprovalicarb, fenamidone, fluopicolide, ametoctradin, and oxathiapiprolin were procured as unformulated, technical-grade materials, and formulated into 10% wettable powder by following the aforementioned example. Cyazofamid, mandipropamid, metalaxyl-M, ethaboxam, dimethomorph, cymoxanil, basic copper sulfate, chlorothalonil, mancozeb, propineb, captan, kresoxim-methyl, azoxystrobin, trifloxystrobin, fluazinam, pyribencarb, penthiopyrad, quinoxyfen, pyriofenone, propamocarb, fosetyl-aluminum, iminoctadine, fludioxonil, thiophanate-methyl, iprodione, tebuconazole, cyprodinil, amisulbrom, tricyclazole, polyoxin, tebufloquin, and propiconazole were procured as commercially available products. Each of the compounds was dispersed in distilled water to adjust its concentration to the desired level. The resulting test suspensions were used in tests 1 and 2. No organic solvent, surfactant or the like was added to the test suspicions.

(2) Analysis Test Procedure of the Control Effect Against Plant Diseases

<Test 1 Test of Control Effect Against Tomato Late Blight>

Test suspension was applied to tomato at the 5 leaf stage (species: regina) in an amount of 20 ml per seedling. One day after application, zoospore suspension of *Phytophthora infestans* adjusted to a concentration of $1.0 \times 10^5$ units/ml was misted/inoculated, and the seedlings were incubated in a moist chamber adjusted to 22° C. for 16 hr. Then, the onset of the disease was induced in the chamber, and the lesion area rate on the leaves 4 days after inoculation was investigated to compute the control value using the formula below. Equation for calculating preventive value:

$$\text{Preventive value} = \left\{ 1 - \frac{\text{Percent affected area on leaves treated with test agent}}{\text{Percent affected area on untreated leaves}} \right\} \times 100$$

<Test 2 Test of Control Effect Against Cucumber Downy Mildew>

Test suspension was applied to cucumber at the 2 leaf stage (species: *Sagami hanjiro*) in an amount of 20 ml per seedling. One day after application, zoospore suspension of *Pseudoperonospora cubensis* adjusted to a concentration of $1.0 \times 10^4$ units/ml was misted/inoculated, and the seedlings were incubated in a moist chamber adjusted to 22° C. for 16 hr. Then, the onset of the disease was induced in the chamber, and the lesion area rate on the leaves 5 days after inoculation was investigated to compute the control value using the formula below.

Equation for calculating preventive value:

Preventive value =
$$\left\{ \frac{1 - \text{Percent affected area on leaves treated with test agent}}{\text{Percent affected area on untreated leaves}} \right\} \times 100$$

(3) Analysis Test Procedure of Synergistic Effect

The presence of a synergistic effect between two active ingredients was established with the aid of the Colby's equation (refer to Colby, S. R. "Calculating of Herbicide Combinations", Weeds, (1967), 15, p. 20-22).

Equation $$p = A + B - \left[ \frac{A \times B}{100} \right] \quad [\text{Eq. 1}]$$

According to the Colby's method, the presence of a synergistic interaction between two active ingredients is established by first calculating the predicted activity p of a mixture based on activities of the two components applied alone. When the value p is lower than the experimentally established effect, it then follows that there occurred a synergistic effect. In the equation above, "A" represents the microbicidal/fungicidal activity, expressed as a percent control, of a first component applied at dose x, and "B" represents the microbicidal/fungicidal activity, expressed as a percent control, of a second component applied at dose y. This equation estimates p, the expected microbicidal/fungicidal activity of the mixture of A at rate x with B at rate y if their effects are strictly additive and no interaction has occurred.

(4) Results of Plant Disease Tests 1 and 2

First, the results for the compounds of the present invention are summarized below. The following mentions the compound numbers which showed a preventive value of 90 or higher when applied in the form of test suspension at a concentration 4 ppm. Compounds Nos. 1-1 to 1-42, 1-44 to 1-88 and 1-90 to 161 met the foregoing in Test 1, and Compound Nos. 1-1 to 1-8 and 1-10 to 1-161 met the foregoing in Test 2.

Next, the results of the synergistic effect test are shown in Tables 19 to 28. The results shown in these tables are equivalent to the results of a series of evaluations conducted simultaneously. The values shown in the "Test 1" and "Test 2" columns are preventive values. The "Measured" column indicates the average of the results of the test repeated three times, and the "Predicted" column indicates the predicted activity value of a composition applied for treatment, which is calculated using the Colby's equation.

TABLE 19-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| — | 0.06 | — | 25.0 | — | 5 | — |
|  | 0.3 | — | 99.5 | — | 93.8 | — |
|  | 1.5 | — | 100.0 | — | 100 | — |
| Cyazofamid | — | 0.003 | — | — | 0 | — |
|  | — | 0.16 | — | — | 67.5 | — |
|  | — | 0.08 | 46.7 | — | 99.5 | — |
|  | — | 0.4 | 95.5 | — | 100 | — |
|  | — | 2 | 100.0 | — | — | — |
|  | 0.06 | 0.003 | — | — | 5 | 5 |
|  | 0.06 | 0.16 | — | — | 78.8 | 69.1 |
|  | 0.06 | 0.08 | 99.3 | 60 | 100 | 99.5 |
|  | 0.06 | 0.4 | 99.0 | 96.6 | 100 | 100 |
|  | 0.06 | 2 | 100.0 | 100 | — | — |
|  | 0.3 | 0.003 | — | — | 95 | 93.8 |
|  | 0.3 | 0.16 | — | — | 100 | 98 |
|  | 0.3 | 0.08 | 99.8 | 99.7 | 100 | 100 |
|  | 0.3 | 0.4 | 100.0 | 100 | 100 | 100 |
|  | 0.3 | 2 | 100.0 | 100 | — | — |
| Benthiavalicarb | — | 0.08 | 38.3 | — | 0 | — |
|  | — | 0.4 | 93.3 | — | 76.3 | — |
|  | — | 2 | 100.0 | — | 100 | — |
|  | 0.06 | 0.08 | 66.7 | 53.8 | 5 | 5 |
|  | 0.06 | 0.4 | 99.0 | 95 | 93.3 | 77.4 |
|  | 0.06 | 2 | 100.0 | 100 | 100 | 100 |
|  | 0.3 | 0.08 | 99.8 | 99.7 | 90.8 | 93.8 |
|  | 0.3 | 0.4 | 100.0 | 100 | 96.5 | 98.5 |
|  | 0.3 | 2 | 100.0 | 100 | 100 | 100 |
| Mandipropamid | — | 0.08 | 36.7 | — | 5 | — |
|  | — | 0.4 | 95.5 | — | 89.5 | — |
|  | — | 2 | 100.0 | — | 95 | — |
|  | 0.06 | 0.08 | 60.0 | 52.5 | 17.5 | 9.8 |
|  | 0.06 | 0.4 | 96.9 | 96.6 | 92.5 | 90 |
|  | 0.06 | 2 | 100.0 | 100 | 96.3 | 95.3 |
|  | 0.3 | 0.08 | 100.0 | 99.7 | 97.8 | 94.1 |

TABLE 19-1-continued

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | 0.3 | 0.4 | 100.0 | 100 | 100 | 99.3 |
| | 0.3 | 2 | 100.0 | 100 | 100 | 99.7 |
| Valifenalate | — | 0.4 | 20.0 | — | 0 | — |
| | — | 2 | 51.7 | — | 57.5 | — |
| | — | 10 | 96.2 | — | 93.5 | — |
| | 0.06 | 0.4 | 71.7 | 40 | 5 | 5 |
| | 0.06 | 2 | 99.5 | 63.8 | 88.3 | 59.6 |
| | 0.06 | 10 | 100.0 | 97.1 | 97 | 93.8 |
| | 0.3 | 0.4 | 100.0 | 99.6 | 94.8 | 93.8 |
| | 0.3 | 2 | 100.0 | 99.8 | 99.3 | 97.3 |
| | 0.3 | 10 | 100.0 | 100 | 100 | 99.6 |
| Metalaxyl-M | — | 0.4 | 38.3 | — | 0 | — |
| | — | 2 | 89.2 | — | 0 | — |
| | — | 10 | 100.0 | — | 0 | — |
| | 0.06 | 0.4 | 96.2 | 53.8 | 5 | 5 |
| | 0.06 | 2 | 99.5 | 91.9 | 62.5 | 5 |
| | 0.06 | 10 | 99.8 | 98.9 | 95 | 5 |
| | 0.3 | 0.4 | 99.8 | 99.7 | 94.5 | 93.8 |
| | 0.3 | 2 | 100.0 | 99.9 | 99 | 93.8 |
| | 0.3 | 10 | 100.0 | 100 | 100 | 93.8 |

TABLE 19-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 30.0 | — | 10 | — |
| | 0.06 | — | 98.0 | — | 95.5 | — |
| | 0.3 | — | 100.0 | — | 100 | — |
| Cyazofamid | — | 0.003 | — | — | 0 | — |
| | — | 0.16 | — | — | 67.5 | — |
| | — | 0.08 | 46.7 | — | 99.5 | — |
| | — | 0.4 | 95.5 | — | 100 | — |
| | — | 2 | 100.0 | — | — | — |
| | 0.012 | 0.003 | — | — | 42.5 | 10 |
| | 0.012 | 0.16 | — | — | 65 | 70.8 |
| | 0.012 | 0.08 | 96.3 | 62.7 | 100 | 99.6 |
| | 0.012 | 0.4 | 98.3 | 96.9 | 100 | 100 |
| | 0.012 | 2 | 100.0 | 100 | — | — |
| | 0.06 | 0.003 | — | — | 95.5 | 95.5 |
| | 0.06 | 0.16 | — | — | 100 | 98.5 |
| | 0.06 | 0.08 | 100.0 | 98.9 | 100 | 100 |
| | 0.06 | 0.4 | 100.0 | 99.9 | 100 | 100 |
| | 0.06 | 2 | 100.0 | 100 | — | — |
| Benthiavalicarb | — | 0.08 | 38.3 | — | 0 | — |
| | — | 0.4 | 93.3 | — | 76.3 | — |
| | — | 2 | 100.0 | — | 100 | — |
| | 0.012 | 0.08 | 65.0 | 56.8 | 85.8 | 10 |
| | 0.012 | 0.4 | 97.7 | 95.3 | 96.5 | 78.6 |
| | 0.012 | 2 | 100.0 | 100 | 100 | 100 |
| | 0.06 | 0.08 | 100.0 | 98.8 | 95.8 | 95.5 |
| | 0.06 | 0.4 | 100.0 | 99.9 | 98.3 | 98.9 |
| | 0.06 | 2 | 100.0 | 100 | 100 | 100 |
| Mandipropamid | — | 0.08 | 36.7 | — | 5 | — |
| | — | 0.4 | 95.5 | — | 89.5 | — |
| | — | 2 | 100.0 | — | 95 | — |
| | 0.012 | 0.08 | 63.3 | 55.7 | 76.3 | 14.5 |
| | 0.012 | 0.4 | 98.3 | 96.9 | 92.8 | 90.6 |
| | 0.012 | 2 | 100.0 | 100 | 96 | 95.5 |
| | 0.06 | 0.08 | 99.0 | 98.7 | 98.3 | 95.7 |
| | 0.06 | 0.4 | 100.0 | 99.9 | 100 | 99.5 |
| | 0.06 | 2 | 100.0 | 100 | 100 | 99.8 |
| Valifenalate | — | 0.4 | 20.0 | — | 0 | — |
| | — | 2 | 51.7 | — | 57.5 | — |
| | — | 10 | 96.2 | — | 93.5 | — |
| | 0.012 | 0.4 | 70.8 | 44 | 72.5 | 10 |
| | 0.012 | 2 | 98.3 | 66.2 | 95..0 | 61.8 |
| | 0.012 | 10 | 99.3 | 97.3 | 99 | 94.2 |
| | 0.06 | 0.4 | 99.5 | 98.4 | 97 | 95.5 |
| | 0.06 | 2 | 100.0 | 99 | 99.8 | 98.1 |
| | 0.06 | 10 | 100.0 | 99.9 | 100 | 99.7 |

TABLE 19-2-continued

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| Metalaxyl-M | — | 0.4 | 38.3 | — | 0 | — |
|  | — | 2 | 89.3 | — | 0 | — |
|  | — | 10 | 98.5 | — | 0 | — |
|  | 0.012 | 0.4 | 87.5 | 56.8 | 81.3 | 10 |
|  | 0.012 | 2 | 99.5 | 92.4 | 93 | 10 |
|  | 0.012 | 10 | 100.0 | 99 | 95 | 10 |
|  | 0.06 | 0.4 | 100.0 | 98.8 | 100 | 95.5 |
|  | 0.06 | 2 | 100.0 | 99.8 | 100 | 95.5 |
|  | 0.06 | 10 | 100.0 | 100 | 100 | 95.5 |

TABLE 20-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| — | 0.06 | — | 41.7 | — | 30 | — |
|  | 0.3 | — | 98.3 | — | 69.58 | — |
|  | 1.5 | — | 100 | — | 100 | — |
| Ethaboxam | — | 2 | 95 | — | 88.3 | — |
|  | — | 10 | 98.3 | — | 99.5 | — |
|  | — | 50 | 97.8 | — | 100 | — |
|  | 0.06 | 2 | 99.8 | 97.1 | 93 | 91.8 |
|  | 0.06 | 10 | 100 | 99 | 99.8 | 99.7 |
|  | 0.06 | 50 | 100 | 98.7 | 100 | 100 |
|  | 0.3 | 2 | 100 | 99.9 | 100 | 99.6 |
|  | 0.3 | 10 | 100 | 100 | 100 | 100 |
|  | 0.3 | 50 | 100 | 100 | 100 | 100 |
| Dimethomorph | — | 0.4 | 11.7 | — | 0 | — |
|  | — | 2 | 26.7 | — | 62.5 | — |
|  | — | 10 | 11.7 | — | 95.5 | — |
|  | 0.06 | 0.4 | 80.0 | 48.5 | 22.5 | 30 |
|  | 0.06 | 2 | 92.5 | 57.2 | 90.8 | 73.8 |
|  | 0.06 | 10 | 97.7 | 93.2 | 97 | 96.9 |
|  | 0.3 | 0.4 | 97.0 | 98.5 | 96 | 96.8 |
|  | 0.3 | 2 | 99.7 | 98.8 | 98.5 | 98.8 |
|  | 0.3 | 10 | 100.0 | 99.8 | 99 | 99.9 |
| Cymoxanil | — | 2 | 31.7 | — | 0 | — |
|  | — | 10 | 78.3 | — | 0 | — |
|  | — | 50 | 100.0 | — | 46.3 | — |
|  | 0.06 | 2 | 95.0 | 60.1 | 42.5 | 30 |
|  | 0.06 | 10 | 99.3 | 87.4 | 52.5 | 30 |
|  | 0.06 | 50 | 100.0 | 100 | 95 | 62.4 |
|  | 0.3 | 2 | 99.5 | 98.9 | 97 | 96.8 |
|  | 0.3 | 10 | 99.8 | 99.5 | 97 | 96.8 |
|  | 0.3 | 50 | 100.0 | 100 | 99.8 | 98.3 |
| Zoxamide | — | 2 | 83.3 | — | 94 | — |
|  | — | 10 | 95.0 | — | 97.3 | — |
|  | — | 50 | 99.0 | — | 98.8 | — |
|  | 0.06 | 2 | 97.0 | 90.3 | 96.8 | 95.8 |
|  | 0.06 | 10 | 99.5 | 97.1 | 99.8 | 98.1 |
|  | 0.06 | 50 | 100.0 | 99.4 | 100 | 99.1 |
|  | 0.3 | 2 | 99.5 | 99.7 | 99 | 99.8 |
|  | 0.3 | 10 | 100.0 | 99.9 | 100 | 99.9 |
|  | 0.3 | 50 | 100.0 | 100 | 100 | 100 |

TABLE 20-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 21.7 | — | 12.5 | — |
|  | 0.06 | — | 96.3 | — | 96.5 | — |
|  | 0.3 | — | 100 | — | 100 | — |
| Ethaboxam | — | 2 | 95 | — | 88.3 | — |
|  | — | 10 | 98.3 | — | 99.5 | — |

TABLE 20-2-continued

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| | — | 50 | 97.8 | — | 100 | — |
| | 0.012 | 2 | 99 | 96.1 | 95.5 | 89.7 |
| | 0.012 | 10 | 100 | 98.7 | 99.8 | 99.5 |
| | 0.012 | 50 | 100 | 98.3 | 100 | 100 |
| | 0.06 | 2 | 100 | 99.8 | 100 | 99.5 |
| | 0.06 | 10 | 100 | 99.9 | 100 | 100 |
| | 0.06 | 50 | 100 | 99.9 | 100 | 100 |
| Dimethomorph | — | 0.4 | 11.7 | — | 0 | — |
| | — | 2 | 26.7 | — | 62.5 | — |
| | — | 10 | 88.3 | — | 95.5 | — |
| | 0.012 | 0.4 | 46.7 | 30.8 | 23 | 12.5 |
| | 0.012 | 2 | 84.2 | 42.6 | 70.2 | 67.2 |
| | 0.012 | 10 | 96.3 | 90.9 | 99 | 96.1 |
| | 0.06 | 0.4 | 100.0 | 96.8 | 100 | 96.5 |
| | 0.06 | 2 | 100.0 | 97.3 | 100 | 98.7 |
| | 0.06 | 10 | 100.0 | 99.6 | 100 | 99.8 |
| Cymoxanil | — | 2 | 31.4 | — | 0 | — |
| | — | 10 | 78.3 | — | 0 | — |
| | — | 50 | 100.0 | — | 46.3 | — |
| | 0.012 | 2 | 83.3 | 46.5 | 25 | 12.5 |
| | 0.012 | 10 | 95.0 | 83 | 47.5 | 12.5 |
| | 0.012 | 50 | 100.0 | 100 | 70 | 53 |
| | 0.06 | 2 | 97.0 | 97.5 | 97.5 | 96.5 |
| | 0.06 | 10 | 99.3 | 99.2 | 96.5 | 96.5 |
| | 0.06 | 50 | 100.0 | 100 | 100 | 98.1 |
| Zoxamide | — | 2 | 83.3 | — | 94 | — |
| | — | 10 | 95.0 | — | 97.3 | — |
| | — | 50 | 99.0 | — | 98.8 | — |
| | 0.012 | 2 | 96.3 | 86.9 | 97 | 94.6 |
| | 0.012 | 10 | 100.0 | 96.1 | 99.8 | 97.6 |
| | 0.012 | 50 | 100.0 | 99.2 | 100 | 98.9 |
| | 0.06 | 2 | 100.0 | 99.4 | 100 | 99.8 |
| | 0.06 | 10 | 100.0 | 99.8 | 100 | 99.9 |
| | 0.06 | 50 | 100.0 | 100 | 100 | 100 |

TABLE 21-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | — | 0.06 | 68.3 | — | 1.3 | — |
| | — | 0.3 | 98.7 | — | 96.3 | — |
| | — | 1.5 | 100 | — | 100 | — |
| Basic copper sulfate | — | 20 | 71.7 | — | 18.8 | — |
| | — | 100 | 92.5 | — | 82 | — |
| | — | 500 | 100 | — | 97 | — |
| | 0.06 | 20 | 99.2 | 91.0 | 77.5 | 19.8 |
| | 0.06 | 100 | 100 | 97.5 | 98 | 82.2 |
| | 0.06 | 500 | 100 | 100.0 | 99 | 997 |
| | 0.3 | 20 | 100 | 99.5 | 98.8 | 97 |
| | 0.3 | 100 | 100 | 99.9 | 100 | 99.3 |
| | 0.3 | 500 | 100 | 100.0 | 100 | 99.9 |
| Chlorothalonil | — | 0.4 | 0.0 | — | — | — |
| | — | 2 | 53.3 | — | — | — |
| | — | 10 | 100.0 | — | — | — |
| | 0.06 | 0.4 | 70.0 | 68.3 | — | — |
| | 0.06 | 2 | 94.7 | 85.2 | — | — |
| | 0.06 | 10 | 100.0 | 100 | — | — |
| | 0.3 | 0.4 | 97.8 | 98.7 | — | — |
| | 0.3 | 2 | 100.0 | 99.4 | — | — |
| | 0.3 | 10 | 100.0 | 100 | — | — |
| Mancozeb | — | 2 | 11.7 | — | 45 | — |
| | — | 10 | 84.2 | — | 99 | — |
| | — | 50 | 100.0 | — | 100 | — |
| | 0.06 | 2 | 78.3 | 72 | 75.8 | 45.7 |
| | 0.06 | 10 | 95.0 | 95 | 99.5 | 99 |
| | 0.06 | 50 | 100.0 | 100 | 100 | 100 |
| | 0.3 | 2 | 95.8 | 98.8 | 97.5 | 97.9 |
| | 0.3 | 10 | 100.0 | 99.8 | 100 | 100 |
| | 0.3 | 50 | 100.0 | 100 | 100 | 100 |

TABLE 21-1-continued

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| Propineb | — | 2 | 0.0 | — | 7.5 | — |
|  | — | 10 | 48.3 | — | 94.3 | — |
|  | — | 50 | 98.3 | — | 100 | — |
|  | 0.06 | 2 | 71.7 | 68.3 | 25 | 8.7 |
|  | 0.06 | 10 | 91.7 | 83.6 | 98.5 | 94.3 |
|  | 0.06 | 50 | 100.0 | 99.5 | 100 | 100 |
|  | 0.3 | 2 | 100.0 | 98.7 | 100 | 96.5 |
|  | 0.3 | 10 | 100.0 | 99.3 | 100 | 99.8 |
|  | 0.3 | 50 | 100.0 | 100 | 100 | 100 |
| Captan | — | 2 | 5.0 | — | 96 | — |
|  | — | 10 | 71.7 | — | 99.3 | — |
|  | — | 50 | 93.8 | — | 100 | — |
|  | 0.06 | 2 | 75.0 | 69.9 | 97.5 | 96.1 |
|  | 0.06 | 10 | 95.7 | 91 | 99.3 | 99.3 |
|  | 0.06 | 50 | 100.0 | 98 | 100 | 100 |
|  | 0.3 | 2 | 100.0 | 99 | 100 | 96.8 |
|  | 0.3 | 10 | 100.0 | 99.6 | 100 | 100 |
|  | 0.3 | 50 | 100.0 | 99.9 | 100 | 100 |

TABLE 21-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
|  | 0.012 | — | 26.7 | — | 15 | — |
|  | 0.06 | — | 96.2 | — | 97.5 | — |
|  | 0.3 | — | 100 | — | 100 | — |
| Basic copper sulfate | — | 20 | 71.7 | — | 18.8 | — |
|  | — | 100 | 92.5 | — | 82 | — |
|  | — | 500 | 100 | — | 97 | — |
|  | 0.012 | 20 | 95.7 | 79.2 | 72.5 | 30.9 |
|  | 0.012 | 100 | 99.8 | 94.5 | 97 | 84.7 |
|  | 0.012 | 500 | 100 | 100.0 | 99.3 | 97.5 |
|  | 0.06 | 20 | 100 | 98.9 | 98 | 98 |
|  | 0.06 | 100 | 100 | 99.7 | 100 | 99.5 |
|  | 0.06 | 500 | 100 | 100.0 | 100 | 99.9 |
| Chlorothalonil | — | 0.4 | 0.0 | — | — | — |
|  | — | 2 | 53.3 | — | — | — |
|  | — | 10 | 100.0 | — | — | — |
|  | 0.012 | 0.4 | 23.3 | 26.7 | — | — |
|  | 0.012 | 2 | 91.7 | 65.8 | — | — |
|  | 0.012 | 10 | 100.0 | 100 | — | — |
|  | 0.06 | 0.4 | 97.2 | 96.2 | — | — |
|  | 0.06 | 2 | 99.0 | 98.2 | — | — |
|  | 0.06 | 10 | 100.0 | 100 | — | — |
| Mancozeb | — | 2 | 11.7 | — | 45.0. | — |
|  | — | 10 | 84.2 | — | 99 | — |
|  | — | 50 | 100.0 | — | 100 | — |
|  | 0.012 | 2 | 78.3 | 72 | 78 | 53.3 |
|  | 0.012 | 10 | 95.0 | 95 | 100 | 99.2 |
|  | 0.012 | 50 | 100.0 | 100 | 100 | 100 |
|  | 0.06 | 2 | 100.0 | 98.8 | 100 | 98.6 |
|  | 0.06 | 10 | 100.0 | 99.8 | 100 | 100 |
|  | 0.06 | 50 | 100.0 | 100 | 100 | 100 |
| Propineb | — | 2 | 0.0 | — | 7.5 | — |
|  | — | 10 | 48.3 | — | 94.3 | — |
|  | — | 50 | 98.3 | — | 100 | — |
|  | 0.012 | 2 | 63.3 | 26.7 | 41.3 | 21.4 |
|  | 0.012 | 10 | 93.3 | 62.1 | 98.5 | 95.1 |
|  | 0.012 | 50 | 100.0 | 98.8 | 100 | 100 |
|  | 0.06 | 2 | 97.2 | 96.2 | 97.5 | 97.7 |
|  | 0.06 | 10 | 99.2 | 98 | 100 | 99.9 |
|  | 0.06 | 50 | 100.0 | 99.9 | 100 | 100 |
| Captan | — | 2 | 5.0 | — | 100 | — |
|  | — | 10 | 71.7 | — | 99.3 | — |
|  | — | 50 | 93.8 | — | 96 | — |
|  | 0.012 | 2 | 54.2 | 30.3 | 97.8 | 96.6 |
|  | 0.012 | 10 | 94.8 | 79.2 | 99.5 | 99.4 |
|  | 0.012 | 50 | 100.0 | 95.5 | 100 | 100 |

TABLE 21-2-continued

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| | 0.06 | 2 | 95.7 | 95.4 | 100 | 99.9 |
| | 0.06 | 10 | 99.5 | 98.9 | 100 | 100 |
| | 0.06 | 50 | 100.0 | 99.8 | 100 | 100 |

TABLE 22-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | — | 0.06 | — | 68.3 | — | 40 | — |
| | — | 0.3 | — | 97.7 | — | 98 | — |
| | — | 1.5 | — | 100 | — | 100 | — |
| Kresoxim-methyl | — | 2 | 50 | — | 0 | — |
| | — | 10 | 90.7 | — | 7.5 | — |
| | — | 50 | 99.8 | — | 2.5 | — |
| | 0.06 | 2 | 87.5 | 84.2 | 35 | 40 |
| | 0.06 | 10 | 98.5 | 97.0 | 56.3 | 44.5 |
| | 0.06 | 50 | 100 | 99.9 | 42 | 41.5 |
| | 0.3 | 2 | 99.5 | 98.8 | 98.5 | 98 |
| | 0.3 | 10 | 100 | 99.8 | 100 | 98.2 |
| | 0.3 | 50 | 100 | 100.0 | 100 | 98.1 |
| Azoxystrobin | — | 0.4 | 5.0 | — | 0 | — |
| | — | 2 | 66.7 | — | 0 | — |
| | — | 10 | 96.2 | — | 0 | — |
| | 0.06 | 0.4 | 73.0 | 69.9 | 42.5 | 40 |
| | 0.06 | 2 | 87.5 | 89.4 | 40 | 40 |
| | 0.06 | 10 | 99.7 | 98.8 | 91.3 | 40 |
| | 0.3 | 0.4 | 96.3 | 97.8 | 98 | 98 |
| | 0.3 | 2 | 100.0 | 99.2 | 100 | 98 |
| | 0.3 | 10 | 100.0 | 99.9 | 100 | 98 |
| Trifloxystrobin | — | 10 | 21.7 | — | 0 | — |
| | — | 50 | 28.3 | — | 0 | — |
| | — | 250 | 56.7 | — | 0 | — |
| | 0.06 | 10 | 80.0 | 75.2 | 83.8 | 40 |
| | 0.06 | 50 | 863.3 | 77.3 | 68.8 | 40 |
| | 0.06 | 250 | 94.5 | 86.3 | 94.3 | 40 |
| | 0.3 | 10 | 100.0 | 98.2 | 98.8 | 98 |
| | 0.3 | 50 | 100.0 | 98.3 | 98.5 | 98 |
| | 0.3 | 250 | 100.0 | 99 | 99 | 98 |
| Famoxadone | — | 2 | 0.0 | — | 0 | — |
| | — | 10 | 0.0 | — | 0 | — |
| | — | 50 | 10.0 | — | 0 | — |
| | 0.06 | 2 | 73.3 | 68.3 | 83.3 | 40 |
| | 0.06 | 10 | 94.2 | 68.3 | 98 | 40 |
| | 0.06 | 50 | 98.5 | 71.5 | 98 | 40 |
| | 0.3 | 2 | 98.7 | 97.7 | 100 | 98 |
| | 0.3 | 10 | 100.0 | 97.7 | 100 | 98 |
| | 0.3 | 50 | 100.0 | 97.9 | 100 | 98 |
| Fluazinam | — | 2 | 0.0 | — | — | — |
| | — | 10 | 16.7 | — | — | — |
| | — | 50 | 60.8 | — | — | — |
| | 0.06 | 2 | 75.0 | 68.3 | — | — |
| | 0.06 | 10 | 82.5 | 73.6 | — | — |
| | 0.06 | 50 | 96.3 | 87.6 | — | — |
| | 0.3 | 2 | 100.0 | 98.7 | — | — |
| | 0.3 | 10 | 100.0 | 98.1 | — | — |
| | 0.3 | 50 | 100.0 | 99.1 | — | — |
| Chlorothalonil | — | 0.4 | — | — | 41.8 | — |
| | — | 2 | — | — | 100 | — |
| | — | 10 | — | — | 100 | — |
| | 0.06 | 0.4 | — | — | 95.3 | 65.1 |
| | 0.06 | 2 | — | — | 100 | 100 |
| | 0.06 | 10 | — | — | 100 | 100 |
| | 0.3 | 0.4 | — | — | 99 | 99.1 |
| | 0.3 | 2 | — | — | 100 | 100 |
| | 0.3 | 10 | — | — | 100 | 100 |

TABLE 22-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 43.3 | — | 40 | — |
|  | 0.06 | — | 97.7 | — | 98 | — |
|  | 0.3 | — | 100 | — | 100 | — |
| Kresoxim-methyl | — | 2 | 50 | — | 0 | — |
|  | — | 10 | 90.7 | — | 7.5 | — |
|  | — | 50 | 99.8 | — | 2.5 | — |
|  | 0.012 | 2 | 79.2 | 71.7 | 67.5 | 53.8 |
|  | 0.012 | 10 | 94.2 | 94.7 | 77.5 | 57.2 |
|  | 0.012 | 50 | 100 | 99.9 | 80.5 | 54.9 |
|  | 0.06 | 2 | 100 | 98.8 | 98 | 98.5 |
|  | 0.06 | 10 | 100 | 99.8 | 100 | 98.5 |
|  | 0.06 | 50 | 100 | 100.0 | 100 | 98.5 |
| Azoxystrobin | — | 0.4 | 5.0 | — | 0 | — |
|  | — | 2 | 66.7 | — | 0 | — |
|  | — | 10 | 96.2 | — | 0 | — |
|  | 0.012 | 0.4 | 90.7 | 46.2 | 60.5 | 53.8 |
|  | 0.012 | 2 | 93.0 | 81.1 | 58.9 | 53.8 |
|  | 0.012 | 10 | 100.0 | 97.8 | 55.8 | 53.8 |
|  | 0.06 | 0.4 | 100.0 | 97.8 | 100 | 98.5 |
|  | 0.06 | 2 | 100.0 | 99.2 | 100 | 98.5 |
|  | 0.06 | 10 | 100.0 | 99.9 | 100 | 98.5 |
| Trifloxystrobin | — | 10 | 56.7 | — | 0 | — |
|  | — | 50 | 28.3 | — | 0 | — |
|  | — | 250 | 21.7 | — | 0 | — |
|  | 0.012 | 10 | 60.0 | 55.6 | 66.3 | 53.8 |
|  | 0.012 | 50 | 63.3 | 59.4 | 62 | 53.8 |
|  | 0.012 | 250 | 80.0 | 75.4 | 91 | 53.8 |
|  | 0.06 | 10 | 94.2 | 98.2 | 98 | 98.5 |
|  | 0.06 | 50 | 100.0 | 98.3 | 100 | 98.5 |
|  | 0.06 | 250 | 100.0 | 99 | 100 | 98.5 |
| Famoxadone | — | 2 | 0.0 | — | 0 | — |
|  | — | 10 | 0.0 | — | 0 | — |
|  | — | 50 | 10.0 | — | 0 | — |
|  | 0.012 | 2 | 51.7 | 43.3 | 92.5 | 53.8 |
|  | 0.012 | 10 | 92.3 | 43.3 | 97.5 | 53.8 |
|  | 0.012 | 50 | 96.3 | 49 | 96.5 | 53.8 |
|  | 0.06 | 2 | 95.8 | 97.7 | 99.5 | 98.5 |
|  | 0.06 | 10 | 100.0 | 97.7 | 100 | 98.5 |
|  | 0.06 | 50 | 100.0 | 97.9 | 100 | 98.5 |
| Fluazinam | — | 2 | 0.0 | — | — | — |
|  | — | 10 | 16.7 | — | — | — |
|  | — | 50 | 60.8 | — | — | — |
|  | 0.012 | 2 | 45.0 | 43.3 | — | — |
|  | 0.012 | 10 | 76.7 | 52.8 | — | — |
|  | 0.012 | 50 | 83.8 | 77.8 | — | — |
|  | 0.06 | 2 | 96.2 | 97.7 | — | — |
|  | 0.06 | 10 | 100.0 | 98.1 | — | — |
|  | 0.06 | 50 | 100.0 | 99.1 | — | — |
| Chlorothalonil | — | 0.4 | — | — | 41.8 | — |
|  | — | 2 | — | — | 100 | — |
|  | — | 10 | — | — | 100 | — |
|  | 0.012 | 0.4 | — | — | 92.5 | 73.1 |
|  | 0.012 | 2 | — | — | 100 | 100 |
|  | 0.012 | 10 | — | — | 100 | 100 |
|  | 0.06 | 0.4 | — | — | 100 | 99.1 |
|  | 0.06 | 2 | — | — | 100 | 100 |
|  | 0.06 | 10 | — | — | 100 | 100 |

TABLE 23-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| — | 0.06 | — | 71.7 | — | 38.8 | — |
|  | 0.3 | — | 99.7 | — | 98.5 | — |
|  | 1.5 | — | 100 | — | 100 | — |
| Pyribencarb | — | 10 | 8.3 | — | 0 | — |
|  | — | 50 | 11.7 | — | 0 | — |
|  | — | 250 | 23.3 | — | 10 | — |
|  | 0.06 | 10 | 94.2 | 74.0 | 47.5 | 38.8 |
|  | 0.06 | 50 | 97.5 | 75.0 | 91 | 38.8 |

TABLE 23-1-continued

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | 0.06 | 250 | 99.2 | 78.3 | 95.5 | 44.9 |
| | 0.3 | 10 | 100 | 99.7 | 100 | 98.5 |
| | 0.3 | 50 | 100 | 99.7 | 100 | 98.5 |
| | 0.3 | 250 | 100 | 99.7 | 100 | 98.7 |
| Penthiopyrad | — | 10 | 0.0 | — | 0 | — |
| | — | 50 | 0.0 | — | 0 | — |
| | — | 250 | 0.0 | — | 27.5 | — |
| | 0.06 | 10 | 80.0 | 71.7 | 42.5 | 38.8 |
| | 0.06 | 50 | 80.8 | 71.7 | 86.3 | 38.8 |
| | 0.06 | 250 | 91.7 | 71.7 | 93 | 55.6 |
| | 0.3 | 10 | 100.0 | 99.7 | 99.8 | 98.5 |
| | 0.3 | 50 | 100.0 | 99.7 | 100 | 98.5 |
| | 0.3 | 250 | 100.0 | 99.7 | 100 | 98.9 |
| Quinoxyfen | — | 10 | 0.0 | — | — | — |
| | — | 50 | 0.0 | — | — | — |
| | — | 250 | 0.0 | — | — | — |
| | 0.06 | 10 | 86.7 | 71.7 | — | — |
| | 0.06 | 50 | 91.7 | 71.7 | — | — |
| | 0.06 | 250 | 80.0 | 71.7 | — | — |
| | 0.3 | 10 | 100.0 | 99.7 | — | — |
| | 0.3 | 50 | 100.0 | 99.7 | — | — |
| | 0.3 | 250 | 100.0 | 99.7 | — | — |
| Pyriofenone | — | 10 | 0.0 | — | — | — |
| | — | 50 | 0.0 | — | — | — |
| | — | 250 | 0.0 | — | — | — |
| | 0.06 | 10 | 72.0 | 71.7 | — | — |
| | 0.06 | 50 | 80.0 | 71.7 | — | — |
| | 0.06 | 250 | 80.0 | 71.7 | — | — |
| | 0.3 | 10 | 100.0 | 99.7 | — | — |
| | 0.3 | 50 | 100.0 | 99.7 | — | — |
| | 0.3 | 250 | 100.0 | 99.7 | — | — |
| Fluazinam | — | 0.4 | — | — | 0 | — |
| | — | 2 | — | — | 90.8 | — |
| | — | 10 | — | — | 100 | — |
| | 0.06 | 0.4 | — | — | 42.5 | 38.8 |
| | 0.06 | 2 | — | — | 96 | 94.3 |
| | 0.06 | 10 | — | — | 100 | 100 |
| | 0.3 | 0.4 | — | — | 100 | 98.5 |
| | 0.3 | 2 | — | — | 100 | 99.9 |
| | 0.3 | 10 | — | — | 100 | 100 |

TABLE 23-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 41.7 | — | 0 | — |
| | 0.06 | — | 95.5 | — | 98 | — |
| | 0.3 | — | 100 | — | 100 | — |
| Pyribencarb | — | 10 | 8.3 | — | 0 | — |
| | — | 50 | 11.7 | — | 0 | — |
| | — | 250 | 23.3 | — | 10 | — |
| | 0.012 | 10 | 83.3 | 46.5 | 52.5 | 0 |
| | 0.012 | 50 | 96.3 | 48.5 | 94 | 0 |
| | 0.012 | 250 | 100 | 55.3 | 95.5 | 10 |
| | 0.06 | 10 | 95.7 | 95.9 | 98.5 | 98 |
| | 0.06 | 50 | 99.2 | 96.0 | 100 | 98 |
| | 0.06 | 250 | 100 | 96.6 | 100 | 98.2 |
| Penthiopyrad | — | 10 | 0.0 | — | 0 | — |
| | — | 50 | 0.0 | — | 0 | — |
| | — | 250 | 0.0 | — | 27.5 | — |
| | 0.012 | 10 | 42.0 | 41.7 | 17.5 | 0 |
| | 0.012 | 50 | 55.0 | 41.7 | 85 | 0 |
| | 0.012 | 250 | 77.5 | 41.7 | 93 | 27.5 |
| | 0.06 | 10 | 96.3 | 95.5 | 99 | 98 |
| | 0.06 | 50 | 96.2 | 95.5 | 100 | 98 |
| | 0.06 | 250 | 100.0 | 95.5 | 100 | 98.6 |
| Quinoxyfen | — | 10 | 0.0 | — | — | — |
| | — | 50 | 0.0 | — | — | — |
| | — | 250 | 0.0 | — | — | — |
| | 0.012 | 10 | 50.0 | 41.7 | — | — |

TABLE 23-2-continued

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| | 0.012 | 50 | 61.7 | 41.7 | — | — |
| | 0.012 | 250 | 83.3 | 41.7 | — | — |
| | 0.06 | 10 | 98.3 | 95.5 | — | — |
| | 0.06 | 50 | 98.3 | 95.5 | — | — |
| | 0.06 | 250 | 100.0 | 95.5 | — | — |
| Pyriofenone | — | 10 | 0.0 | — | — | — |
| | — | 50 | 0.0 | — | — | — |
| | — | 250 | 0.0 | — | — | — |
| | 0.012 | 10 | 46.7 | 41.7 | — | — |
| | 0.012 | 50 | 62.7 | 41.7 | — | — |
| | 0.012 | 250 | 77.5 | 41.7 | — | — |
| | 0.06 | 10 | 96.8 | 95.5 | — | — |
| | 0.06 | 50 | 99.8 | 95.5 | — | — |
| | 0.06 | 250 | 100.0 | 95.5 | — | — |
| Fluazinam | — | 0.4 | — | — | 0 | — |
| | — | 2 | — | — | 90.8 | — |
| | — | 10 | — | — | 100 | — |
| | 0.012 | 0.4 | — | — | 42.5 | 0 |
| | 0.012 | 2 | — | — | 94.5 | 90.8 |
| | 0.012 | 10 | — | — | 100 | 100 |
| | 0.06 | 0.4 | — | — | 100 | 98 |
| | 0.06 | 2 | — | — | 100 | 99.8 |
| | 0.06 | 10 | — | — | 100 | 100 |

TABLE 24-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| — | 0.06 | — | 28.3 | — | 0 | — |
| | 0.3 | — | 98 | — | 98.5 | — |
| | 1.5 | — | 100 | — | 100 | — |
| Propamocarb | — | 200 | 5 | — | 45 | — |
| | — | 1000 | 21.7 | — | 97.5 | — |
| | — | 5000 | 48.3 | — | 81.5 | — |
| | 0.06 | 200 | 56.7 | 31.9 | 96 | 45 |
| | 0.06 | 1000 | 92.2 | 43.9 | 97 | 97.5 |
| | 0.06 | 5000 | 96.2 | 63.0 | 97.5 | 81.5 |
| | 0.3 | 200 | 99.2 | 98.1 | 99.3 | 99.2 |
| | 0.3 | 1000 | 100 | 98.4 | 100 | 100 |
| | 0.3 | 5000 | 100 | 99.0 | 100 | 99.7 |
| Fosetyl-aluminum | — | 80 | 31.7 | — | 0 | — |
| | — | 400 | 85.7 | — | 22.5 | — |
| | — | 2000 | 31.7 | — | 49 | — |
| | 0.06 | 80 | 84.2 | 51 | 75 | 0 |
| | 0.06 | 400 | 93.2 | 89.7 | 92 | 22.5 |
| | 0.06 | 2000 | 99.7 | 97.5 | 95.5 | 49 |
| | 0.3 | 80 | 99.7 | 98.6 | 99.3 | 98.5 |
| | 0.3 | 400 | 100.0 | 99.7 | 99 | 98.8 |
| | 0.3 | 2000 | 100.0 | 99.9 | 99 | 99.2 |
| Iminoctadine | — | 20 | 5 | — | 79.5 | — |
| | — | 100 | 92.5 | — | 97 | — |
| | — | 500 | 96.5 | — | 99 | — |
| | 0.06 | 20 | 75.8 | 31.9 | 98 | 79.5 |
| | 0.06 | 100 | 96.3 | 94.5 | 98.5 | 97 |
| | 0.06 | 500 | 100 | 97.5 | 100 | 99 |
| | 0.3 | 20 | 100 | 98.1 | 100 | 99.7 |
| | 0.3 | 100 | 100 | 99.9 | 100 | 100 |
| | 0.3 | 500 | 100 | 99.9 | 100 | 100 |
| Fludioxonil | — | 20 | 0.0 | — | — | — |
| | — | 100 | 6.7 | — | — | — |
| | — | 500 | 18.3 | — | — | — |
| | 0.06 | 20 | 30.0 | 28.3 | — | — |
| | 0.06 | 100 | 55.0 | 33.1 | — | — |
| | 0.06 | 500 | 66.7 | 41.5 | — | — |
| | 0.3 | 20 | 98.7 | 98 | — | — |
| | 0.3 | 100 | 100.0 | 98.1 | — | — |
| | 0.3 | 500 | 100.0 | 98.4 | — | — |
| Quinoxyfen | — | 10 | — | — | 0 | — |
| | — | 50 | — | — | 0 | — |
| | — | 250 | — | — | 0 | — |
| | 0.06 | 10 | — | — | 91.3 | 0 |

TABLE 24-1-continued

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | 0.06 | 50 | — | — | 97 | 0 |
| | 0.06 | 250 | — | — | 100 | 0 |
| | 0.3 | 10 | — | — | 100 | 98.5 |
| | 0.3 | 50 | — | — | 100 | 98.5 |
| | 0.3 | 250 | — | — | 100 | 98.5 |
| Pyriofenone | — | 10 | — | — | 0 | — |
| | — | 50 | — | — | 5 | — |
| | — | 250 | — | — | 10 | — |
| | 0.06 | 10 | — | — | 96 | 0 |
| | 0.06 | 50 | — | — | 94.3 | 5 |
| | 0.06 | 250 | — | — | 94.5 | 10 |
| | 0.3 | 10 | — | — | 99.5 | 98.5 |
| | 0.3 | 50 | — | — | 99.8 | 98.5 |
| | 0.3 | 250 | — | — | 99.8 | 98.7 |

TABLE 24-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 30 | — | 2.5 | — |
| | 0.06 | — | 96.2 | — | 98.8 | — |
| | 0.3 | — | 100 | — | 100 | — |
| Propamocarb | — | 200 | 5 | — | 45 | — |
| | — | 1000 | 21.7 | — | 97.5 | — |
| | — | 5000 | 48.3 | — | 81.5 | — |
| | 0.012 | 200 | 35 | 33.5 | 77.5 | 46.4 |
| | 0.012 | 1000 | 75.8 | 45.2 | 98.3 | 97.5 |
| | 0.012 | 5000 | 94.7 | 63.8 | 87.5 | 82 |
| | 0.06 | 200 | 97.7 | 96.4 | 99.5 | 99.3 |
| | 0.06 | 1000 | 97 | 97.0 | 100 | 100 |
| | 0.06 | 5000 | 98 | 98.0 | 100 | 99.8 |
| Fosetyl-aluminum | — | 80 | 31.7 | — | 0 | — |
| | — | 400 | 85.7 | — | 22.5 | — |
| | — | 2000 | 96.5 | — | 49 | — |
| | 0.012 | 80 | 62.5 | 52.2 | 70 | 2.25 |
| | 0.012 | 400 | 90.7 | 90 | 84 | 24.4 |
| | 0.012 | 2000 | 97.8 | 97.6 | 92.5 | 50.3 |
| | 0.06 | 80 | 100.0 | 97.4 | 100 | 98.8 |
| | 0.06 | 400 | 100.0 | 99.5 | 100 | 99 |
| | 0.06 | 2000 | 100.0 | 99.9 | 100 | 99.4 |
| Iminoctadine | — | 20 | 5 | — | 79.5 | — |
| | — | 100 | 92.5 | — | 97 | — |
| | — | 500 | 96.5 | — | 99 | — |
| | 0.012 | 20 | 70 | 33.5 | 97.3 | 80 |
| | 0.012 | 100 | 96.2 | 94.8 | 99 | 97.1 |
| | 0.012 | 500 | 100 | 97.5 | 99.8 | 99 |
| | 0.06 | 20 | 97 | 96.4 | 100 | 99.7 |
| | 0.06 | 100 | 100 | 99.7 | 100 | 100 |
| | 0.06 | 500 | 100 | 99.9 | 100 | 100 |
| Fludioxonil | — | 20 | 0.0 | — | — | — |
| | — | 100 | 6.7 | — | — | — |
| | — | 500 | 18.3 | — | — | — |
| | 0.012 | 20 | 35.0 | 30 | — | — |
| | 0.012 | 100 | 25.0 | 34.7 | — | — |
| | 0.012 | 500 | 47.5 | 42.8 | — | — |
| | 0.06 | 20 | 98.2 | 96.2 | — | — |
| | 0.06 | 100 | 100.0 | 96.4 | — | — |
| | 0.06 | 500 | 100.0 | 96.9 | — | — |
| Quinoxyfen | — | 10 | — | — | 0 | — |
| | — | 50 | — | — | 0 | — |
| | — | 250 | — | — | 0 | — |
| | 0.012 | 10 | — | — | 90.8 | 2.5 |
| | 0.012 | 50 | — | — | 90 | 2.5 |
| | 0.012 | 250 | — | — | 91.2 | 2.5 |
| | 0.06 | 10 | — | — | 100 | 98.8 |
| | 0.06 | 50 | — | — | 100 | 98.8 |
| | 0.06 | 250 | — | — | 100 | 98.8 |
| Pyriofenone | — | 10 | — | — | 0 | — |
| | — | 50 | — | — | 5 | — |
| | — | 250 | — | — | 10 | — |
| | 0.012 | 10 | — | — | 92.5 | 2.5 |

TABLE 24-2-continued

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| | 0.012 | 50 | — | — | 95.5 | 7.4 |
| | 0.012 | 250 | — | — | 97 | 12.3 |
| | 0.06 | 10 | — | — | 100 | 98.8 |
| | 0.06 | 50 | — | — | 100 | 98.8 |
| | 0.06 | 250 | — | — | 100 | 98.8 |

TABLE 25-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | 0.06 | — | 75.8 | — | 27.5 | — |
| | 0.3 | — | 99.8 | — | 99 | — |
| | 1.5 | — | 100 | — | 100 | — |
| Thiophanate-methyl | — | 20 | 0 | — | 0 | — |
| | — | 100 | 265.7 | — | 0 | — |
| | — | 500 | 60 | — | 2.5 | — |
| | 0.06 | 20 | 96.3 | 75.8 | 37.5 | 27.5 |
| | 0.06 | 100 | 99.2 | 82.3 | 83.8 | 27.5 |
| | 0.06 | 500 | 100 | 90.3 | 92.5 | 29.3 |
| | 0.3 | 20 | 100 | 99.8 | 99 | 99 |
| | 0.3 | 100 | 100 | 99.9 | 100 | 99 |
| | 0.3 | 500 | 100 | 99.9 | 100 | 99 |
| Iprodione | — | 20 | 0.0 | — | 0 | — |
| | — | 100 | 0.0 | — | 0 | — |
| | — | 500 | 5.0 | — | 0 | — |
| | 0.06 | 20 | 93.3 | 75.8 | 46.3 | 27.5 |
| | 0.06 | 100 | 98.3 | 75.8 | 95.3 | 27.5 |
| | 0.06 | 500 | 99.5 | 77 | 97.3 | 27.5 |
| | 0.3 | 20 | 100.0 | 99.8 | 100 | 99 |
| | 0.3 | 100 | 100.0 | 99.8 | 100 | 99 |
| | 0.3 | 500 | 100.0 | 99.8 | 100 | 99 |
| Tebuconazole | — | 20 | 0.0 | — | 0 | — |
| | — | 100 | 0.0 | — | 10 | — |
| | — | 500 | 16.7 | — | 97 | — |
| | 0.06 | 20 | 88.2 | 75.8 | 35 | 27.5 |
| | 0.06 | 100 | 90.8 | 75.8 | 90.3 | 34.8 |
| | 0.06 | 500 | 95.0 | 79.9 | 99 | 97.8 |
| | 0.3 | 20 | 100.0 | 99.8 | 100 | 99 |
| | 0.3 | 100 | 100.0 | 99.8 | 100 | 99.1 |
| | 0.3 | 500 | 100.0 | 99.9 | 100 | 100 |
| Cyprodinil | — | 20 | 0.0 | — | 0 | — |
| | — | 100 | 0.0 | — | 0 | — |
| | — | 500 | 0.0 | — | 0 | — |
| | 0.06 | 20 | 80.0 | 75.8 | 36 | 27.5 |
| | 0.06 | 100 | 93.0 | 75.8 | 42.5 | 27.5 |
| | 0.06 | 500 | 95.0 | 75.8 | 93.8 | 86.4 |
| | 0.3 | 20 | 97.0 | 99.8 | 100 | 99 |
| | 0.3 | 100 | 100.0 | 99.8 | 100 | 99 |
| | 0.3 | 500 | 100.0 | 99.8 | 100 | 99.8 |
| Fludioxonil | — | 20 | — | — | 87.5 | — |
| | — | 100 | — | — | 97 | — |
| | — | 500 | — | — | 98.3 | — |
| | 0.06 | 20 | — | — | 92 | 90.9 |
| | 0.06 | 100 | — | — | 97.5 | 97.8 |
| | 0.06 | 500 | — | — | 98.9 | 98.7 |
| | 0.3 | 20 | — | — | 100 | 99.1 |
| | 0.3 | 100 | — | — | 100 | 100 |
| | 0.3 | 500 | — | — | 100 | 100 |

TABLE 25-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 58.3 | — | 12.5 | — |
| | 0.06 | — | 97.7 | — | 98.3 | — |
| | 0.3 | — | 100 | — | 100 | — |
| Thiophanate-methyl | — | 20 | 0 | — | 0 | — |
| | — | 100 | 26.7 | — | 0 | — |
| | — | 500 | 60 | — | 2.5 | — |
| | 0.012 | 20 | 78.3 | 58.3 | 15..0 | 12.5 |
| | 0.012 | 100 | 96.3 | 69.4 | 62.5 | 12.5 |
| | 0.012 | 500 | 100 | 83.3 | 95 | 14.7 |
| | 0.06 | 20 | 99.3 | 97.7 | 98.8 | 98.3 |
| | 0.06 | 100 | 100 | 98.3 | 99.8 | 98.3 |
| | 0.06 | 500 | 100 | 99.1 | 100 | 98.3 |
| Iprodione | — | 20 | 0.0 | — | 0 | — |
| | — | 100 | 0.0 | — | 0 | — |
| | — | 500 | 5.0 | — | 0 | — |
| | 0.012 | 20 | 81.7 | 58.3 | 58.3 | 12.5 |
| | 0.012 | 100 | 96.5 | 58.3 | 95 | 12.5 |
| | 0.012 | 500 | 99.5 | 60.4 | 98 | 12.5 |
| | 0.06 | 20 | 99.3 | 97.7 | 99.3 | 98.3 |
| | 0.06 | 100 | 100.0 | 97.7 | 100 | 98.3 |
| | 0.06 | 500 | 100.0 | 97.8 | 99.5 | 98.3 |
| Tebuconazole | — | 20 | 0.0 | — | 0 | — |
| | — | 100 | 0.0 | — | 10 | — |
| | — | 500 | 16.7 | — | 97 | — |
| | 0.012 | 20 | 63.3 | 58.3 | 25 | 12.5 |
| | 0.012 | 100 | 65.0 | 58.3 | 90 | 21.3 |
| | 0.012 | 500 | 86.7 | 65.3 | 97 | 97.4 |
| | 0.06 | 20 | 85.8 | 97.7 | 99.3 | 98.3 |
| | 0.06 | 100 | 100.0 | 97.7 | 100 | 98.4 |
| | 0.06 | 500 | 100.0 | 98.1 | 100 | 99.9 |
| Cyprodinil | — | 20 | 0.0 | — | 0 | — |
| | — | 100 | 0.0 | — | 0 | — |
| | — | 500 | 0.0 | — | 81.3 | — |
| | 0.012 | 20 | 60.0 | 58.3 | 51.3 | 12.5 |
| | 0.012 | 100 | 74.0 | 58.3 | 47.5 | 12.5 |
| | 0.012 | 500 | 76.7 | 58.3 | 91.8 | 83.6 |
| | 0.06 | 20 | 97.8 | 97.7 | 99 | 98.3 |
| | 0.06 | 100 | 100.0 | 97.7 | 100 | 98.3 |
| | 0.06 | 500 | 100.0 | 97.7 | 100 | 99.7 |
| Fludioxonil | — | 20 | — | — | 87.5 | — |
| | — | 100 | — | — | 97 | — |
| | — | 500 | — | — | 98.3 | — |
| | 0.012 | 20 | — | — | 90 | 89.1 |
| | 0.012 | 100 | — | — | 97 | 97.4 |
| | 0.012 | 500 | — | — | 98 | 98.5 |
| | 0.06 | 20 | — | — | 100 | 99.8 |
| | 0.06 | 100 | — | — | 100 | 99.9 |
| | 0.06 | 500 | — | — | 100 | 100 |

TABLE 26-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| — | 0.06 | — | 66.7 | — | 35 | — |
| | 0.3 | — | 97 | — | 96.5 | — |
| | 1.5 | — | 100 | — | 100 | — |
| Iprovalicarb | — | 0.4 | 15 | — | 0 | — |
| | — | 2 | 93.3 | — | 0 | — |
| | — | 10 | 100 | — | 93.8 | — |
| | 0.06 | 0.4 | 94.3 | 71.7 | 47.5 | 35 |
| | 0.06 | 2 | 98.3 | 97.8 | 72.5 | 35 |
| | 0.06 | 10 | 100 | 100.0 | 96.5 | 95.9 |
| | 0.3 | 0.4 | 100 | 97.5 | 97 | 96.5 |
| | 0.3 | 2 | 100 | 99.8 | 100 | 96.5 |
| | 0.3 | 10 | 100 | 100.0 | 100 | 99.8 |
| Fenamidone | — | 0.4 | 16.7 | — | 0 | — |
| | — | 2 | 94.2 | — | 0 | — |
| | — | 10 | 98.5 | — | 0 | — |

TABLE 26-1-continued

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| | 0.06 | 0.4 | 78 | 72.2 | 55 | 35 |
| | 0.06 | 2 | 99.7 | 98.1 | 69 | 35 |
| | 0.06 | 10 | 100 | 99.5 | 67 | 35 |
| | 0.3 | 0.4 | 98.7 | 97.5 | 97 | 96.5 |
| | 0.3 | 2 | 100 | 99.8 | 100 | 96.5 |
| | 0.3 | 10 | 100 | 100 | 100 | 96.5 |
| Fluopicolide | — | 0.4 | 0.0 | — | 5 | — |
| | — | 2 | 30.0 | — | 98.3 | — |
| | — | 10 | 90.8 | — | 100 | — |
| | 0.06 | 0.4 | 68.3 | 66.7 | 91 | 38.3 |
| | 0.06 | 2 | 99.0 | 76.7 | 99 | 98.9 |
| | 0.06 | 10 | 99.5 | 96.9 | 100 | 100 |
| | 0.3 | 0.4 | 99.7 | 97 | 97.8 | 96.7 |
| | 0.3 | 2 | 100.0 | 97.9 | 100 | 99.9 |
| | 0.3 | 10 | 100.0 | 99.7 | 100 | 100 |
| Ametoctradin | — | 0.4 | 0.0 | — | 77.5 | — |
| | — | 2 | 18.3 | — | 95 | — |
| | — | 10 | 95.7 | — | 98.8 | — |
| | 0.06 | 0.4 | 71.7 | 66.7 | 95.5 | 85.4 |
| | 0.06 | 2 | 96.3 | 72.8 | 97.3 | 96.8 |
| | 0.06 | 10 | 100.0 | 98.6 | 100 | 99.2 |
| | 0.3 | 0.4 | 100.0 | 97 | 100 | 99.2 |
| | 0.3 | 2 | 100.0 | 97.6 | 100 | 99.8 |
| | 0.3 | 10 | 100.0 | 99.9 | 100 | 100 |

TABLE 26-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 60 | — | 17.5 | — |
| | 0.06 | — | 97 | — | 97 | — |
| | 0.3 | — | 100 | — | 100 | — |
| Iprovalicarb | — | 0.4 | 15 | — | 0 | — |
| | — | 2 | 93.3 | — | 0 | — |
| | — | 10 | 100 | — | 93.8 | — |
| | 0.012 | 0.4 | 92.5 | 66.0 | 32.5 | 17.5 |
| | 0.012 | 2 | 96.3 | 97.3 | 55 | 17.5 |
| | 0.012 | 10 | 100 | 100.0 | 97 | 94.8 |
| | 0.06 | 0.4 | 99.5 | 97.5 | 97.3 | 97 |
| | 0.06 | 2 | 100 | 99.8 | 99.8 | 97 |
| | 0.06 | 10 | 100 | 100.0 | 100 | 99.8 |
| Fenamidone | — | 0.4 | 16.7 | — | 0 | — |
| | — | 2 | 94.2 | — | 0 | — |
| | — | 10 | 98.5 | — | 0 | — |
| | 0.012 | 0.4 | 68.3 | 66.7 | 27.5 | 17.5 |
| | 0.012 | 2 | 93.3 | 97.7 | 32.5 | 17.5 |
| | 0.012 | 10 | 100 | 99.4 | 77.5 | 17.5 |
| | 0.06 | 0.4 | 99 | 97.5 | 98 | 97 |
| | 0.06 | 2 | 100 | 99.8 | 100 | 97 |
| | 0.06 | 10 | 100 | 100 | 100 | 97 |
| Fluopicolide | — | 0.4 | 0.0 | — | 5 | — |
| | — | 2 | 30.0 | — | 98.3 | — |
| | — | 10 | 90.8 | — | 100 | — |
| | 0.012 | 0.4 | 76.7 | 60 | 88.8 | 21.6 |
| | 0.012 | 2 | 95.0 | 72 | 99.3 | 98.6 |
| | 0.012 | 10 | 98.3 | 96.3 | 100 | 100 |
| | 0.06 | 0.4 | 98.3 | 97 | 98.8 | 97.2 |
| | 0.06 | 2 | 100.0 | 7.9 | 100 | 99.9 |
| | 0.06 | 10 | 100.0 | 99.7 | 100 | 100 |
| Ametoctradin | — | 0.4 | 0.0 | — | 77.5 | — |
| | — | 2 | 18.3 | — | 95 | — |
| | — | 10 | 95.7 | — | 98.8 | — |
| | 0.012 | 0.4 | 63.3 | 60 | 92.5 | 81.4 |
| | 0.012 | 2 | 95.0 | 67.3 | 97 | 95.9 |
| | 0.012 | 10 | 98.5 | 98.3 | 100 | 99 |
| | 0.06 | 0.4 | 97.8 | 97 | 100 | 99.3 |
| | 0.06 | 2 | 100.0 | 97.6 | 100 | 99.9 |
| | 0.06 | 10 | 100.0 | 99.9 | 100 | 100 |

TABLE 27-1

| Component (b) | Dose of Compound 1-6 (ppm) | Dose of component (b) (ppm) | Test 1 Measured | Test 1 Predicted | Test 2 Measured | Test 2 Predicted |
|---|---|---|---|---|---|---|
| — | 0.06 | — | 68.3 | — | 15 | — |
|  | 0.3 | — | 99 | — | 99 | — |
|  | 1.5 | — | 100 | — | 100 | — |
| Amisulbrom | — | 0.4 | 60 | — | 27.5 | — |
|  | — | 2 | 80 | — | 98.8 | — |
|  | — | 10 | 97 | — | 100 | — |
|  | 0.06 | 0.4 | 95 | 87.3 | 80 | 38.4 |
|  | 0.06 | 2 | 99.7 | 93.7 | 99 | 98.9 |
|  | 0.06 | 10 | 100 | 99.1 | 100 | 100 |
|  | 0.3 | 0.4 | 100 | 99.5 | 99.3 | 99.3 |
|  | 0.3 | 2 | 100 | 99.8 | 100 | 100 |
|  | 0.3 | 10 | 100 | 100.0 | 100 | 100 |
| Tricyclazole | — | 20 | 0 | — | 0 | — |
|  | — | 100 | 0 | — | 0 | — |
|  | — | 500 | 70 | — | 22.5 | — |
|  | 0.06 | 20 | 78.3 | 68.3 | 27.5 | 15 |
|  | 0.06 | 100 | 83.3 | 68.3 | 75 | 15 |
|  | 0.06 | 500 | 96.3 | 90.5 | 88.8 | 34.1 |
|  | 0.3 | 20 | 99.2 | 99 | 98.8 | 99 |
|  | 0.3 | 100 | 100 | 99 | 99.5 | 99 |
|  | 0.3 | 500 | 100 | 99.7 | 97 | 99.2 |
| Polyoxin | — | 4 | 0.0 | — | 0 | — |
|  | — | 20 | 0.0 | — | 0 | — |
|  | — | 100 | 48.3 | — | 18.8 | — |
|  | 0.06 | 4 | 82.5 | 68.3 | 58 | 15 |
|  | 0.06 | 20 | 97.0 | 68.3 | 88.3 | 15 |
|  | 0.06 | 100 | 99.2 | 83.6 | 97 | 30.9 |
|  | 0.3 | 4 | 100.0 | 99 | 99 | 99 |
|  | 0.3 | 20 | 100.0 | 99 | 100 | 99 |
|  | 0.3 | 100 | 100.0 | 99.5 | 100 | 99.2 |
| Tebufloquin | — | 4 | 0.0 | — | 0 | — |
|  | — | 20 | 0.0 | — | 0 | — |
|  | — | 100 | 46.7 | — | 0 | — |
|  | 0.06 | 4 | 66.7 | 68.3 | 52.5 | 15 |
|  | 0.06 | 20 | 73.3 | 68.3 | 70 | 15 |
|  | 0.06 | 100 | 97.0 | 83.1 | 97 | 15 |
|  | 0.3 | 4 | 100.0 | 99 | 100 | 99 |
|  | 0.3 | 20 | 100.0 | 99 | 100 | 99 |
|  | 0.3 | 100 | 100.0 | 99.5 | 100 | 99 |
| Propiconazole | — | 8 | 0.0 | — | 0 | — |
|  | — | 40 | 35.0 | — | 7.5 | — |
|  | — | 200 | 53.3 | — | 57.5 | — |
|  | 0.06 | 8 | 90.8 | 68.3 | 95 | 15 |
|  | 0.06 | 40 | 93.3 | 79.4 | 97.3 | 21.4 |
|  | 0.06 | 200 | 95.0 | 85.2 | 95 | 63.9 |
|  | 0.3 | 8 | 100.0 | 99.5 | 99.5 | 99 |
|  | 0.3 | 40 | 100.0 | 99.4 | 100 | 99.1 |
|  | 0.3 | 200 | 100.0 | 99.5 | 97 | 99.6 |
| Oxathiapiprolin | — | 0.0024 | 60.2 | — | 40 | — |
|  | — | 0.012 | 95 | — | 99 | — |
|  | — | 0.06 | 100 | — | 100 | — |
|  | 0.06 | 0.0024 | 90 | 87.4 | 89 | 49 |
|  | 0.06 | 0.012 | 100 | 98.4 | 100 | 99 |
|  | 0.06 | 0.06 | 100 | 100 | 100 | 100 |
|  | 0.3 | 0.0024 | 100 | 99.6 | 100 | 99.4 |
|  | 0.3 | 0.012 | 100 | 100 | 100 | 100 |
|  | 0.3 | 0.06 | 100 | 100 | 100 | 100 |

TABLE 27-2

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| — | 0.012 | — | 61.7 | — | 0 | — |
|  | 0.06 | — | 95.7 | — | 98 | — |
|  | 0.3 | — | 100 | — | 100 | — |
| Amisulbrom | — | 0.4 | 60 | — | 27.5 | — |
|  | — | 2 | 80 | — | 98.8 | — |
|  | — | 10 | 97 | — | 100 | — |
|  | 0.012 | 0.4 | 94.2 | 84.7 | 48.8 | 27.5 |
|  | 0.012 | 2 | 95.7 | 92.3 | 98.8 | 98.8 |
|  | 0.012 | 10 | 100 | 98.9 | 100 | 100 |

TABLE 27-2-continued

| Component (b) | Dose of Compound 1-8 (ppm) | Dose of component (b) (ppm) | Test 1 Measured | Test 1 Predicted | Test 2 Measured | Test 2 Predicted |
|---|---|---|---|---|---|---|
| | 0.06 | 0.4 | 100 | 98.3 | 100 | 98.6 |
| | 0.06 | 2 | 100 | 99.1 | 100 | 100 |
| | 0.06 | 10 | 100 | 99.9 | 100 | 100 |
| Tricyclazole | — | 20 | 0 | — | 0 | — |
| | — | 100 | 0 | — | 0 | — |
| | — | 500 | 70 | — | 22.5 | — |
| | 0.012 | 20 | 65 | 61.7 | 27.5 | 0 |
| | 0.012 | 100 | 85 | 61.7 | 81.3 | 0 |
| | 0.012 | 500 | 95.7 | 88.5 | 96 | 22.5 |
| | 0.06 | 20 | 98.5 | 95.7 | 98.8 | 98 |
| | 0.06 | 100 | 99.2 | 95.7 | 99 | 98 |
| | 0.06 | 500 | 100 | 98.7 | 100 | 98.5 |
| Polyoxin | — | 4 | 0.0 | — | 0 | — |
| | — | 20 | 0.0 | — | 0 | — |
| | — | 100 | 48.3 | — | 18.8 | — |
| | 0.012 | 4 | 85.8 | 61.7 | 60 | 0 |
| | 0.012 | 20 | 95.0 | 61.7 | 90.5 | 0 |
| | 0.012 | 100 | 95.7 | 80.2 | 98 | 18.8 |
| | 0.06 | 4 | 98.3 | 95.7 | 99.3 | 98 |
| | 0.06 | 20 | 100.0 | 95.7 | 100 | 98 |
| | 0.06 | 100 | 100.0 | 97.8 | 100 | 98.4 |
| Tebufloquin | — | 4 | 0.0 | — | 0 | — |
| | — | 20 | 0.0 | — | 0 | — |
| | — | 100 | 46.7 | — | 0 | — |
| | 0.012 | 4 | 75.0 | 61.7 | 37.5 | 0 |
| | 0.012 | 20 | 81.7 | 61.7 | 62.5 | 0 |
| | 0.012 | 100 | 92.5 | 79.6 | 95.8 | 0 |
| | 0.06 | 4 | 97.0 | 95.7 | 99 | 98 |
| | 0.06 | 20 | 100.0 | 95.7 | 100 | 98 |
| | 0.06 | 100 | 100.0 | 97.7 | 100 | 98 |
| Propiconazole | — | 8 | 0.0 | — | 0 | — |
| | — | 40 | 35.0 | — | 7.5 | — |
| | — | 200 | 53.3 | — | 57.5 | — |
| | 0.012 | 8 | 75.0 | 61.7 | 83.8 | 0 |
| | 0.012 | 40 | 77.3 | 75.1 | 96.8 | 7.5 |
| | 0.012 | 200 | 83.3 | 82.1 | 96 | 57.5 |
| | 0.06 | 8 | 97.7 | 95.7 | 99.3 | 98 |
| | 0.06 | 40 | 100.0 | 97.2 | 100 | 98.2 |
| | 0.06 | 200 | 100.0 | 98 | 100 | 99.2 |
| Oxathiapiprolin | — | 0.0024 | 60.2 | — | 40 | — |
| | — | 0.012 | 95 | — | 99 | — |
| | — | 0.06 | 100 | — | 100 | — |
| | 0.012 | 0.0024 | 95 | 84.8 | 76 | 40 |
| | 0.012 | 0.012 | 100 | 98 | 100 | 99 |
| | 0.012 | 0.06 | 100 | 100 | 100 | 100 |
| | 0.06 | 0.0024 | 100 | 98 | 100 | 98.8 |
| | 0.06 | 0.012 | 100 | 100 | 100 | 100 |
| | 0.06 | 0.06 | 100 | 100 | 100 | 100 |

TABLE 28-1

| Component (b) | Dose of Compound 1-62 (ppm) | Dose of component (b) (ppm) | Test 1 Measured | Test 1 Predicted | Test 2 Measured | Test 2 Predicted |
|---|---|---|---|---|---|---|
| | 0.0024 | — | 59.0 | — | 86 | — |
| | 0.012 | — | 98.0 | — | 100 | — |
| | 0.06 | — | 100.0 | — | 100 | — |
| Cyazofamid | — | 0.003 | — | — | 0 | — |
| | — | 0.16 | — | — | 55.3 | — |
| | — | 0.08 | 32.0 | — | 99 | — |
| | — | 0.4 | 96.0 | — | 100 | — |
| | — | 2 | 100.0 | — | — | — |
| | 0.0024 | 0.003 | — | — | 95 | 86 |
| | 0.0024 | 0.16 | — | — | 100 | 93.7 |
| | 0.0024 | 0.08 | 95.0 | 72.1 | 100 | 99.8 |
| | 0.0024 | 0.4 | 100.0 | 98.3 | 100 | 100 |
| | 0.0024 | 2 | 100.0 | 100 | — | — |
| | 0.012 | 0.003 | — | — | 100 | 100 |
| | 0.012 | 0.16 | — | — | 100 | 100 |
| | 0.012 | 0.08 | 100.0 | 98.6 | 100 | 100 |
| | 0.012 | 0.4 | 100.0 | 99 | 100 | 100 |
| | 0.012 | 2 | 100.0 | 100 | — | — |

TABLE 28-1-continued

| Component (b) | Dose of Compound 1-62 (ppm) | Dose of component (b) (ppm) | Test 1 Measured | Test 1 Predicted | Test 2 Measured | Test 2 Predicted |
|---|---|---|---|---|---|---|
| Benthiavalicarb | — | 0.08 | 21.8 | — | 35 | — |
|  | — | 0.4 | 90.0 | — | 62 | — |
|  | — | 2 | 100.0 | — | 100 | — |
|  | 0.0024 | 0.08 | 88.5 | 68 | 100 | 90.9 |
|  | 0.0024 | 0.4 | 100.0 | 95.9 | 100 | 94.7 |
|  | 0.0024 | 2 | 100.0 | 100 | 100 | 100 |
|  | 0.012 | 0.08 | 100.0 | 99.7 | 100 | 100 |
|  | 0.012 | 0.4 | 100.0 | 100 | 100 | 100 |
|  | 0.012 | 2 | 100.0 | 100 | 100 | 100 |
| Mandipropamid | — | 0.08 | 40.0 | — | 12 | — |
|  | — | 0.4 | 94.0 | — | 88.3 | — |
|  | — | 2 | 100.0 | — | 95 | — |
|  | 0.0024 | 0.08 | 88.0 | 75.4 | 90.8 | 87.7 |
|  | 0.0024 | 0.4 | 100.0 | 97.5 | 100 | 98.4 |
|  | 0.0024 | 2 | 100.0 | 100 | 100 | 99.3 |
|  | 0.012 | 0.08 | 100.0 | 98.8 | 100 | 100 |
|  | 0.012 | 0.4 | 100.0 | 99.8 | 100 | 100 |
|  | 0.012 | 2 | 100.0 | 100 | 100 | 100 |
| Valifenalate | — | 0.4 | 10.0 | — | 4 | — |
|  | — | 2 | 45.2 | — | 51.8 | — |
|  | — | 10 | 97.0 | — | 93 | — |
|  | 0.0024 | 0.4 | 78.3 | 63.1 | 95.3 | 86.6 |
|  | 0.0024 | 2 | 90.0 | 77.5 | 99 | 93.3 |
|  | 0.0024 | 10 | 100.0 | 98.8 | 100 | 99 |
|  | 0.012 | 0.4 | 100.0 | 98.2 | 100 | 100 |
|  | 0.012 | 2 | 100.0 | 98.9 | 100 | 100 |
|  | 0.012 | 10 | 100.0 | 99.9 | 100 | 100 |
| Metalaxyl-M | — | 0.4 | 54.4 | — | 0 | — |
|  | — | 2 | 86.0 | — | 0 | — |
|  | — | 10 | 99.0 | — | 0 | — |
|  | 0.0024 | 0.4 | 84.2 | 81.3 | 90 | 86 |
|  | 0.0024 | 2 | 99.0 | 94.3 | 93.1 | 86 |
|  | 0.0024 | 10 | 100.0 | 99.6 | 99 | 86 |
|  | 0.012 | 0.4 | 100.0 | 99 | 100 | 100 |
|  | 0.012 | 2 | 100.0 | 99.7 | 100 | 100 |
|  | 0.012 | 10 | 100.0 | 100 | 100 | 100 |

TABLE 28-2

| Component (b) | Dose of Compound 1-62 (ppm) | Dose of component (b) (ppm) | Test 1 Measured | Test 1 Predicted | Test 2 Measured | Test 2 Predicted |
|---|---|---|---|---|---|---|
| — | 0.0024 | — | 59.0 | — | 86 | — |
|  | 0.012 | — | 98.0 | — | 100 | — |
|  | 0.06 | — | 100.0 | — | 100 | — |
| Basic copper sulfate | — | 20 | 55 | — | 32 | — |
|  | — | 100 | 90.7 | — | 80.9 | — |
|  | — | 500 | 100 | — | 95 | — |
|  | 0.0024 | 20 | 80.0 | 81.5 | 99 | 90.5 |
|  | 0.0024 | 100 | 100.0 | 96.1 | 100 | 97.3 |
|  | 0.0024 | 500 | 100.0 | 100 | 100 | 99.3 |
|  | 0.012 | 20 | 100.0 | 99.1 | 100 | 100 |
|  | 0.012 | 100 | 100.0 | 99.8 | 100 | 100 |
|  | 0.012 | 500 | 100.0 | 100 | 100 | 100 |
| Chlorothalonil | — | 0.4 | 0.0 | — | 0 | — |
|  | — | 2 | 62.1 | — | 80.5 | — |
|  | — | 10 | 100.0 | — | 100 | — |
|  | 0.0024 | 0.4 | 60.3 | 59 | 96.4 | 86 |
|  | 0.0024 | 2 | 89.0 | 84.4 | 100 | 97.2 |
|  | 0.0024 | 10 | 100.0 | 100 | 100 | 100 |
|  | 0.012 | 0.4 | 100.0 | 98 | 100 | 100 |
|  | 0.012 | 2 | 100.0 | 99.2 | 100 | 100 |
|  | 0.012 | 10 | 100.0 | 100 | 100 | 100 |
| Mancozeb | — | 2 | 21.8 | — | 33 | — |
|  | — | 10 | 80.5 | — | 100 | — |
|  | — | 50 | 100.0 | — | 100 | — |
|  | 0.0024 | 2 | 77.0 | 67.9 | 97.9 | 90.6 |
|  | 0.0024 | 10 | 93.3 | 92 | 100 | 100 |
|  | 0.0024 | 50 | 100.0 | 100 | 100 | 100 |

TABLE 28-2-continued

| Component (b) | Dose of Compound 1-62 (ppm) | Dose of component (b) (ppm) | Test 1 Measured | Test 1 Predicted | Test 2 Measured | Test 2 Predicted |
|---|---|---|---|---|---|---|
| | 0.012 | 2 | 100.0 | 98.4 | 99 | 100 |
| | 0.012 | 10 | 100.0 | 99.6 | 100 | 100 |
| | 0.012 | 50 | 100.0 | 100 | 100 | 100 |
| Propineb | — | 2 | 0.0 | — | 17.5 | — |
| | — | 10 | 36.1 | — | 95 | — |
| | — | 50 | 99.0 | — | 100 | — |
| | 0.0024 | 2 | 84.5 | 59 | 94.6 | 88.5 |
| | 0.0024 | 10 | 90.8 | 73.8 | 100 | 99.3 |
| | 0.0024 | 50 | 100.0 | 99.6 | 100 | 100 |
| | 0.012 | 2 | 100.0 | 98 | 100 | 100 |
| | 0.012 | 10 | 100.0 | 98.7 | 100 | 100 |
| | 0.012 | 50 | 100.0 | 100 | 100 | 100 |
| Captan | — | 2 | 10.0 | — | 90.1 | — |
| | — | 10 | 64.5 | — | 99 | — |
| | — | 50 | 90.0 | — | 99 | — |
| | 0.012 | 2 | 66.0 | 63.1 | 100 | 98.6 |
| | 0.012 | 10 | 84.1 | 85.4 | 100 | 100 |
| | 0.012 | 50 | 100.0 | 95.9 | 100 | 100 |
| | 0.06 | 2 | 100.0 | 98.2 | 100 | 100 |
| | 0.06 | 10 | 100.0 | 99.3 | 100 | 100 |
| | 0.06 | 50 | 100.0 | 100 | 100 | 100 |

INDUSTRIAL APPLICABILITY

The fungicidal composition of the present invention exhibits outstanding synergism, and in particular, exhibits outstanding effects against pathogenic fungi that attack agricultural and horticultural plants. Therefore, the fungicidal composition of the present invention is extremely useful and industrially applicable as a novel fungicidal composition.

The invention claimed is:

1. A fungicidal composition comprising:
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.16 ppm cyazofamid;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm cyazofamid;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm cyazofamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.003 ppm cyazofamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.16 ppm cyazofamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm cyazofamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm cyazofamid;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm benthiavalicarb;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm benthiavalicarb;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm benthiavalicarb;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm mandipropamid;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm mandipropamid;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mandipropamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm mandipropamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm mandipropamid;
   0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mandipropamid;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm valifenalate;
   0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm valifenalate;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm valifenalate;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm valifenalate;

0.03 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm valifenalate;

0.03 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm valifenalate;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm metalaxyl-M;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm metalaxyl-M;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm metalaxyl-M;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm metalaxyl-M;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm metalaxyl-M;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm metalaxyl-M;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.003 ppm cyazofamid;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.008 ppm cyazofamid;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm cyazofamid;

0.006 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.16 ppm cyazofamid;

0.006 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm cyazofamid;

0.006 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm cyazofamid;

0.006 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm cyazofamid;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm benthiavalicarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm benthiavalicarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm benthiavalicarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm mandipropamid;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm mandipropamid;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mandipropamid;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.08 ppm mandipropamid;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm mandipropamid;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mandipropamid;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm valifenalate;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm valifenalate;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm valifenalate;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm valifenalate;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm valifenalate;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm valifenalate;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm metalaxyl-M;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm metalaxyl-M;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm metalaxyl-M;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm metalaxyl-M;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm metalaxyl-M;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm metalaxyl-M;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ethaboxam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ethaboxam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm ethaboxam;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ethaboxam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm dimethomorph;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm dimethomorph;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm dimethomorph;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm dimethomorph;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm dimethomorph;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm cymoxanil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm cymoxanil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm cymoxanil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm cymoxanil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm cymoxanil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm cymoxanil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm zoxamide;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm zoxamide;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm zoxamide;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm zoxamide;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ethaboxam;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ethaboxam;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm ethaboxam;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ethaboxam;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ethaboxam;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm ethaboxam;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm dimethomorph;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm dimethomorph;

0.012 ppm 4-[4-(6-fluoro-9-methylsulfonyloxy-1,5-dihydro-3H-2,4-benzodioxepin-3-yl)-2-thiazolyl]-1-[2-

[5-methyl-3-(trifluoromethyl)-1H-pyrazol-1-yl]acetyl]piperidine and 10 ppm dimethomorph;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm dimethomorph;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm dimethomorph;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm dimethomorph;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm cymoxanil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm cymoxanil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm cymoxanil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm cymoxanil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm cymoxanil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm zoxamide;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm zoxamide;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm zoxamide;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm zoxamide;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm zoxamide;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm basic copper sulfate; 0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm basic copper sulfate;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm basic copper sulfate;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm basic copper sulfate;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm basic copper sulfate;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm chlorothalonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm chlorothalonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm chlorothalonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mancozeb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm mancozeb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm mancozeb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm propineb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm propineb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm propineb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm propineb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm propineb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm captan;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm captan;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm captan;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm captan;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm captan;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm captan;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm basic copper sulfate;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm basic copper sulfate;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm basic copper sulfate;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm basic copper sulfate;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm basic copper sulfate;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm basic copper sulfate;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm chlorothalonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm chlorothalonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm chlorothalonil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mancozeb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm mancozeb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm mancozeb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm mancozeb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm propineb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm propineb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm propineb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm propineb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm propineb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm propineb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm captan;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm captan;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm captan;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm captan;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm captan;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm captan;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm kresoxim-methyl;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm kresoxim-methyl;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm kresoxim-methyl;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm kresoxim-methyl;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm kresoxim-methyl;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm kresoxim-methyl;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm azoxystrobin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm azoxystrobin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm azoxystrobin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm azoxystrobin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm azoxystrobin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm trifloxystrobin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm trifloxystrobin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm trifloxystrobin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm trifloxystrobin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm trifloxystrobin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm trifloxystrobin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm famoxadone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm famoxadone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm famoxadone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm famoxadone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm famoxadone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm famoxadone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluazinam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm fluazinam;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluazinam;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm fluazinam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm chlorothalonil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm kresoxim-methyl;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm kresoxim-methyl;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm kresoxim-methyl;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm kresoxim-methyl;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm kresoxim-methyl;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm kresoxim-methyl;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm azoxystrobin;

0.012 ppm 4-[4-(6-fluoro-9-methylsulfonyloxy-1,5-dihydro-3H-2,4-benzodioxepin-3-yl)-2-thiazolyl]-1-[2-

[5-methyl-3-(trifluoromethyl)-1H-pyrazol-1-yl]acetyl]piperidine and 2 ppm azoxystrobin;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm azoxystrobin;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm azoxystrobin;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm azoxystrobin;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm azoxystrobin;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm famoxadone;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm famoxadone;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm famoxadone;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm famoxadone;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm famoxadone;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm famoxadone;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluazinam;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm fluazinam;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluazinam;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm fluazinam;
0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm chlorothalonil;
0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm chlorothalonil;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyribencarb;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm pyribencarb;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyribencarb;
0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyribencarb;
0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm pyribencarb;
0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyribencarb;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm penthiopyrad;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm penthiopyrad;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm penthiopyrad;
0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm penthiopyrad;
0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm penthiopyrad;
0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm penthiopyrad;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;
0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm quinoxyfen;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm quinoxyfen;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm pyriofenone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm pyriofenone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluazinam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluazinam;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyribencarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyribencarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyribencarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyribencarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyribencarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyribencarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm penthiopyrad;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm penthiopyrad;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm penthiopyrad;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm penthiopyrad;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm penthiopyrad;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm penthiopyrad;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm quinoxyfen;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm quinoxyfen;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyriofenone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyriofenone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluazinam;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluazinam;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluazinam;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propamocarb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 1000 ppm propamocarb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 5000 ppm propamocarb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propamocarb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 5000 ppm propamocarb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 80 ppm fosetyl-aluminum;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 400 ppm fosetyl-aluminum;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2000 ppm fosetyl-aluminum;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 80 ppm fosetyl-aluminum;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 400 ppm fosetyl-aluminum;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iminoctadine;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iminoctadine;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iminoctadine;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iminoctadine;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iminoctadine;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iminoctadine;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm fludioxonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm fludioxonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm fludioxonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm fludioxonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm quinoxyfen;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm quinoxyfen;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyriofenone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyriofenone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propamocarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 1000 ppm propamocarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 5000 ppm propamocarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propamocarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 5000 ppm propamocarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 80 ppm fosetyl-aluminum;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 400 ppm fosetyl-aluminum;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2000 ppm fosetyl-aluminum;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 80 ppm fosetyl-aluminum;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 400 ppm fosetyl-aluminum;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2000 ppm fosetyl-aluminum;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iminoctadine;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iminoctadine;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iminoctadine;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iminoctadine;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iminoctadine;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iminoctadine;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm fludioxonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm fludioxonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm fludioxonil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm quinoxyfen;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm quinoxyfen;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm quinoxyfen;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm quinoxyfen;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyriofenone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm pyriofenone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 50 ppm pyriofenone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 250 ppm pyriofenone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm thiophanate-methyl;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm thiophanate-methyl;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm thiophanate-methyl;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm thiophanate-methyl;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm thiophanate-methyl;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm thiophanate-methyl;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iprodione;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iprodione;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iprodione;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iprodione;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iprodione;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iprodione;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebuconazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebuconazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tebuconazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebuconazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebuconazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tebuconazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm cyprodinil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm cyprodinil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm cyprodinil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm cyprodinil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm cyprodinil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm cyprodinil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm fludioxonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm fludioxonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm fludioxonil;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm fludioxonil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm thiophanate-methyl;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm thiophanate-methyl;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm thiophanate-methyl;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm thiophanate-methyl;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm thiophanate-methyl;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm thiophanate-methyl;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iprodione;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iprodione;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iprodione;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm iprodione;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm iprodione;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm iprodione;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebuconazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebuconazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tebuconazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebuconazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebuconazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tebuconazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm cyprodinil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm cyprodinil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm cyprodinil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm cyprodinil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm cyprodinil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm cyprodinil;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm fludioxonil;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm fludioxonil;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm iprovalicarb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm iprovalicarb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm iprovalicarb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm iprovalicarb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm iprovalicarb;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm iprovalicarb;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fenamidone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fenamidone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fenamidone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fenamidone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fenamidone;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fenamidone;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluopicolide;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluopicolide;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluopicolide;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluopicolide;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluopicolide;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluopicolide;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm ametoctradin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ametoctradin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ametoctradin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm ametoctradin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ametoctradin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ametoctradin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm iprovalicarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm iprovalicarb;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm iprovalicarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm iprovalicarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm iprovalicarb;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm iprovalicarb;

0.012 ppm 4-[4-(6-fluoro-9-methylsulfonyloxy-1,5-dihydro-3H-2,4-benzodioxepin-3-yl)-2-thiazolyl]-1-[2-

[5-methyl-3-(trifluoromethyl)-1H-pyrazol-1-yl]acetyl]piperidine and 0.4 ppm fenamidone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fenamidone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fenamidone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fenamidone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fenamidone;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fenamidone;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluopicolide;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluopicolide;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluopicolide;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm fluopicolide;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm fluopicolide;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm fluopicolide;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm ametoctradin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ametoctradin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ametoctradin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm ametoctradin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm ametoctradin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm ametoctradin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm amisulbrom;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm amisulbrom;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm amisulbrom;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm amisulbrom;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm amisulbrom;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tricyclazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tricyclazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tricyclazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tricyclazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tricyclazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tricyclazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm polyoxin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm polyoxin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm polyoxin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm polyoxin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm polyoxin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm polyoxin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm tebufloquin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebufloquin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebufloquin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm tebufloquin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebufloquin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebufloquin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 8 ppm propiconazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 40 ppm propiconazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propiconazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 8 ppm propiconazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 40 ppm propiconazole;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propiconazole;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.0024 ppm oxathiapiprolin;

0.06 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.012 ppm oxathiapiprolin;

0.3 ppm 4-[4-(6-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.0024 ppm oxathiapiprolin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm amisulbrom;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm amisulbrom;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm amisulbrom;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.4 ppm amisulbrom;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 2 ppm amisulbrom;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 10 ppm amisulbrom;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tricyclazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tricyclazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tricyclazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tricyclazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tricyclazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 500 ppm tricyclazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm polyoxin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm polyoxin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm polyoxin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm polyoxin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm polyoxin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm polyoxin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm tebufloquin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebufloquin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebufloquin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 4 ppm tebufloquin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 20 ppm tebufloquin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 100 ppm tebufloquin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 8 ppm propiconazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 40 ppm propiconazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propiconazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 8 ppm propiconazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 40 ppm propiconazole;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 200 ppm propiconazole;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.0024 ppm oxathiapiprolin;

0.012 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.012 ppm oxathiapiprolin;

0.06 ppm 4-[4-(6-fluoro-9-methylsulfonyloxy-1,5-dihydro-3H-2,4-benzodioxepin-3-yl)-2-thiazolyl]-1-[2-[5-methyl-3-(trifluoromethyl)-1H-pyrazol-1-yl]acetyl]piperidine and 0.0024 ppm oxathiapiprolin;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.003 ppm cyazofamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.16 ppm cyazofamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.08 ppm cyazofamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm cyazofamid;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.08 ppm cyazofamid;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm cyazofamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.08 ppm benthiavalicarb;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm benthiavalicarb;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.08 ppm benthiavalicarb;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.08 ppm mandipropamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm mandipropamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm mandipropamid;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.08 ppm mandipropamid;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm mandipropamid;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm valifenalate;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm valifenalate;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm valifenalate;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm valifenalate;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm valifenalate;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm metalaxyl-M;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm metalaxyl-M;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm metalaxyl-M;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm metalaxyl-M;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm metalaxyl-M;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 20 ppm basic copper sulphate;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 100 ppm basic copper sulphate;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 500 ppm basic copper sulphate;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 20 ppm basic copper sulphate;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 100 ppm basic copper sulphate;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm chlorothalonil;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm chlorothalonil;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 0.4 ppm chlorothalonil;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm chlorothalonil;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm mancozeb;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm mancozeb;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm mancozeb;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm mancozeb;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm propineb;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm propineb;

0.0024 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 50 ppm propineb;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm propineb;

0.0012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm propineb;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm captan;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm captan;

0.012 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 50 ppm captan;

0.06 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 2 ppm captan; or 0.06 ppm 4-[4-(6-fluoro-9-methylsulfonyloxy-1,5-dihydro-3H-2,4-benzodioxepin-3-yl)-2-thiazolyl]-1-[2-[3,5-bis(difluoromethyl)-1H-pyrazol-1-yl]acetyl]piperidine and 10 ppm captan.

2. A method of controlling a plant pest, comprising a step of treating a plant or a vicinity thereof with the fungicidal composition of claim 1 by at least one of misting, spreading, dusting, spraying, dispersing, immersing, lavaging, inserting, sprinkling, bubbling, depositing, dressing, coating, blowing, fumigating, smoking, hazing, and/or painting.

3. The method according to claim 2, wherein the vicinity is at least one of soil, rice paddy, water for hydroponic cultivation, and/or cultivation materials.

\* \* \* \* \*